(12) United States Patent
Kawazu et al.

(10) Patent No.: US 11,025,846 B2
(45) Date of Patent: Jun. 1, 2021

(54) IMAGING SYSTEM, IMAGING APPARATUS, AND CONTROL APPARATUS

(71) Applicant: Sony Semiconductor Solutions Corporation, Kanagawa (JP)

(72) Inventors: Naoki Kawazu, Kanagawa (JP); Atsushi Suzuki, Kanagawa (JP); Junichiro Azami, Kanagawa (JP); Motohashi Yuichi, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/480,368

(22) PCT Filed: Nov. 7, 2017

(86) PCT No.: PCT/JP2017/040154
§ 371 (c)(1),
(2) Date: Jul. 24, 2019

(87) PCT Pub. No.: WO2018/142706
PCT Pub. Date: Aug. 9, 2018

(65) Prior Publication Data
US 2019/0387188 A1 Dec. 19, 2019

(30) Foreign Application Priority Data

Feb. 1, 2017 (JP) .............................. JP2017-016475
Oct. 25, 2017 (JP) .............................. JP2017-206334

(51) Int. Cl.
*H04N 5/365* (2011.01)
*H04N 5/363* (2011.01)
*H04N 5/369* (2011.01)

(52) U.S. Cl.
CPC ............. *H04N 5/365* (2013.01); *H04N 5/363* (2013.01); *H04N 5/3698* (2013.01)

(58) Field of Classification Search
CPC ...... H04N 5/365; H04N 5/363; H04N 5/3698; H04N 5/374; H04N 5/379; H04N 5/37457; H04N 5/367
(Continued)

(56) References Cited

U.S. PATENT DOCUMENTS 7,804,052 B2 * 9/2010 Chinnaveerappan ........................ H04N 17/002 250/208.1
10,489,889 B2 * 11/2019 Murao ................... H04N 7/183
(Continued)

FOREIGN PATENT DOCUMENTS

EP   1 881 699 A1   1/2008
JP   2011-166793 A   8/2011
(Continued)

OTHER PUBLICATIONS

International Written Opinion and English translation thereof dated Jan. 30, 2018 in connection with International Application No. PCT/JP2017/040154.
(Continued)

*Primary Examiner* — Yogesh K Aggarwal
(74) *Attorney, Agent, or Firm* — Wolf, Greenfield & Sacks, P.C.

(57) ABSTRACT

[Object] To make it possible to detect, in the case where abnormality has occurred in at least a part of the pixels, the abnormality for each of the pixels.
[Solving Means] An imaging system includes: an imaging apparatus that is mounted on a vehicle and images an area around the vehicle; and a processing apparatus that is mounted on the vehicle and executes processing relating to a function of controlling the vehicle, in which the imaging apparatus includes a pixel including a photoelectric conversion device, a drive circuit that supplies a drive signal to the pixel, a power source that applies a power source voltage to
(Continued)

the pixel, a control unit that controls application of the power source voltage to the pixel so that charges are injected into the photoelectric conversion device, and then, controls supply of the drive signal to the pixel so that a pixel signal corresponding to the charges injected from the photoelectric conversion device is read, a recognition unit that recognizes a state of the photoelectric conversion device in accordance with a result of reading the pixel signal corresponding to the charges from the photoelectric conversion device, and an output unit that outputs information corresponding to a result of recognizing the state of the photoelectric conversion device, and the processing apparatus restricts, on the basis of the recognition result, the function of controlling the vehicle.

22 Claims, 30 Drawing Sheets

(58) Field of Classification Search
USPC .............. 348/335, 340, 345, 348, 350, 352
See application file for complete search history.

(56) References Cited

U.S. PATENT DOCUMENTS

| | | | |
|---|---|---|---|
| 2008/0278612 A1 | 11/2008 | Egawa | |
| 2009/0066793 A1 | 3/2009 | Takeda | |
| 2011/0242381 A1 | 10/2011 | Sakakibara et al. | |
| 2016/0337608 A1* | 11/2016 | Numata | H04N 5/3532 |
| 2017/0338262 A1* | 11/2017 | Hirata | H04N 5/374 |
| 2018/0241955 A1 | 8/2018 | Sakano et al. | |

FOREIGN PATENT DOCUMENTS

| | | | |
|---|---|---|---|
| JP | 2011-229120 A | 11/2011 | |
| JP | 2013-065995 A | 4/2013 | |
| JP | 2016-208402 A | 12/2016 | |
| WO | WO 2006/120815 A1 | 11/2006 | |
| WO | WO 2008/150634 A1 | 12/2008 | |
| WO | WO-2016076126 A1 * | 5/2016 | ............. H04N 5/378 |
| WO | WO 2016/147885 A1 | 9/2016 | |

OTHER PUBLICATIONS

International Preliminary Report on Patentability and English translation thereof dated Aug. 15, 2019 in connection with International Application No. PCT/JP2017/040154.

Extended European Search Report dated Jan. 27, 2020 in connection with European Application No. 17895104.2.

International Search Report and English translation thereof dated Jan. 30, 2018 in connection with International Application No. PCT/JP2017/040154.

\* cited by examiner

2

IMAGING SYSTEM, IMAGING APPARATUS, AND CONTROL APPARATUS

CROSS-REFERENCE TO RELATED APPLICATIONS

The present application claims the benefit under 35 U.S.C. § 371 as a U.S. National Stage Entry of International Application No. PCT/JP2017/040154, filed in the Japanese Patent Office as a Receiving Office on Nov. 7, 2017, which claims priority to Japanese Patent Application Number JP2017-206334, filed in the Japanese Patent Office on Oct. 25, 2017, and Japanese Patent Application Number JP2017-016475, filed in the Japanese Patent Office on Feb. 1, 2017, each of which is hereby incorporated by reference in its entirety.

TECHNICAL FIELD

The present disclosure relates to an imaging system, an imaging apparatus, and a control apparatus.

BACKGROUND ART

As a solid-state imaging apparatus, an amplification type solid-state imaging apparatus typified by a MOS image sensor such as a CMOS (Complementary Metal Oxide Semiconductor) is known. Further, a charge-transfer type solid-state imaging apparatus typified by a CCD (Charge Coupled Device) image sensor is known. These solid-state imaging apparatuses are widely used in digital still cameras, digital video cameras, and the like. In recent years, as a solid-state imaging apparatus mounted on mobile devices such as a mobile phone with a camera and a PDA (Personal Digital Assistant), a MOST image sensor is often used from the viewpoint of low power-source voltage and power consumption.

The MOS solid-state imaging apparatus includes a pixel array (pixel area) and a peripheral circuit area. In the pixel array, a plurality of unit pixels are arranged in a two-dimensional array, each of the unit pixels being formed by a photoelectric conversion device (e.g., photodiode) and a plurality of pixel transistors. The plurality of pixel transistors are each formed of a MOS transistor, and include three transistors, i.e., a transfer transistor, a reset transistor, and an amplification transistor, or four transistors, i.e., the three transistors and a selection transistor.

Further, in recent years, applications of a solid-state imaging apparatus are also diversified, and for example, applications to various recognition systems that not only capture an image but also recognize predetermined targets such as persons and objects on the basis of the captured image are also being considered along with development of the image analysis technology or various recognition technologies.

CITATION LIST

Patent Literature

Patent Literature 1: Japanese Patent Application Laid-open No. 2011-166793

Technical Problem

Incidentally, in a situation in which a solid-state imaging apparatus is applied to various recognition systems, a mechanism for detecting, in the case where abnormality occurs in the solid-state imaging apparatus, the abnormality is important. For example, Patent Literature 1 discloses an example of a mechanism for detecting, in the case where abnormality has occurred in a pixel of a solid-state imaging apparatus, the abnormality for each column.

Meanwhile, in the technology disclosed in Patent Literature 1, it is difficult to detect, in the case where abnormality has occurred in a part of the pixels, the abnormality for each of the pixels.

In this regard, the present disclosure proposes an imaging system, an imaging apparatus, and a control apparatus that are capable of detecting, in the case where abnormality has occurred in at least a part of the pixels, the abnormality for each of the pixels.

Solution to Problem

In accordance with the present disclosure, there is provided an imaging system, including: an imaging apparatus that is mounted on a vehicle and generates an image by imaging an area around the vehicle; and a processing apparatus that is mounted on the vehicle and executes processing relating to a function of controlling the vehicle, in which the imaging apparatus includes a pixel including a photoelectric conversion device that performs photoelectric conversion on incident light, a drive circuit that supplies a drive signal to the pixel, a power source that applies a power source voltage to the pixel, a control unit that controls application of the power source voltage to the pixel so that charges are injected into the photoelectric conversion device of the pixel, and then, controls supply of the drive signal to the pixel so that a pixel signal corresponding to the charges injected from the photoelectric conversion device is read, a recognition unit that recognizes a state of the photoelectric conversion device in accordance with a result of reading the pixel signal corresponding to the charges from the photoelectric conversion device of the pixel, and an output unit that outputs information corresponding to a result of recognizing the state of the photoelectric conversion device, and the processing apparatus restricts, on the basis of the recognition result, the function of controlling the vehicle.

Further, in accordance with the present disclosure, there is provided an imaging apparatus, including: a pixel including a photoelectric conversion device that performs photoelectric conversion on incident light; a drive circuit that supplies a drive signal to the pixel; a power source that applies a power source voltage to the pixel; a control unit that controls application of the power source voltage to the pixel so that charges are injected into the photoelectric conversion device of the pixel, and then, controls supply of the drive signal to the pixel so that a pixel signal corresponding to the charges injected from the photoelectric conversion device is read; and a recognition unit that recognizes a state of the photoelectric conversion device in accordance with a result of reading the pixel signal corresponding to the charges from the photoelectric conversion device of the pixel.

Further, in accordance with the present disclosure, there is provided a control apparatus, including: a control unit that controls application of a voltage to a pixel including a photoelectric conversion device that performs photoelectric conversion on incident light so that charges are injected into the photoelectric conversion device of the pixel, and then, controls supply of the drive signal to the pixel so that a pixel signal corresponding to the charges injected from the photoelectric conversion device is read; and a recognition unit that recognize a state of the photoelectric conversion device on the basis of a result of reading the pixel signal corresponding to the charges from the photoelectric conversion device of the pixel.

Advantageous Effects of Invention

As described above, in accordance with the present disclosure, there are provided an imaging system, an imaging apparatus, and a control apparatus that are capable of detecting, in the case where abnormality has occurred in at least a part of the pixels, the abnormality for each of the pixels.

It should be noted that the above-mentioned effect is not necessarily limitative, and any effect described in the present specification or other effects that can be grasped from the present specification may be exerted in addition to or instead of the above-mentioned effect.

MODE(S) FOR CARRYING OUT THE INVENTION

Hereinafter, favorable embodiments of the present disclosure will be described in detail with reference to the accompanying drawings. Note that in the present specification and drawings, components having substantially the same functional configurations are denoted by the same reference symbols and overlapped description will be omitted.

Note that description will be made in the following order.
1. Configuration Example of Solid-State Imaging Apparatus
    1.1. Schematic Configuration
    1.2. Functional Configuration
    1.3. Circuit Configuration of Unit Pixel
    1.4. Drive Control
2. First Embodiment
    2.1. Configuration
    2.2. Drive Control
    2.3. Modified Example
    2.4. Evaluation
3. Second Embodiment
    3.1. Configuration
    3.2. Drive Control
    3.3. Relationship between Restriction of Exposure Time and Vertical Blanking Period
    3.4. Evaluation
4. Application Example
    4.1. Application Example 1 to Moving Object
    4.2. Application Example 2 to Moving Object
5. Conclusion 1. Configuration Example of Solid-State Imaging Apparatus A configuration example of a solid-state imaging apparatus according to this embodiment will be described below.

1.1. Schematic Configuration

Figure 1:
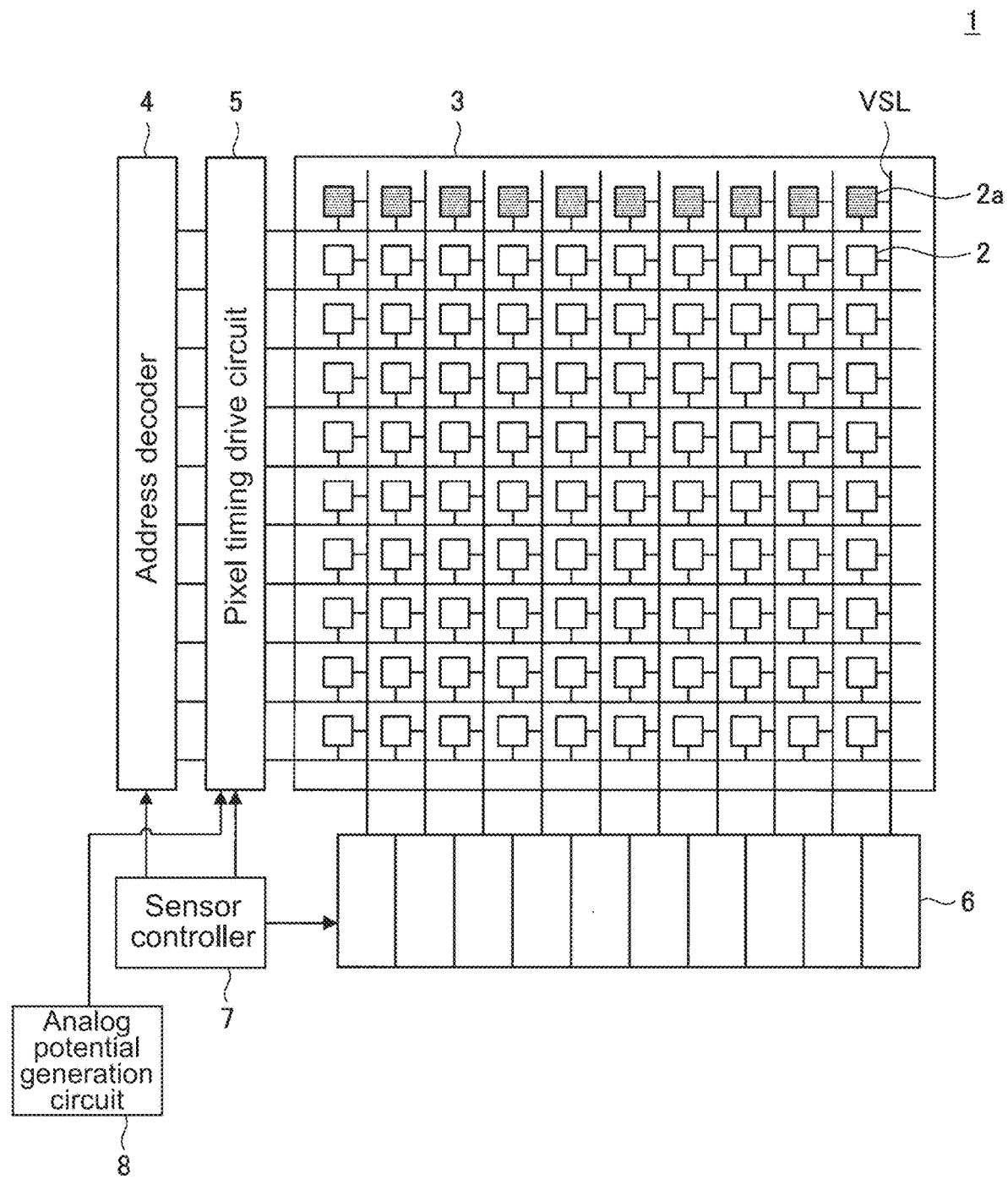
FIG. 1 is a diagram showing a schematic configuration of a CMOS solid-state imaging apparatus as an example of a configuration of a solid-state imaging apparatus according to an embodiment of the present disclosure.

FIG. 1 shows a schematic configuration of a CMOS solid-state imaging apparatus as an example of a configuration of a solid-state imaging apparatus according to an embodiment of the present disclosure. This CMOS solid-state imaging apparatus is applied to a solid-state imaging apparatus according to each embodiment.

As shown in FIG. 1, a solid-state imaging apparatus 1 in this example includes a pixel array unit 3, an address recorder 4, a pixel timing drive circuit 5, a column signal processing circuit 6, a sensor controller 7, and an analog potential generation circuit 8.

In the pixel array unit 3, a plurality of pixels 2 is arranged in an array, and each of the pixels 2 is connected to the pixel timing drive circuit 5 via a horizontal signal line and to the column signal processing circuit 6 via a vertical signal line VSL. The plurality of pixels 2 each output a pixel signal corresponding to the amount of light applied via an optical system (not shown), and an image of a subject to be formed on the pixel array unit 3 is established from these pixel signals.

The pixels 2 each include, for example, a photodiode as a photoelectric conversion unit, and a plurality of pixel transistors (so-called MOS transistors). The plurality of pixel transistors can include, for example, three transistors, i.e., a transfer transistor, a reset transistor, and an amplification transistor. Alternatively, the plurality of pixel transistors can include four transistors, i.e., the above-mentioned three transistors and a selection transistor. Note that an example of the equivalent circuit of the unit pixel will be described below separately. The pixels 2 can be configured as one unit pixel. Further, the pixels 2 can have a shared pixel structure. This shared pixel structure includes a plurality of photodiodes, a plurality of transfer transistors, one floating diffusion to be shared, and each one of other pixel transistors to be shared. That is, in the shared pixel, the plurality of photodiodes and the plurality of transfer transistors constituting a unit pixel share each one of other pixel transistors to be shared.

Further, dummy pixels 2a that do not contribute to display may be arranged in a part (e.g., non-display area) of the pixel array unit 3. The dummy pixels 2a are used for acquiring various types of information relating to the solid-state imaging apparatus 1. For example, a voltage corresponding to while brightness is applied to the dummy pixels 2a during a period in which the pixels 2 that contribute to display are driven. At this time, for example, by converting a current that flows to the dummy pixels 2a into a voltage and measuring the voltage obtained by this conversion, deterioration of the pixels 2 that contribute display can be predicted. That is, the dummy pixels 2a can correspond to a sensor capable of detecting electrical characteristics of the solid-state imaging apparatus 1.

The address recorder 4 controls access of the pixel array unit 3 in the vertical direction, and the pixel timing drive circuit 5 drives the pixels 2 in accordance with the logical sum of a control signal from the address recorder 4 and a pixel drive pulse.

The column signal processing circuit 6 performs CDS (Correlated Double Sampling) processing on the pixel signal output from each of the plurality of pixels 2 via the vertical signal line VSL to perform AD conversion of the pixel signal and remove reset noise. For example, the column signal processing circuit 6 includes a plurality of AD convertors whose number corresponds to the number of columns of the pixels 2, and is capable of performing CDS processing in parallel for each column of the pixels 2. Further, the column signal processing circuit 6 includes a constant current circuit forming a load MOS unit of a source follower circuit, and a single slope DA converter for analog-digital converting the potential of the vertical signal line VSL.

The sensor controller 7 controls driving of the entire solid-state imaging apparatus 1. For example, the sensor controller 7 generates a clock signal according to the drive cycle of each block constituting the solid-state imaging apparatus 1, and supplies it to each block.

The analog potential generation circuit 8 generates an analog potential for driving the dummy pixels 2a in a desired mode in order to acquire various types of information relating to the solid-state imaging apparatus 1. For example, the pixel timing drive circuit 5 drives the dummy pixels 2a on the basis of the analog potential generated by the analog potential generation circuit 8, and thus, various types of information relating to the solid-state imaging apparatus 1 are acquired on the basis of the output signal from each of the dummy pixels 2a.

Now, a basic schematic configuration of the solid-state imaging apparatus 1 according to the present technology will be described with reference to FIG. 2.

Figure 2:
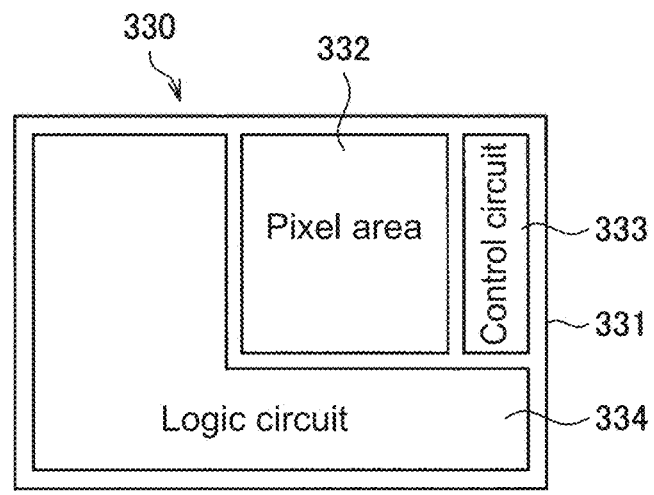
FIG. 2 is a diagram showing an outline of a configuration example of a stacked-type solid-state imaging apparatus to which the technology according to the present disclosure can be applied.
Figure 2:
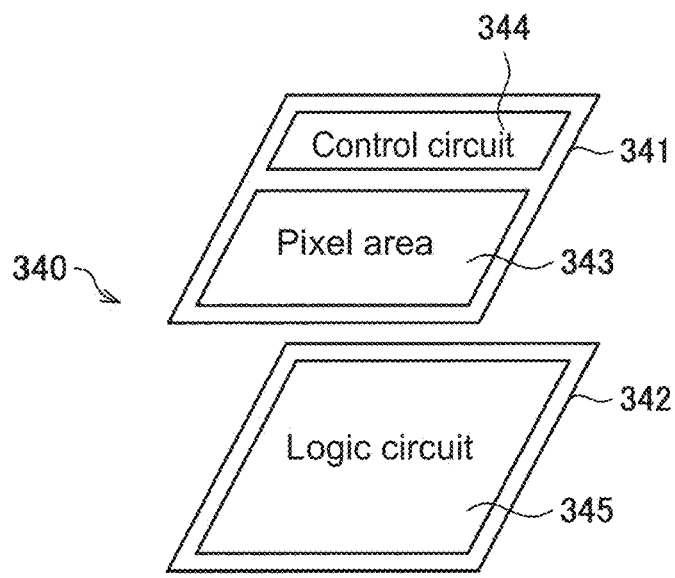
Figure 2:
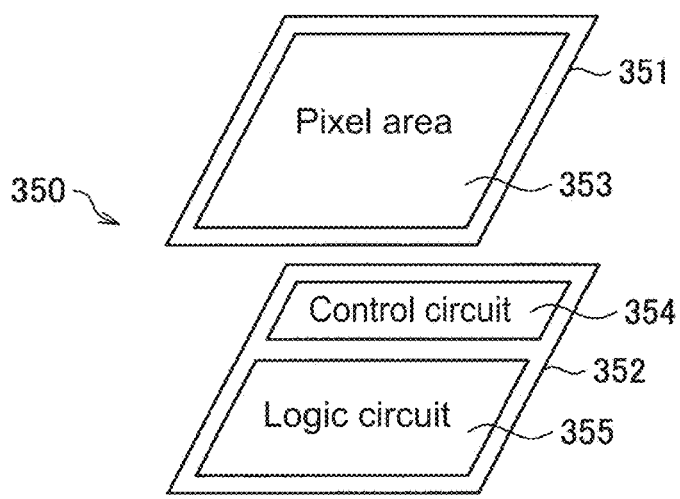

As a first example, a solid-state imaging apparatus 330 shown in the upper part of FIG. 2 is configured by mounting, in one semiconductor chip 331, a pixel area 332, a control circuit 333, and a logic circuit 334 including the above-mentioned signal processing circuit.

As a second example, a solid-state imaging apparatus 340 shown in the middle of FIG. 2 includes a first semiconductor chip unit 341 and a second semiconductor chip unit 342. A pixel area 343 and a control circuit 344 are mounted on the first semiconductor chip unit 341, and a logic circuit 345 including the above-mentioned signal processing circuit is mounted on the second semiconductor chip unit 342. Then, the first semiconductor chip unit 341 and the second semiconductor chip unit 342 are electrically connected to each other, thereby configuring the solid-state imaging apparatus 340 as one semiconductor chip.

As a third example, a solid-state imaging apparatus 350 shown in the lower part of FIG. 2 includes a first semiconductor chip unit 351 and a second semiconductor chip unit 352. A pixel area 353 is mounted on the first semiconductor chip unit 351, and a control circuit 354 and a logic circuit 355 including the above-mentioned signal processing circuit are mounted on the second semiconductor chip unit 352. Then, the first semiconductor chip unit 351 and the second semiconductor chip unit 352 are electrically connected to each other, thereby configuring the solid-state imaging apparatus 350 as one semiconductor chip.

1.2. Functional Configuration

Figure 3:
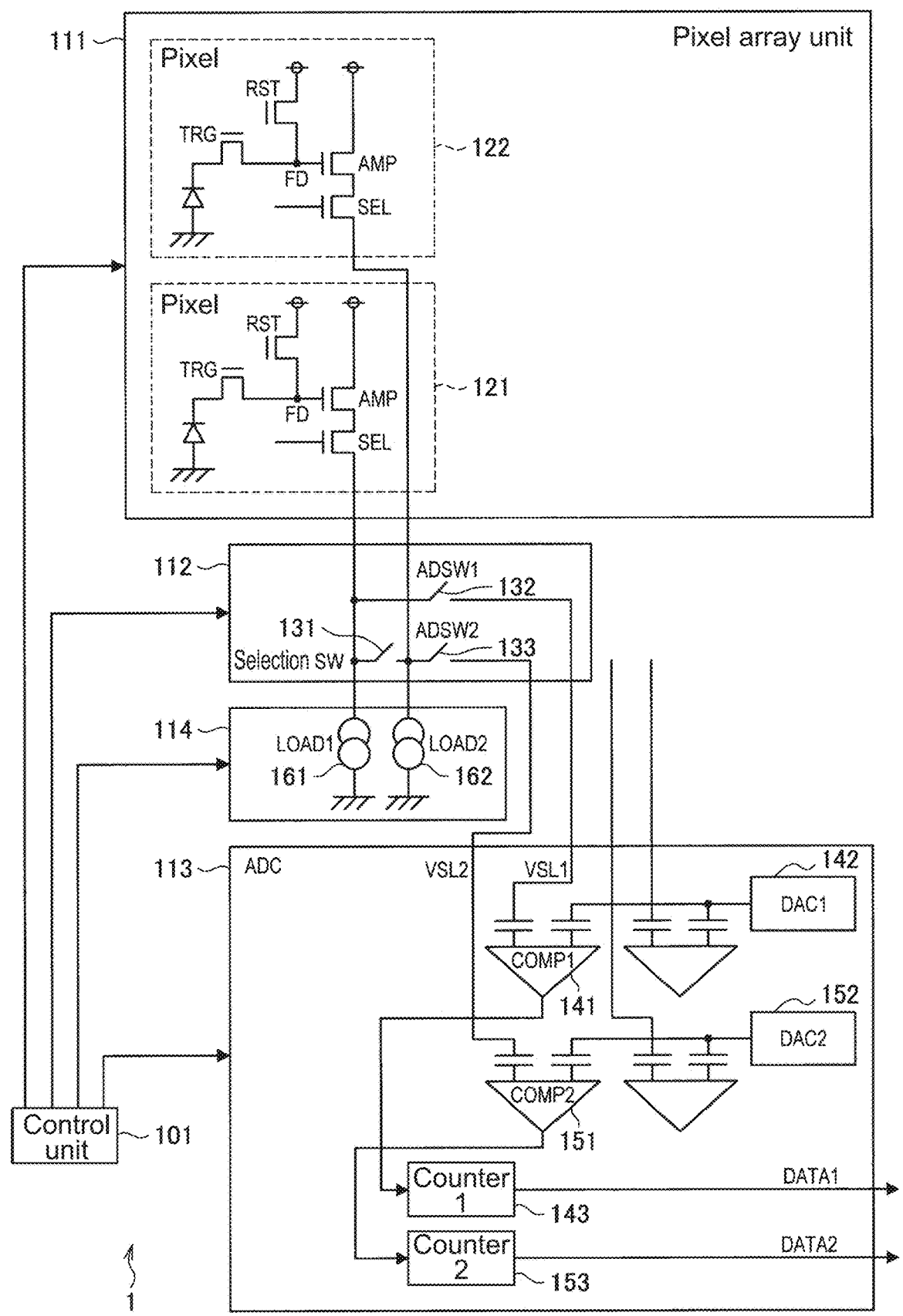
FIG. 3 is a block diagram showing an example of a functional configuration of a part of the solid-state imaging apparatus according to the embodiment of the present disclosure.

Subsequently, an example of a functional configuration of the solid-state imaging apparatus according to the embodiment of the present disclosure will be described with reference to FIG. 3. FIG. 3 is a block diagram showing an example of a functional configuration of a part of the solid-state imaging apparatus according to the embodiment of the present disclosure. The solid-state imaging apparatus 1 shown in FIG. 3 is, for example, an imaging device that images a subject and acquires digital data of the image, such as a CMOS (Complementary Metal Oxide Semiconductor) image sensor and a CCD (Charge Coupled Device) image sensor.

As shown in FIG. 3, the solid-state imaging apparatus 1 includes a control unit 101, a pixel array unit 111, a selection unit 112, an A/D conversion unit (ADC (Analog Digital Converter)) 113, and a constant current circuit unit 114.

The control unit 101 controls the respective units of the solid-state imaging apparatus 1, and causes the respective units to execute processing relating to reading of image data (pixel signal) or the like.

The pixel array unit 111 is a pixel area in which pixel configurations each including a photoelectric conversion device such as a photodiode are arranged in a matrix (array). The pixel array unit 111 is controlled by the control unit 101 to receive light of a subject in each pixel, performs photoelectrical conversion on the incident light to accumulate charges, and outputs the charges accumulated in each pixel at a predetermined timing as a pixel signal.

A pixel 121 and a pixel 122 indicate two vertically adjacent pixels in the pixel group arranged in the pixel array unit 111. The pixel 121 and the pixel 122 are pixels in consecutive rows and in the same column. In the case of the example of FIG. 3, as shown in the pixel 121 and the pixel 122, a photoelectric conversion device and four transistors are used in the circuit of each pixel. Note that the configuration of the circuit of each pixel is arbitrary, and may be other than the example shown in FIG. 3.

In a general pixel array, an output line of a pixel signal is provided for each column. In the case of the pixel array unit 111, two (two systems) output lines are provided for each column. The circuits of the pixels in one column are alternately connected to the two output lines every other row. For example, the circuits of the pixels in odd-numbered rows from the top are connected to one of the two output lines, and the circuits of the pixels in the even-numbered rows are connected to the other output line. In the case of the example of FIG. 3, the circuit of the pixel 121 is connected to a first output line (VSL1), and the circuit of the pixel 122 is connected to a second output line (VSL2).

Note that although only output lines corresponding to one column are shown in FIG. 3 for convenience of description, actually, two output lines are similarly provided for each column. To each output line, the circuit of the pixel of the column is connected every other row.

The selection unit 112 includes a switch that connects each output line of the pixel array unit 111 to an input of the ADC 113, and is controlled by the control unit 101 to control connection between the pixel array unit 111 and the ADC 113. That is, the pixel signal read from the pixel array unit 111 is supplied to the ADC 113 via this selection unit 112.

The selection unit 112 includes a switch 131, a switch 132, and a switch 133. The switch 131 (selection SW) controls connection between two output lines corresponding to the same column. For example, the first output line (VSL1) and the second output line (VSL2) are connected in the case where the switch 131 is turned on (ON), and disconnected in the case where the switch 131 is turned off (OFF).

In the solid-state imaging apparatus 1, one ADC is provided for each output line (column ADC). Therefore, assuming that the switch 132 and the switch 133 are in the on state, when the switch 131 is turned on, two output lines in the same column are connected, which means that the circuit of one pixel is connected to two ADCs. Conversely, when the switch 131 is turned off, the two output lines in the same column are disconnected, which means that the circuit of one pixel is connected to one ADC. That is, the switch 131 selects the number of ADCs (column ADCs) to which a signal of one pixel is to be output.

As described above, the switch 131 controls the number of ADCs to which a pixel signal is output, and thus, the solid-state imaging apparatus 1 is capable of outputting various pixel signals in accordance with the number of ADCs. That is, the solid-state imaging apparatus 1 is capable of realizing various data outputs.

The switch 132 controls the first output line (VSL1) corresponding to the pixel 121, and connection with the ADC corresponding to the output line. When the switch 132 is turned on (ON), the first output line is connected to one input of the comparator of the corresponding ADC. Further, when the switch 132 is turned off (OFF), they are disconnected.

The switch 133 controls connection between the second output line (VSL2) corresponding to the pixel 122 and the ADC corresponding to the output line. When the switch 133 is turned on (ON), the second output line is connected to one input of the comparator of the corresponding ADC. Further, when the switch 133 is turned off (OFF), they are disconnected.

The selection unit 112 is capable of controlling, by switching the states of the switch 131 to the switch 133 in accordance with the control of the control unit 101, the number of ADCs (column ADCs) to which a signal of one pixel is output.

Note that (any one of or both) the switch 132 and the switch 133 may be omitted, and each output line and the ADC corresponding to the output line may be constantly connected. However, by making it possible to control the connection and disconnection thereof by these switches, the range of selection of the number of ADCs (column ADCs) to which a signal of one pixel is output is expanded. That is, by providing these switches, the solid-state imaging apparatus 1 is capable of outputting more various pixel signals.

Note that although only a configuration for the output line corresponding to one column is shown in FIG. 3, actually, the selection unit 112 has, for each column, a configuration a configuration (the switch 131 to the switch 133) similar to that shown in FIG. 3. That is, the selection unit 112 performs connection control similar to that described above, for each column in accordance with the control of the control unit 101.

The ADC 113 performs A/D conversion on the pixel signal to be supplied from the pixel array unit 111 via each output line, and outputs it as digital data. The ADC 113 includes an ADC (column ADC) for each output line from the pixel array unit 111. That is, the ADC 113 includes a plurality of column ADCs. The column ADC corresponding to one output line is a single slope ADC including a comparator, a D/A convertor (DAC), and a counter.

The comparator compares the signal value (potential) of the pixel signal supplied via the vertical signal line VSL and the potential of the ramp wave supplied from the DAC, and outputs an inversion pulse that is inverted at a timing when the potentials cross. The counter counts the AD period corresponding to the timing when the potential of the pixel signal and the potential of the ramp wave cross in order to convert the analog value to a digital value. The counter increments the count value (digital value) until the signal value of the pixel signal and the potential of the ramp wave supplied from the DAC are equal to each other. When the DAC output reaches the signal value, the comparator stops the counter. Then, the signals digitized by counters 1 and 2 are output to the outside of the solid-state imaging apparatus 1 from DATA1 and DATA2.

After outputting the data, the counter returns the count value to the initial value (e.g., 0) for the next A/D conversion.

The ADC 113 includes two systems of column ADCs for each column. For example, a comparator 141 (COMP1), a DAC 142 (DAC1), and a counter 143 (counter 1) are provided for the first output line (VSL1), and a comparator 151 (COMP2), a DAC 152 (DAC2), and a counter 153 (counter 2) are provided for the second output line (VSL2). Although illustration is omitted, the ADC 113 has a similar configuration for each output line of other columns.

However, among these configurations, the DAC can be shared. The sharing of the DAC is performed for each system. That is, the DACs of the same system in each column are shared as one DAC. In the case of the example of FIG. 3, the DACs corresponding to the first output line (VSL1) in each column are shared as the DAC 142, and the DACs corresponding to the second output line (VSL2) in each column are shared as the DAC 152. Note that the comparator and the counter are provided for each system of each output line.

The constant current circuit unit 114 is a constant current circuit connected to each output line, and is controlled by the control unit 101 and driven. The circuit of the constant current circuit unit 114 includes, for example, a MOS (Metal Oxide Semiconductor) transistor and the like. This circuit configuration is arbitrary. However, in FIG. 3, for convenience of description, a MOS transistor 161 (LOAD1) is provided for the first output line (VSL1), and a MOS transistor 162 (LOAD2) is provided for the second output line (VSL2).

For example, the control unit 101 receives a request from the outside such as a user, selects a reading mode, and controls the selection unit 112 to control connection to an output line. Further, the control unit 101 controls driving of a column ADC in accordance with the selected reading mode. Further, the control unit 101 controls, as necessary, driving of the constant current circuit unit 114 in addition to the column ADC, and controls driving of the pixel array unit 111, such as a reading rate and a reading timing.

That is, the control unit 101 is capable of not only controlling the selection unit 112 but also causing the respective units other than the selection unit 112 to operate in more various modes. Therefore, the solid-state imaging apparatus 1 is capable of outputting more various pixel signals.

Here, the pixels 121 and 122 shown in FIG. 3 correspond to the pixels 2 in FIG. 1. Further, the selection unit 112, the ADC 113, and the constant current circuit unit 114 corresponds to the column signal processing circuit 6 described with reference to FIG. 1. Further, the control unit 101 shown in FIG. 3 corresponds to the sensor controller 7 described with reference to FIG. 1.

Note that the numbers of respective units shown in FIG. 3 are arbitrary as long as they do not lack. For example, three or more systems of output lines may be provided for each column. Further, by increasing the number of pixel signals output from the switch 132 in parallel or the number of switches 132 shown in FIG. 3, the number of pixel signals to be output to the outside in parallel may be increased.

Figure 4:
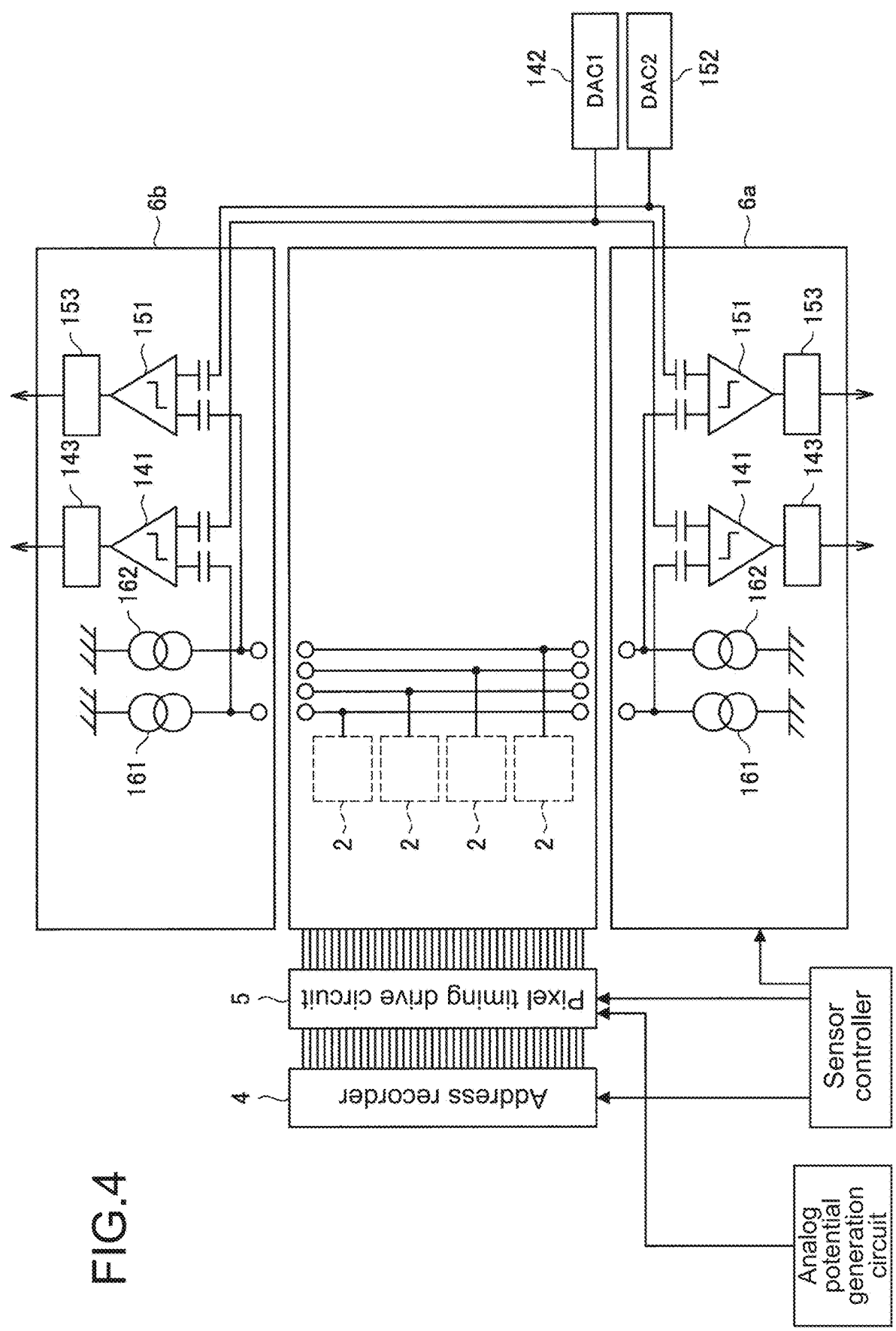
FIG. 4 is a block diagram showing another example of a functional configuration of the solid-state imaging apparatus according to the embodiment of the present disclosure.

For example, FIG. 4 is a block diagram showing another example of a functional configuration of the solid-state imaging apparatus according to the embodiment of the present disclosure. In FIG. 4, reference symbols 6a and 6b each indicate a configuration corresponding to the column signal processing circuit 6 described with reference to FIG. 1. That is, in the example shown in FIG. 4, a plurality of systems of configurations (e.g., the comparators 141 and 151, the counters 143 and 153, and the constant current circuit unit 114) corresponding to the column signal processing circuit 6 are provided. Further, as shown in FIG. 4, the DAC 142 and 152 may be shared between the column signal processing circuits 6a and 6b.

Figure 5:
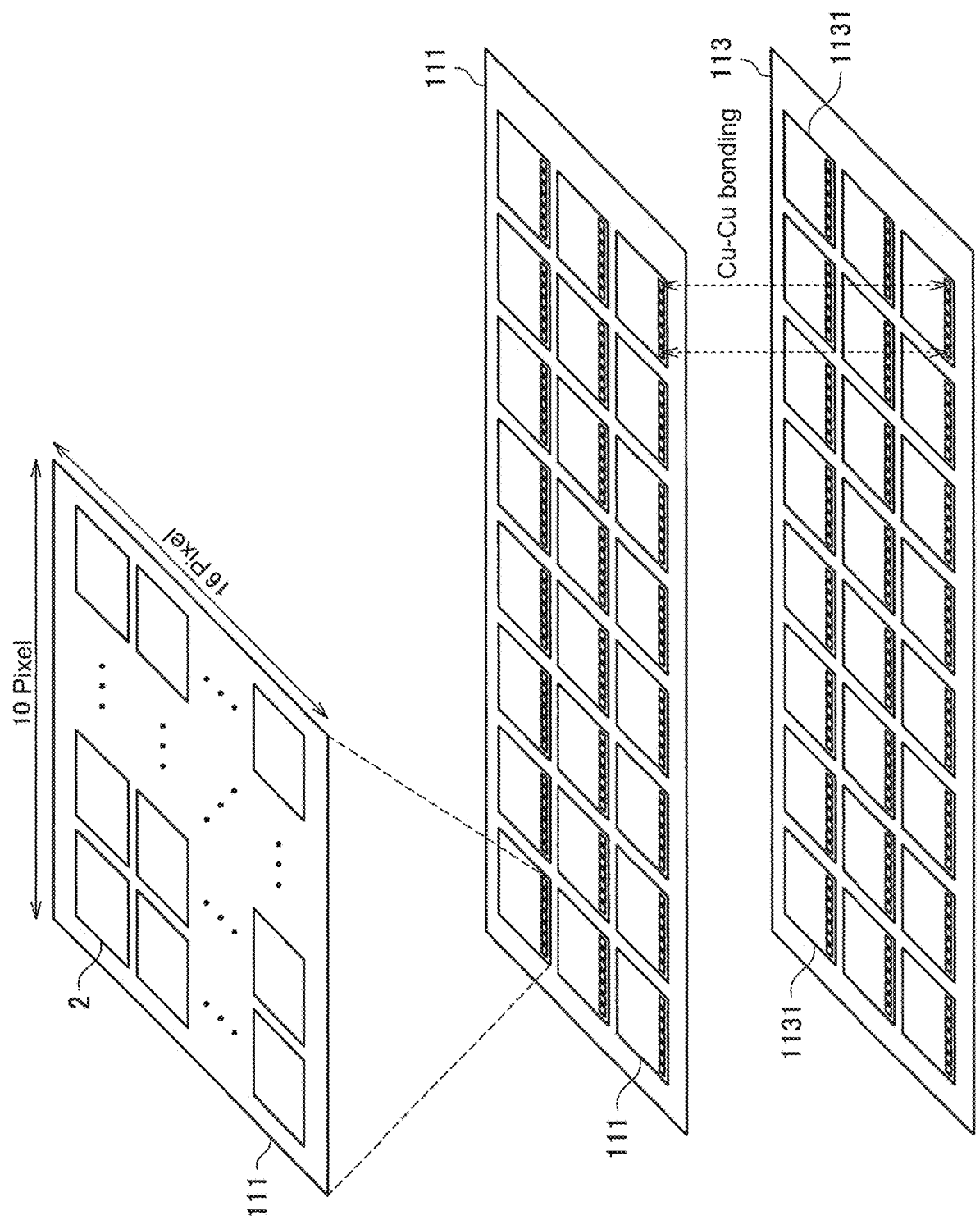
FIG. 5 is a diagram showing another example of a configuration of the solid-state imaging apparatus according to the embodiment of the present disclosure.

Further, FIG. 5 is a diagram showing another example of a configuration of the solid-state imaging apparatus according to the embodiment of the present disclosure. In the example shown in FIG. 5, an example of a case where the pixel array unit 111 in which the plurality of pixels 2 is arranged is provided on the upper semiconductor chip and the ADC 113 is provided on the lower chip in a stacked-type solid-state imaging apparatus is shown. Further, in the example shown in FIG. 5, the pixel array unit 111 is divided into a plurality of areas 1111 each including the plurality of pixels 2, and the ADC 1131 is provided for each area 1111. As a more specific example, in the example shown in FIG. 5, the pixel array unit 111 is divided into the plurality of areas 1111 with 10 pixels×16 pixels as a unit of the area 1111.

Further, the semiconductor chips are stacked to electrically connect the respective pixels 2 included in the area 1111 and the ADC 1131 provided corresponding to the area 1111. As a specific example, the wiring connected to each pixel 2 included in the area 1111 and the wiring connected to the ADC 1131 provided corresponding to the area may be directly bonded on the basis of so-called Cu—Cu bonding or connected by so-called TSV (Through-Silicon Via).

As described above, by providing the ADC 1131 for each area 1111, it is possible to increase the number of processes of performing, in parallel, A/D conversion on the pixel signal from each pixel 2 and outputting it as digital data, for example, as compared with the case where the ADC 113 is provided for each column. Therefore, it is possible to further reduce the time for reading the pixel signal from each pixel 2, for example. Further, it is also possible to individually drive the ADC 1131 for each area 1111 independently. Therefore, for example, it is also possible to more flexibly control reading of the pixel signal from each pixel 2, e.g., individually read the pixel signal from each pixel 2 included in a part of the area 1111 at a desired timing.

Further, a part of the configurations described with reference to FIG. 3 may be provided outside the solid-state imaging apparatus 1. As a specific example, a configuration that plays a role of at least a part of functions of the control unit 101 shown in FIG. 3 may transmit a control signal from the outside of the solid-state imaging apparatus 1 to each configuration in the solid-state imaging apparatus 1 to control the operation of the configuration. The configuration corresponding to the control unit 101 in this case corresponds to an example of the "control apparatus".

An example of a functional configuration of a solid-state imaging apparatus according to an embodiment of the present disclosure has been described above with reference to FIG. 3 to FIG. 5.

1.3. Circuit Configuration of Unit Pixel

Figure 6:
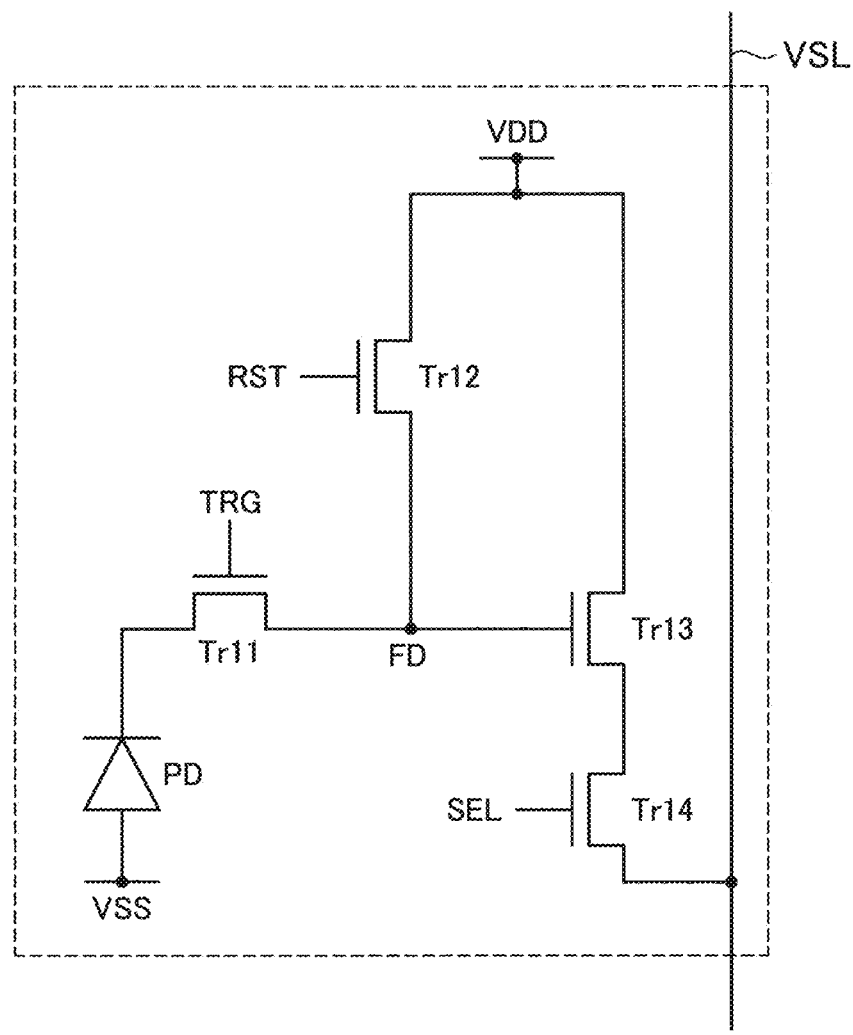
FIG. 6 is a diagram showing an example of a circuit configuration of a unit pixel according to the embodiment of the present disclosure.

Subsequently, an example of a circuit configuration of a unit pixel will be described with reference to FIG. 6. FIG. 6 is a diagram showing an example of a circuit configuration of a unit pixel according to an embodiment of the present disclosure. As shown in FIG. 6, a unit pixel 2 according to an embodiment of the present disclosure includes a photoelectric conversion device (e.g., photodiode) PD and four pixel transistors. The four pixel transistors include, for example, a transfer transistor Tr11, a reset transistor Tr12, an amplification transistor Tr13, and a selection transistor Tr14. These pixel transistors can include, for example, n-channel MOS transistors.

The transfer transistor Tr11 is connected between a cathode of the photoelectric conversion device PD and a floating diffusion unit FD. Signal charges (here, electrons) photoelectrically converted by the photoelectric conversion device PD and accumulated here are transferred to the floating diffusion unit FD by applying a transfer pulse TRG to the gate.

A drain of the reset transistor Tr12 is connected to a power source VDD, and a source of the reset transistor Tr12 is connected to the floating diffusion unit FD. Then, prior to the transfer of the signal charges from the photoelectric conversion device PD to the floating diffusion unit FD, a reset pulse RST is applied to the gate to reset the potential of the floating diffusion unit FD.

A gate of the amplification transistor Tr13 is connected to the floating diffusion unit FD, a drain thereof is connected to the power source VDD, and a source thereof is connected to a drain of the selection transistor Tr14. The amplification transistor Tr13 outputs the potential of the floating diffusion unit FD that has been reset by the reset transistor Tr12 to the selection transistor Tr14 as a reset level. Further, the amplification transistor Tr13 outputs, to the selection transistor Tr14 as a signal level, the potential of the floating diffusion unit FD after the signal charges are transferred by the transfer transistor Tr11.

For example, the drain of the selection transistor Tr14 is connected to the source of the amplification transistor Tr13, and a source of the selection transistor Tr14 is connected to the vertical signal line VSL. Then, it is turned on when a selection pulse SEL is applied to a gate of the selection transistor Tr14, and outputs the signal output from the amplification transistor Tr13 to the vertical signal line VSL. Note that the selection transistor Tr14 may employ a configuration in which it is connected between the power source VDD and the amplification transistor Tr13.

In the case where the solid-state imaging apparatus 1 according to this embodiment is configured as a stacked-type solid-state imaging apparatus, for example, devices such as a photodiode and a plurality of MOS transistors are formed in the first semiconductor chip unit 341 in the middle or lower part of FIG. 2. Further, the transfer pulse, the reset pulse, the selection pulse, and the power source voltage are supplied from the second semiconductor chip unit 342 in the middle or lower part of FIG. 2. Further, devices at the subsequent stages from the vertical signal line VSL connected to the drain of the selection transistor are configured as the logic circuit 345, and formed in the second semiconductor chip unit 342.

An example of a circuit configuration of a unit pixel has been described above with reference to FIG. 6.

1.4. Drive Control

Subsequently, as an example of drive control of the solid-state imaging apparatus 1 according to the embodiment of the present disclosure, driving of a pixel and driving of an ADC that converts the pixel signal supplied from the pixel into a digital signal will be described.

(Driving of Pixel)

Figure 7:
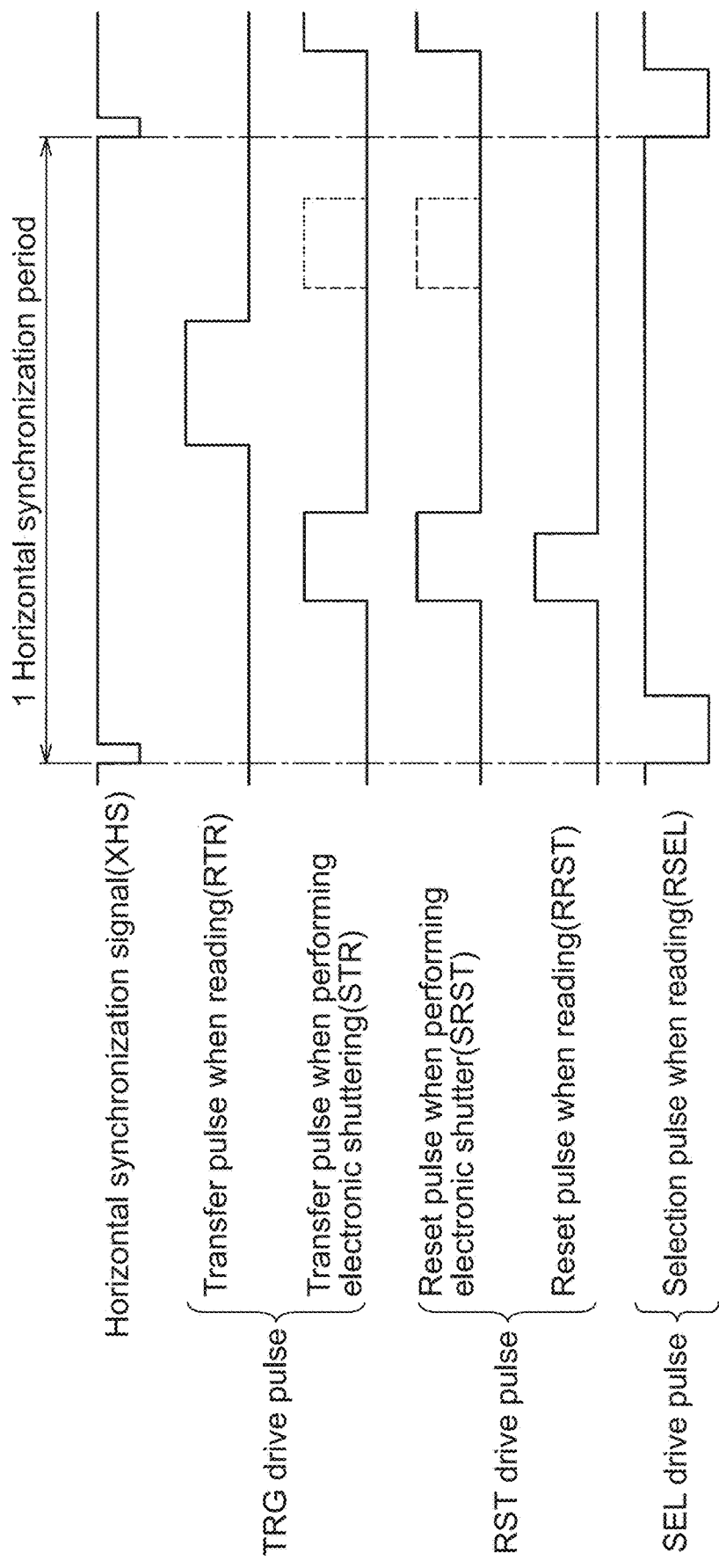
FIG. 7 is a schematic timing chart showing an example of drive control of the solid-state imaging apparatus according to the embodiment of the present disclosure.

First, driving of the pixel 2 will be described with reference to FIG. 7. FIG. 7 is a schematic timing chart showing an example of drive control of the solid-state imaging apparatus 1 according to the embodiment of the present disclosure, and shows an example of drive control of the pixel 2.

In FIG. 7, a horizontal synchronization signal (XHS) that indicates one horizontal synchronization period, a TRG drive pulse that drives the transfer transistor Tr11 (a transfer pulse when reading and a transfer pulse when performing electronic shuttering), an RST drive pulse that drives the reset transistor Tr12 (a reset pulse when performing electronic shuttering and a reset pulse when reading), and a SEL drive pulse that drives the selection transistor Tr14 (selection pulse when reading) are shown.

During the electronic shuttering, the transfer pulse when performing electronic shuttering and the reset pulse when performing electronic shuttering are turned on to reset the potential of the photoelectric conversion device PD. After that, charges are accumulated in the photoelectric conversion device PD during the accumulation time, and a reading pulse is issued from the sensor controller 7.

At the time of reading, the reset pulse when reading is turned on to reset the potential of the floating diffusion unit FD, and then, AD conversion is performed on the potential of a pre-data phase (P phase). After that, with the transfer pulse when reading, the charges of the photoelectric conversion device PD are transferred to the floating diffusion unit FD, and AD conversion is performed on a data phase (D phase). Note that at the time of reading, the selection pulse when reading is in the on state.

Note that the above is merely an example, and at least a part of the driving timing may be changed in accordance with the operation of the electronic shuttering or reading. As a specific example, as shown by the broken line in FIG. 7, the charges of the photoelectric conversion device PD may be transferred to the floating diffusion unit with the transfer pulse when reading, and then, the transfer pulse when performing electronic shuttering and the reset pulse when performing electronic shuttering may be turned on to reset the potential of the photoelectric conversion device PD.

The driving of the pixel 2 has been described above with reference to FIG. 7.

Figure 8:
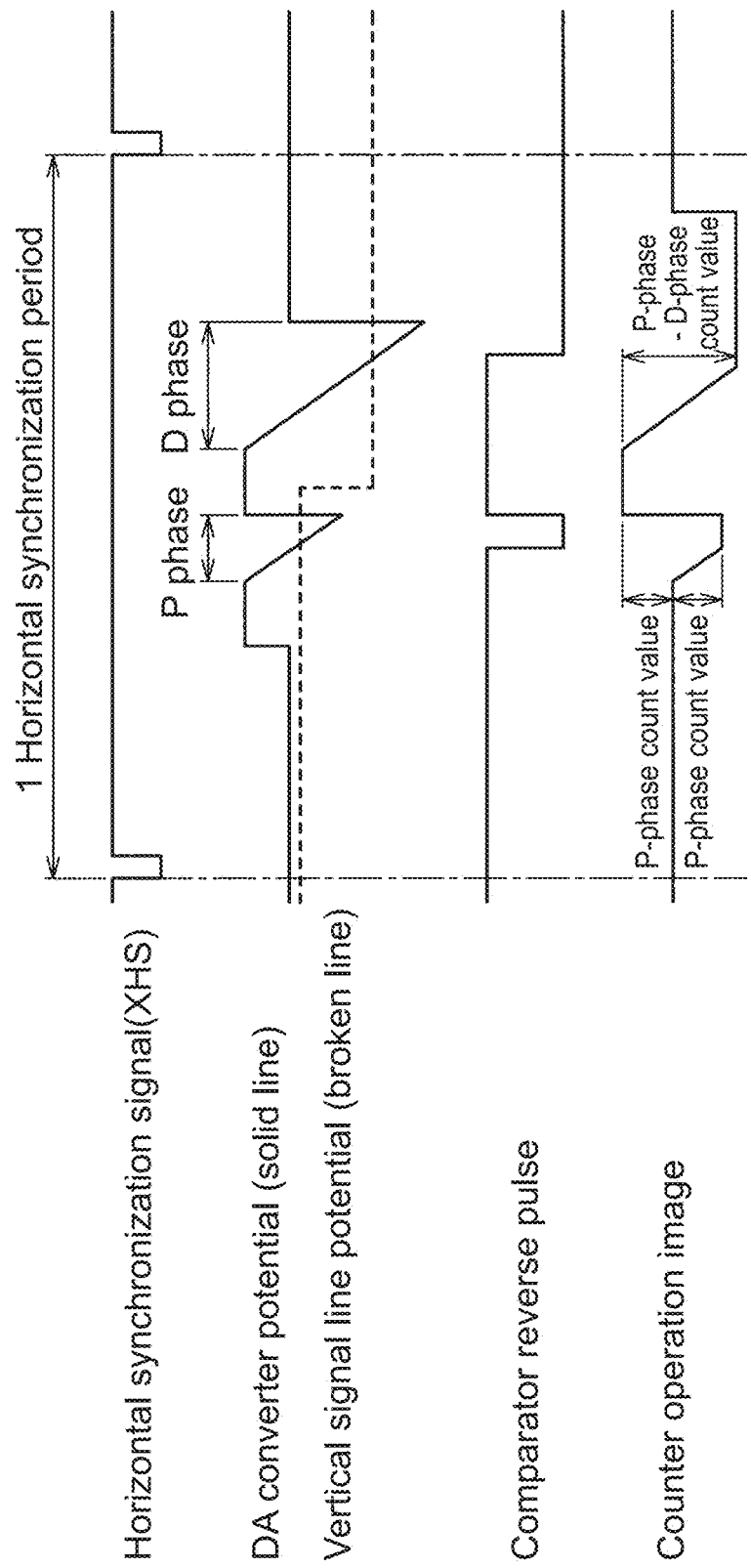
FIG. 8 is a schematic timing chart showing an example of drive control of the solid-state imaging apparatus according to the embodiment of the present disclosure.

Subsequently, general driving of the ADC 113 shown in FIG. 3 will be described with reference to FIG. 8. FIG. 8 is a schematic timing chart showing an example of drive control of the solid-state imaging apparatus 1 according to the embodiment of the present disclosure, and shows an example of drive control of the ADC 113. Note that in this description, driving of the ADC 113 shown in FIG. 3 will be described focusing on the operations of the DAC 142, the comparator 141, and the counter 143 in the ADC 113.

In FIG. 8, the horizontal synchronization signal (XHS) indicating one horizontal synchronization period, a potential (solid line) of a ramp signal output from the DAC 142, a potential (broken line) of a pixel signal output from the vertical signal line VSL, an inversion pulse output from the comparator 141, and an operation image of the counter 143 are shown.

In general, the DAC 142 generates a ramp wave having a first slope in which the potential sequentially drops with a constant slope in the P phase for reading the reset level of a pixel signal, and a second slope in which the potential sequentially drops with a constant slope in the D phase for reading the data level of the pixel signal. Further, the comparator 141 compares the potential of the pixel signal and the potential of the ramp wave, and outputs an inversion pulse that is inverted at a timing when the potential of the pixel signal and the potential of the ramp wave cross. Then, the counter 143 performs counting (P-phase count value) from the timing when the ramp wave starts dropping in the P phase to the timing when the potential of the ramp wave falls equal to or less than the potential of the pixel signal, and then, performs counting (D-phase count value) from the timing when the ramp wave starts dropping in the D phase to the timing when the potential of the ramp wave falls equal to or less than the potential of the pixel signal. Thus, the difference between the P-phase count value and the D-phase count value is acquired as a pixel signal from which reset noise has been removed. In this way, AD conversion of the pixel signal is performed using the ramp wave.

The general driving of the ADC 113 shown in FIG. 3 has been described above with reference to FIG. 8.

2. First Embodiment

Subsequently, a first embodiment of the present disclosure will be described. In this embodiment, an example of the mechanism that makes it possible to detect failure of the photoelectric conversion device PD by recognizing the state (e.g., saturation characteristics) of the photoelectric conversion device PD included in each pixel 2 of the solid-state imaging apparatus 1 will be described. Note that in the following description, in order to distinguish the solid-state imaging apparatus 1 according to this embodiment from the solid-state imaging apparatus 1 according to another embodiment, the solid-state imaging apparatus 1 according to this embodiment is referred to as "solid-state imaging apparatus 1a" in some cases.

2.1. Configuration

Figure 9:
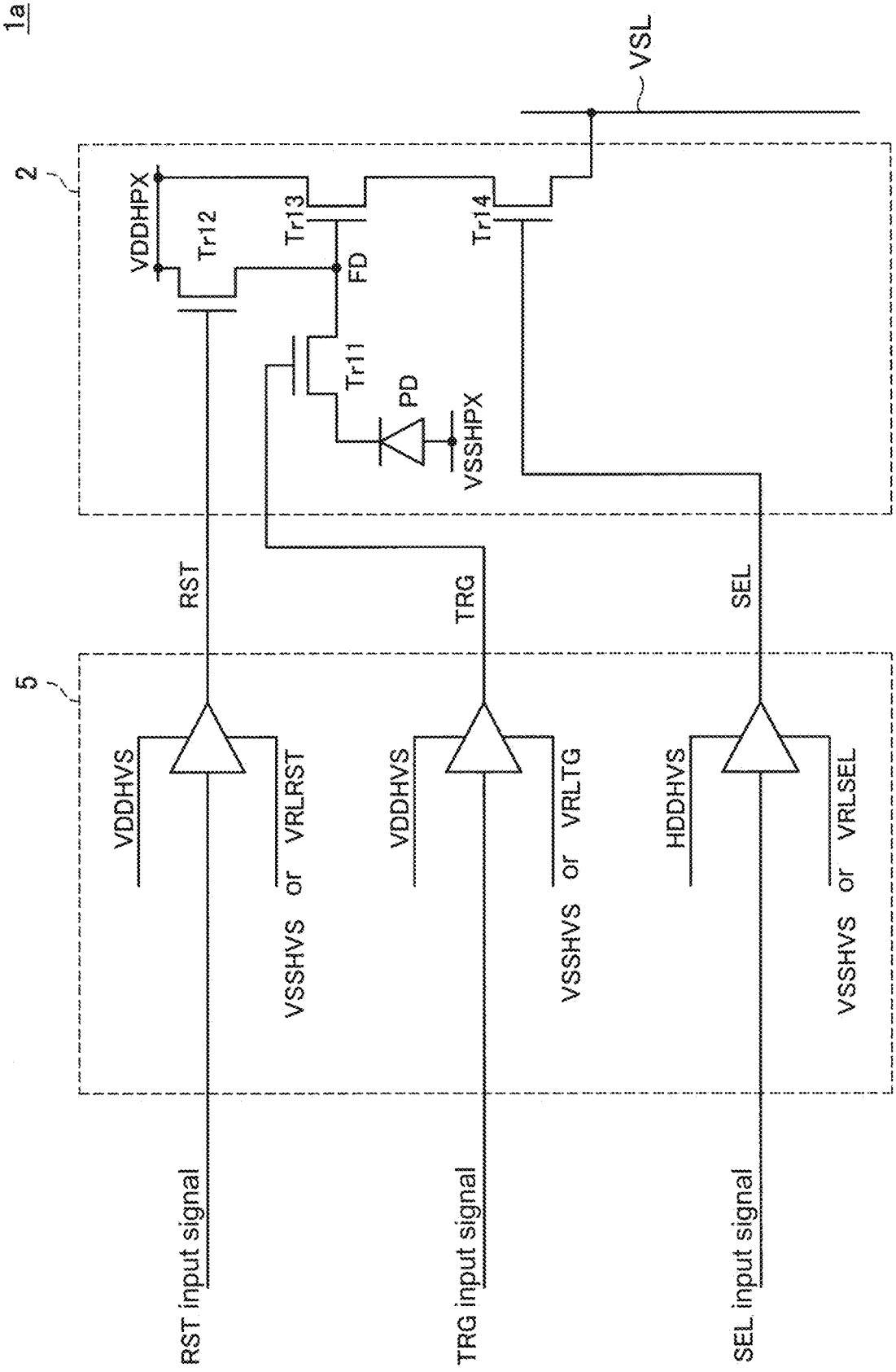
FIG. 9 is a block diagram showing an example of a schematic configuration of a solid-state imaging apparatus according to a first embodiment of the present disclosure.
Figure 10:
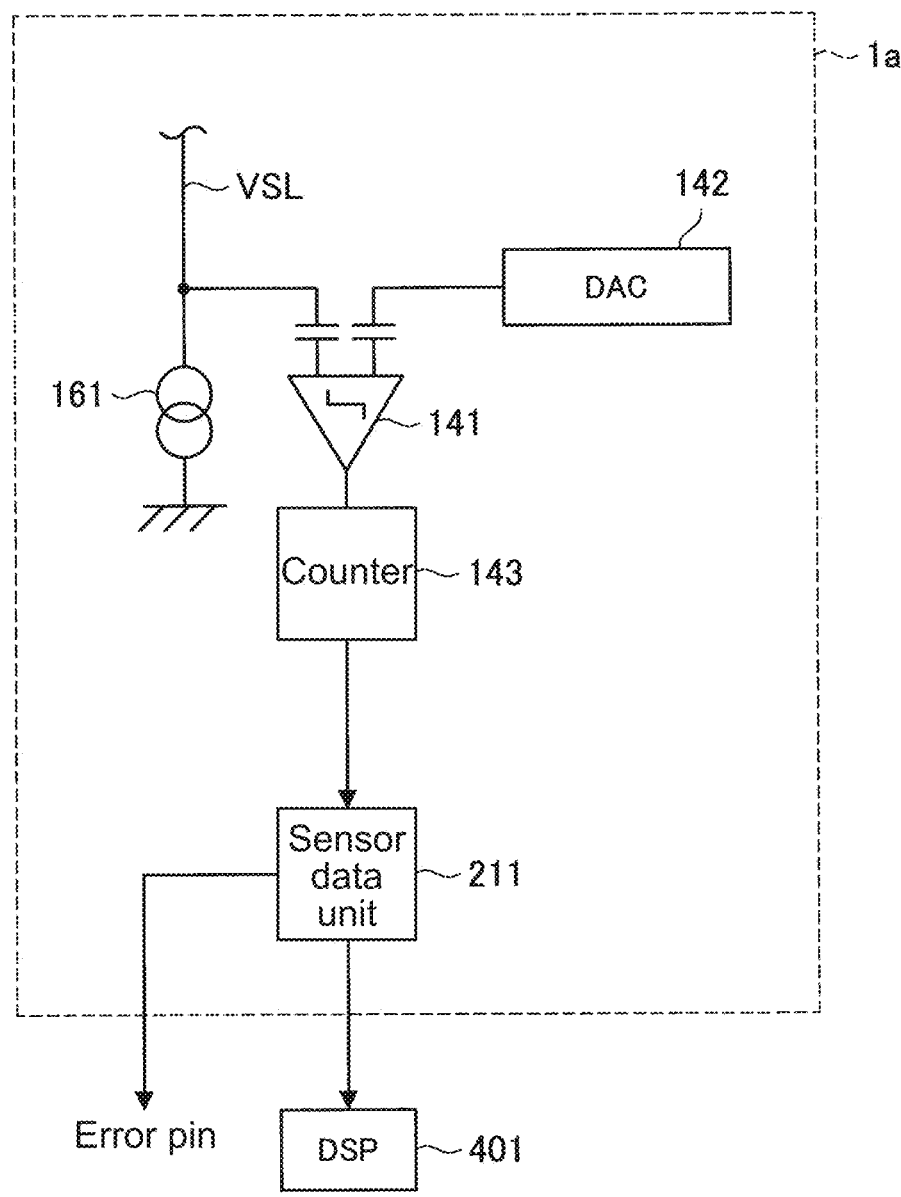
FIG. 10 is a block diagram showing an example of a schematic configuration of the solid-state imaging apparatus according to the embodiment.

First, an example of a schematic configuration of the solid-state imaging apparatus 1a according to this embodiment will be described with reference to FIG. 9 and FIG. 10. FIG. 9 and FIG. 10 are each a block diagram showing an example of a schematic configuration of the solid-state imaging apparatus 1a according to this embodiment. Note that in this description, the configuration of the solid-state imaging apparatus 1a will be described focusing on components different from those of the solid-state imaging apparatus 1 described with reference to FIG. 1 to FIG. 8, and detailed description of components substantially similar to those of the solid-state imaging apparatus 1 will be omitted.

FIG. 9 shows an example of a power source configuration of the solid-state imaging apparatus 1 according to this embodiment. Note that in the example shown in FIG. 9, a configuration of a part where the pixel timing drive circuit 5 supplies a drive signal to the pixel 2 is mainly shown, and illustration of other configurations is omitted.

As shown in FIG. 9, in the solid-state imaging apparatus 1a according to this embodiment, a power source that supplies a power source voltage to the pixel 2 and a power source that supplies a power source voltage to the pixel timing drive circuit 5 to cause the pixel timing drive circuit 5 to supply a drive signal to the pixel 2 are separately provided. In this regard, hereinafter, the power source that supplies the power source voltage to the pixel 2 will be referred to also as the "power source VDDHPX", and the power source that supplies the power source voltage to the pixel timing drive circuit 5 (i.e., power source voltage for supplying a drive signal to the pixel 2) will be referred to also as the "power source VDDHVS".

Note that in the case where the solid-state imaging apparatus 1a is configured as a stacked-type solid-state imaging apparatus, the power sources VDDHPX and VDDHVS may be provided in different semiconductor chips. As a specific example, the power source VDDHPX may be provided in a semiconductor chip (e.g., the first semiconductor chip unit 341 shown in FIG. 2) in which the pixels 2 are arranged. Further, the power source VDDHVS may be provided in the semiconductor chip (e.g., the second semiconductor chip unit 342 shown in FIG. 2) in which the pixel timing drive circuit 5 is provided. In this configuration, the semiconductor chip in which the pixels 2 are arranged and the semiconductor chip in which the pixel timing drive circuit 5 is provided are connected via a connection part (e.g., TSV (Through-Silicon Via)).

Further, FIG. 10 shows an example of a configuration of a part relating to reading of a pixel signal from the pixel 2 among configurations of the solid-state imaging apparatus 1a according to this embodiment. That is, in the example shown in FIG. 10, the parts corresponding to the constant current circuit unit 114 and the ADC 113 are mainly shown, and illustration of other configurations is omitted. Note that in FIG. 10, since the MOS transistor 161, the comparator 141, the DAC 142, and the counter 143 are substantially similar to the MOS transistor 161, the comparator 141, the DAC 142, and the counter 143 shown in FIG. 3, description thereof will be omitted. Further, in FIG. 10, the comparator 141, the DAC 142, and the counter 143 correspond to the part, i.e., the ADC 113 shown in FIG. 3. Further, in FIG. 10, the MOS transistor 161 corresponds to the part, i.e., the constant current circuit unit 114 in FIG. 3.

As shown in FIG. 10, the solid-state imaging apparatus 1a according to this embodiment includes a sensor data unit 211. The sensor data unit 211 recognizes, on the basis of the signal output from the counter 143, i.e., the digital signal obtained by converting the pixel signal supplied from the pixel 2, the state of the pixel 2, and executes various types of processing using the recognition result.

As a specific example, the sensor data unit 211 may perform various types of processing according to so-called failure detection by using the recognition result of the state of the pixel 2. In particular, in the solid-state imaging apparatus 1a according to this embodiment, the sensor data unit 211 is capable of recognizing, in the case where a failure occurs in the photoelectric conversion device PD included in the pixel 2, the failure in the photoelectric conversion device PD for each pixel 2 individually. Note that details of the mechanism for detecting, for each pixel 2, the failure in the photoelectric conversion device PD included in the pixel 2 will be separately described below together with an example of drive control for recognizing the state of the pixel 2. Further, the part according to recognition of the pixel 2 among the sensor data unit 211 corresponds to an example of the "recognition unit".

Further, the sensor data unit 211 may notify, in the case of detecting that abnormality occurs in a part of the pixels 2 as the result of the above-mentioned failure detection, the outside of the solid-state imaging apparatus 1*a* of the detection result of the abnormality. As a specific example, the sensor data unit 211 may output a predetermined signal indicating that abnormality has been detected to the outside of the solid-state imaging apparatus 1*a* via a predetermined output terminal (i.e., Error pin). Further, as another example, a predetermined DSP (Digital Signal Processor) 401 provided outside the solid-state imaging apparatus 1*a* may be notified of that abnormality has been detected. With such a configuration, the DSP 401 is capable of informing, via a predetermined output unit, a user of that abnormality has occurred in the solid-state imaging apparatus 1*a*, for example. Further, in the case where abnormality has been detected in the solid-state imaging apparatus 1*a*, the DSP 401 may perform control to restrict all or a part of functions relating to security of the vehicle (ADAS function). Further, as another example, the DSP 401 is capable of correcting, by using the output of another pixel 2 (e.g., adjacent pixel) different from the pixel 2, the output of the pixel 2 in which abnormality has been detected. Note that the part among the sensor data unit 211, which performs control so that the detection result of abnormality of the pixel 2 is output to a predetermined output destination (e.g., the DSP 401) corresponds to an example of the "output control unit".

Further, the sensor data unit 211 itself may correct, by using the result of failure detection, the output the pixel 2 from which abnormality has been detected. Note that the correction method is similar to that in the case where the DSP 401 performs the correction. Further, a part among the sensor data unit 211, which corrects the output of the pixel 2 from which abnormality has been detected, corresponds to an example of the "correction processing unit".

An example of a schematic configuration of the solid-state imaging apparatus 1*a* according to this embodiment has been described above with reference to FIG. 9 and FIG. 10.

2.2. Drive Control>

Subsequently, as an example of drive control of the solid-state imaging apparatus 1*a* according to this embodiment, in particular, an example of control for recognizing the state of the photoelectric conversion device PD included in each pixel 2 and consequently, detecting abnormality of the photoelectric conversion device PD will be described. Note that in this description, as shown in FIG. 6, an example of drive control of the solid-state imaging apparatus 1*a* will be described by taking the case where the pixel 2 has a so-called four-transistor configuration as an example. For example, FIG. 11 is a schematic timing chart showing an example of drive control of the solid-state imaging apparatus 1*a* according to this embodiment, and shows an example of control for recognizing the state of the photoelectric conversion device PD included in the pixel 2.

Figure 11:
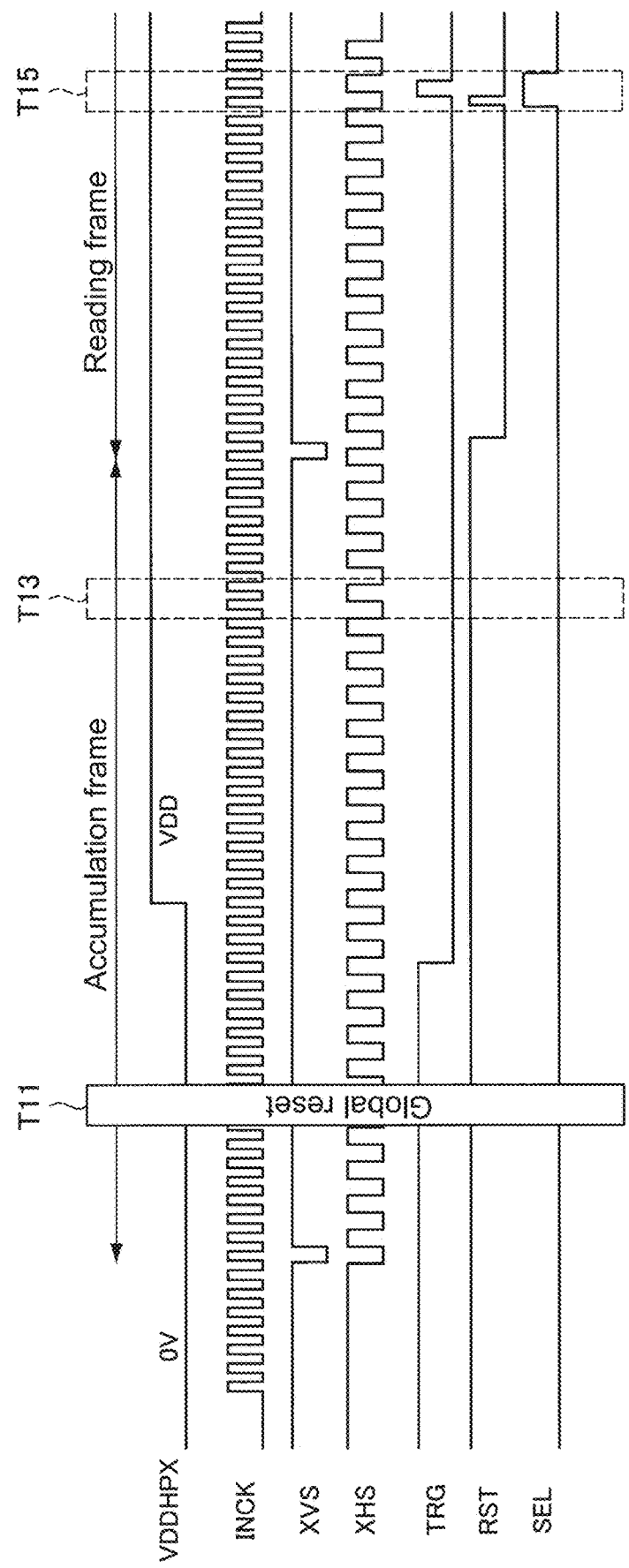
FIG. 11 is a schematic timing chart showing an example of drive control of the solid-state imaging apparatus according to the embodiment.

In FIG. 11, VDDHPX indicates a power source voltage applied to the pixel 2 from the power source VDDHPX. Further, INCK indicates a synchronization signal, and one pulse of the synchronization signal is the minimum unit of the period of various types of processing executed in the solid-state imaging apparatus 1*a*. Further, XVS and XHS respectively represent a vertical synchronization signal and a horizontal synchronization signal. That is, one XVS corresponds to one frame period. Further, TRG, RST, and SEL respectively indicate drive signals (i.e., the TRG drive pulse, the RST drive pulse, and the SEL drive pulse) supplied to the transfer transistor Tr11, the reset transistor Tr12, and the selection transistor Tr14.

In the solid-state imaging apparatus 1*a* according to this embodiment, the control according to recognition of the state of the photoelectric conversion device PD includes mainly first control for accumulating charges in the photoelectric conversion device PD of the target pixel 2, and second control for reading the charges accumulated in the photoelectric conversion device PD. For example, in the example shown in FIG. 11, one frame period is assigned to each of the first control and the second control. In this regard, in this description, as shown in FIG. 11, the frame period assigned to the first control is referred to also as "accumulation frame", and the frame period assigned to the second control is referred to also as "reading frame".

First, the accumulation frame will be described. As shown in FIG. 11, in the accumulation frame, a power source voltage to be applied from the power source VDDHPX to the pixel 2 is controlled to 0 V first, and then, the power source voltage is controlled to a predetermined voltage VDD, thereby applying the voltage VDD to the pixel 2.

Figure 12:
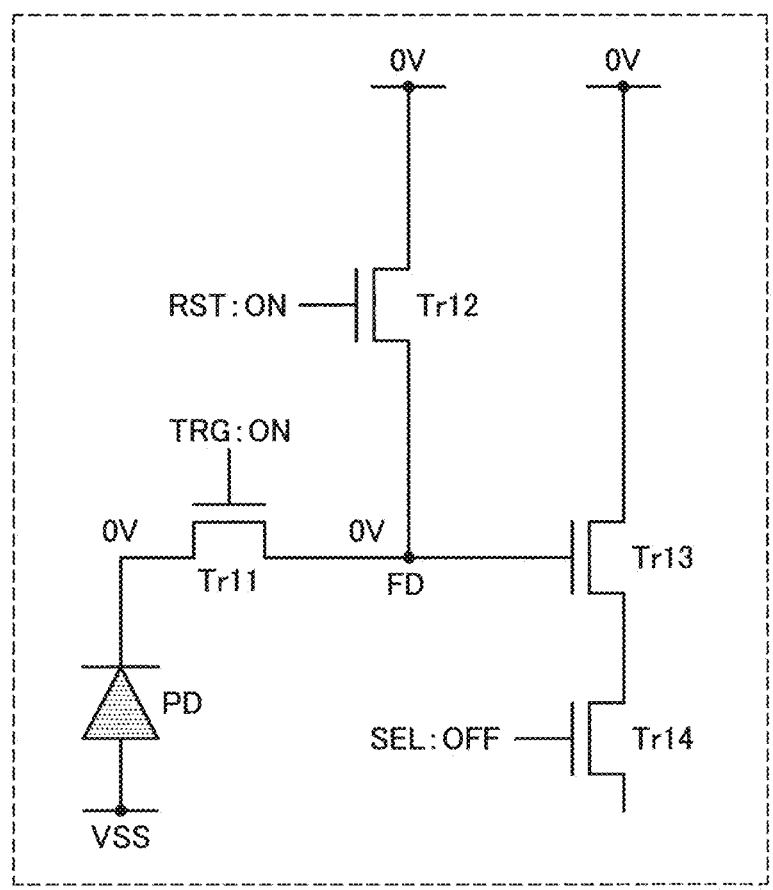
FIG. 12 is an explanatory diagram describing an example of drive control of the solid-state imaging apparatus according to the embodiment.

Now, the operation of the pixel 2 in the period indicated by a reference symbol T11 in FIG. 11 will be described with reference to FIG. 12. FIG. 12 is an explanatory diagram describing an example of drive control of the solid-state imaging apparatus 1*a* according to this embodiment, and schematically shows the state of the pixel 2 in the period T11 in FIG. 11.

As shown in FIG. 11, in the period T11, the TRG drive pulse and the RST drive pulse are each controlled to be in the on state, the SEL drive pulse is controlled to be in the off state, and the voltage to be applied from the power source VDDHPX to the pixel 2 is controlled to 0 V. As a result, as shown in FIG. 12, the potential of the floating diffusion unit FD is controlled to 0 V, a potential difference is generated between an anode and cathode of the photoelectric conversion device PD, and thus, charges are injected into the photoelectric conversion device PD. Note that the amount of charges held in the photoelectric conversion device PD as the result of control shown in FIG. 12 is determined by the saturation characteristics of the photoelectric conversion device PD regardless of the light reception state of the photoelectric conversion device PD. That is, in the case where some abnormality occurs in the photoelectric conversion device PD, the amount of charges held in the photoelectric conversion device PD changes (e.g., decreases) as compared with that in the normal state. Note that as shown in FIG. 12, the control for injecting charges into the photoelectric conversion device PD may be executed for all the pixels 2 at a predetermined timing (so-called global reset), or executed individually for each pixel 2 in time division.

Figure 13:
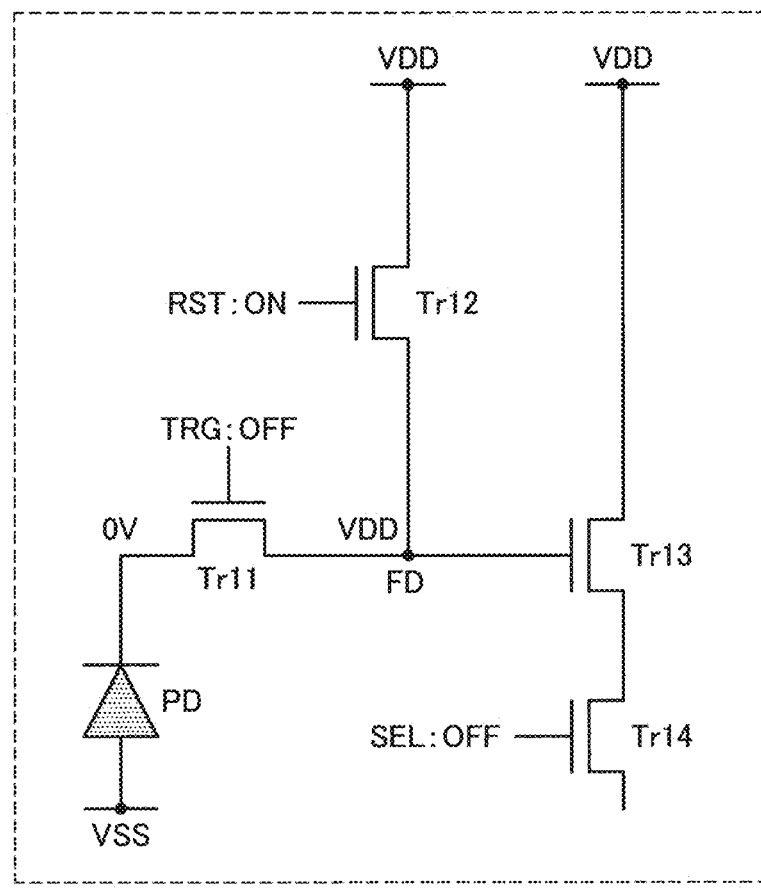
FIG. 13 is an explanatory diagram describing an example of drive control of the solid-state imaging apparatus according to the embodiment.

Subsequently, the operation of the pixel 2 in the period indicated by a reference symbol T13 in FIG. 11 will be described with reference to FIG. 13. FIG. 13 is an explanatory diagram describing an example of drive control of the solid-state imaging apparatus 1a according to the embodiment, and schematically shows the state of the pixel 2 in the period T13 in FIG. 11.

As shown in FIG. 11, in the period T13, the on state of the RST drive pulse is maintained, and the TRG drive pulse is controlled to be the off state. Note that the off state of the SEL drive pulse is maintained. Further, the voltage to be applied from the power source VDDHPX to the pixel 2 is controlled to VDD. With such control, as shown in FIG. 13, the floating diffusion unit FD and the photoelectric conversion device PD are brought into a non-conductive state, and the potential of the floating diffusion unit FD is controlled to VDD.

Figure 14:
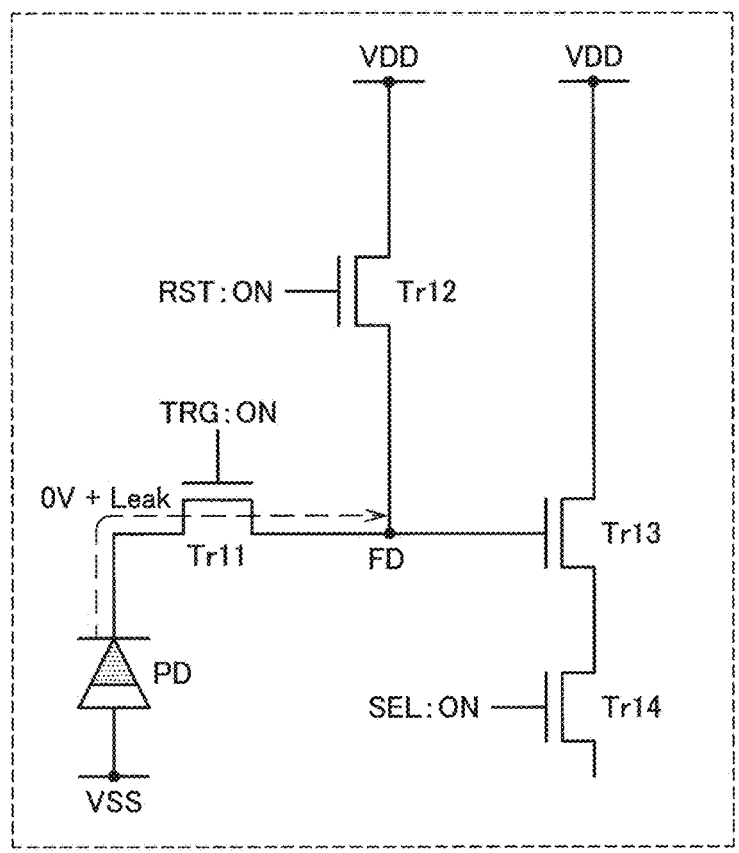
FIG. 14 is an explanatory diagram describing an example of drive control of the solid-state imaging apparatus according to the embodiment.

Subsequently, the reading frame will be described. In the reading frame, the target pixel 2 is drive at a predetermined timing, and a pixel signal corresponding to the charges accumulated in the photoelectric conversion device PD in the pixel 2 is read. As a specific example, in the example shown in FIG. 11, in the period indicated by a reference symbol T15, the pixel 2 is driven and a pixel signal corresponding to the charges accumulated in the photoelectric conversion device PD of the pixel 2 is read. Now, the operation of the pixel 2 in the period indicated by the reference symbol T15 in FIG. 11 will be described with reference to FIG. 14. FIG. 14 is an explanatory diagram describing an example of drive control of the solid-state imaging apparatus 1a according to this embodiment, and schematically shows the state of the pixel 2 in the period T15 in FIG. 11.

As shown in FIG. 11, at the start of the reading frame, the TRG drive pulse, the RST drive pulse, and the SEL drive pulse are each controlled to be the off state. Further, in the reading frame, the state where the voltage VDD is applied to the pixel 2 is maintained. Subsequently, in the period T15, the TRG drive pulse, the RST drive pulse, and the SEL drive pulse are each controlled to the on state. With such control, in the period T15, as shown in FIG. 14, the transfer transistor Tr11 and the reset transistor Tr12 are brought into the conductive state, and the charges accumulated in the photoelectric conversion device PD are transferred to the floating diffusion unit FD and accumulated in the floating diffusion unit FD. Further, the selection transistor Tr14 is controlled to be the conductive state. Therefore, the voltage according to the charges accumulated in the floating diffusion unit FD (in other words, the charges leaked from the photoelectric conversion device PD) is applied to the gate of the amplification transistor Tr13, and the amplification transistor Tr13 is controlled to be the conductive state. As a result, the pixel signal corresponding to the voltage applied to the gate of the amplification transistor Tr13 is output from the pixel 2 via the vertical signal line VSL. That is, the charges corresponding to the saturation characteristics of the photoelectric conversion device PD are read from the photoelectric conversion device PD, and the pixel signal corresponding to the reading result of the charges is output from the pixel 2 via the vertical signal line VSL.

Note that the pixel signal output from the pixel 2 via the vertical signal line VSL is converted by the ADC 113 into a digital signal, and output to the sensor data unit 211 described with reference to FIG. 10, for example. At this time, the digital signal to be output to the sensor data unit 211 indicates the potential corresponding to the saturation characteristics of the photoelectric conversion device PD included in the pixel 2. That is, the sensor data unit 211 is capable of individually recognizing, for each of the pixels 2, the state of each of the pixels 2 (and consequently the state of the photoelectric conversion device PD included in the pixel 2) on the basis of the digital signal. Therefore, for example, in the case where abnormality occurs in the pixel 2, the sensor data unit 211 is capable of individually detecting the abnormality for each of the pixels 2. On the basis of such a configuration, for example, the sensor data unit 211 is capable of outputting, to a predetermined output destination, information relating to the pixel 2 in which abnormality has occurred.

Figure 15:
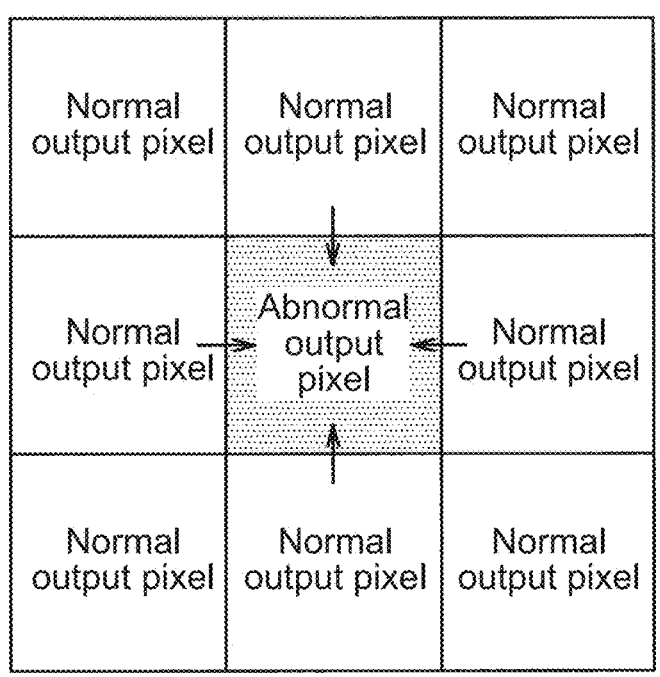
FIG. 15 is an explanatory diagram describing an example of an operation according to correction of a pixel signal in the solid-state imaging apparatus according to the embodiment.

Further, as another example, the sensor data unit 211 may correct the pixel signal to be output from the pixel 2 in which abnormality has occurred, on the basis of a pixel signal output from another pixel 2. For example, FIG. 15 is an explanatory diagram describing an example of an operation according to correction of a pixel signal in the solid-state imaging apparatus 1a according to this embodiment. In the example shown in FIG. 15, an example of the case where the pixel signal to be output from the pixel 2 in which abnormality has occurred is corrected on the basis of a pixel signal to be output from another pixel 2 adjacent to the pixel 2 is shown. In this case, for example, the sensor data unit 211 only needs to recognize, on the basis of the timing when the pixel signal from the pixel 2 in which abnormality has occurred is read, the position of the pixel 2 and the position of another pixel 2 adjacent to the pixel 2.

Note that the above-mentioned control (e.g., control for detecting abnormality of the photoelectric conversion device PD) according to recognition of the state of the photoelectric conversion device PD included in each of the pixels 2 is favorably executed at a timing when, for example, the target pixel 2 does not perform normal driving. As a specific example, the above-mentioned controlled may be executed at the time when the solid-state imaging apparatus 1 is activated. Further, as another example, in the case where only a part of the pixels 2 is used for capturing an image, the above-mentioned control may be executed on other pixels 2 that are not used for capturing the image.

As an example of drive control of the solid-state imaging apparatus 1a according to this embodiment, in particular, an example of control for recognizing the state of the photoelectric conversion device PD included in each of the pixels 2 and consequently, detecting abnormality of the photoelectric conversion device PD has been described above with reference to FIG. 11 to FIG. 15.

2.3. Modified Example

Subsequently, a modified example of the solid-state imaging apparatus 1 according to this embodiment will be described. In this modified example, an example of the case where the pixels 2 form a so-called shared pixel structure will be described.

(Circuit Configuration)

Figure 16:
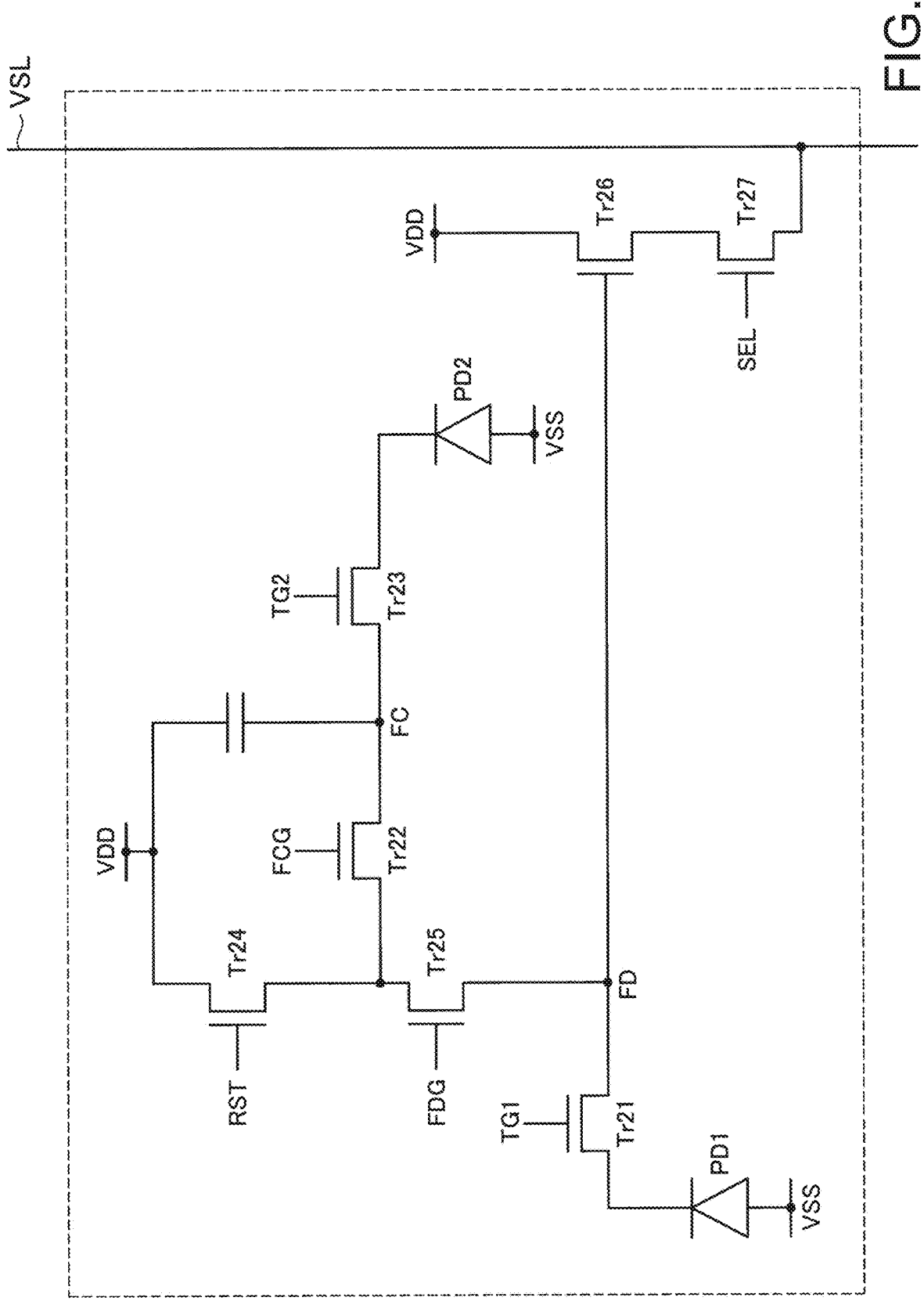
FIG. 16 is a diagram showing an example of a circuit configuration of a unit pixel in a solid-state imaging apparatus according to a modified example of the embodiment.

An example of a circuit configuration of a unit pixel in the case where the shared pixel structure is formed will be described with reference to FIG. 16. As described above, the shared pixel structure includes a plurality of photodiodes, a plurality of transfer transistors, a floating diffusion to be shared, and each one of other pixel transistors to be shared. For example, FIG. 16 is a diagram showing an example of a circuit configuration of a unit pixel in a solid-state imaging apparatus according to a modified example of this embodiment, and shows an example of a seven-transistor configuration in which a high-sensitivity photodiode (PD1), a low-sensitivity photodiode (PD2), and an in-pixel capacitance (FC) are arranged for one pixel. Note that in this description, in order to distinguish the solid-state imaging apparatus according to the modified example of this embodiment from the solid-state imaging apparatus 1a according to the above-mentioned embodiment, the solid-state imaging apparatus according to the modified example of this embodiment is referred to as "solid-state imaging apparatus 1c" in some cases. Further, when distinguishing the pixel of the solid-state imaging apparatus 1c according to the modified example of this embodiment, i.e., the pixel forming the shared pixel structure from the pixel 2 of the solid-state imaging apparatus 1a according to the above-mentioned embodiment, the pixel forming the shared pixel structure is referred to as "pixel 2c" or "unit pixel 2c" in some cases.

As shown in FIG. 16, the unit pixel 2c includes the photoelectric conversion device PD1, a first transfer gate unit Tr21, the photoelectric conversion device PD2, a second transfer gate unit Tr22, a third transfer gate unit Tr23, a fourth transfer gate unit Tr25, a charge accumulation unit FC, a reset gate unit Tr24, the floating diffusion unit FD, an amplification transistor Tr26, and a selection transistor Tr27.

Further, for the unit pixel 2c, a plurality of drive lines for supplying various drive signals is wired, for example, for each pixel row. Then, various drive signals TG1, TG2, FCG, RST, and SEL are supplied from the pixel timing drive circuit 5 shown in FIG. 1 via the plurality of drive lines. These drive signals are pulse signals in which a high level (e.g., power source voltage VDD) state is the active state and a low level state (e.g., negative potential) is a non-active state in the case where each transistor of the unit pixel 2c is an NMOS transistor, for example.

The photoelectric conversion device PD1 includes, for example, a photodiode of PN junction. The photoelectric conversion device PD1 generates charges corresponding to the amount of received light, and accumulates the charges.

The first transfer gate unit Tr21 is connected between the photoelectric conversion device PD1 and the floating diffusion unit FD. To the gate electrode of the first transfer gate unit Tr21, the drive signal TG1 is applied. When the drive signal TG1 enters the active state, the first transfer gate unit Tr21 enters the conductive state, and the charges accumulated in the photoelectric conversion device PD1 are transferred to the floating diffusion unit FD via the first transfer gate unit Tr21.

The photoelectric conversion device PD2 includes, for example, a photodiode of PN junction similarly to the photoelectric conversion device PD1. The photoelectric conversion device PD2 generates charges corresponding to the mount of received light and accumulates the charges.

Comparing the photoelectric conversion device PD1 and the photoelectric conversion device PD2, for example, the photoelectric conversion device PD1 has a larger area of the light receiving surface and a higher sensitivity, and the photoelectric conversion device PD2 has a smaller area of the light receiving surface and a lower sensitivity.

The second transfer gate unit Tr22 is connected between the charge accumulation unit FC and the floating diffusion unit FD. The drive signal FCG is applied to the gate electrode of the second transfer gate unit Tr22. When the drive signal FCG enters the active state, the second transfer gate unit Tr22 enters the conductive state, and the potentials of the charge accumulation unit FC and the floating diffusion unit FD are coupled.

The third transfer gate unit Tr23 is connected between the photoelectric conversion device PD2 and the charge accumulation unit FC. The drive signal TG2 is applied to the gate electrode of the third transfer gate unit Tr23. When the drive signal TG2 enters the active state, the third transfer gate unit Tr23 enters the conductive state, and the charges accumulated in the photoelectric conversion device PD2 are transferred, via the third transfer gate unit Tr23, to the charge accumulation unit FC, or the area in which the potentials of the charge accumulation unit FC and the floating diffusion unit FD are coupled.

Further, the lower part of the gate electrode of the third transfer gate unit Tr23 has a slightly deeper potential, and an overflow path through which the charges overflowed from the photoelectric conversion device PD2 because the amount of charges exceeds the amount of saturated charges of the photoelectric conversion device PD2 are transferred to the charge accumulation unit FC is formed. Note that hereinafter, the overflow path formed in the lower part of the gate electrode of the third transfer gate unit Tr23 will be referred to simply as the overflow path of the third transfer gate unit Tr23.

The fourth transfer gate unit Tr25 is connected between the second transfer gate unit Tr22, the reset gate unit Tr24, and the floating diffusion unit FD. The drive signal FDG is applied to the gate electrode of the fourth transfer gate unit Tr25. When the drive signal FDG enters the active state, the fourth transfer gate unit Tr25 enters the conductive state, and the potential of a node 152 between the second transfer gate unit Tr22, the reset gate unit Tr24, and the fourth transfer gate unit Tr25, and the potential of the floating diffusion unit FD are coupled.

The charge accumulation unit FC includes, for example, a capacitor, and is connected between the second transfer gate unit Tr22 and the third transfer gate unit Tr23. The counter electrode of the charge accumulation unit FC is connected between the power sources VDD that supply power supply voltages VDD. The charge accumulation unit FC accumulates the charges transferred from the photoelectric conversion device PD2.

The reset gate unit Tr24 is connected between the power source VDD and the floating diffusion unit FD. The drive signal RST is applied to the gate electrode of the reset gate unit Tr24. When the drive signal RST enters the active state, the reset gate unit Tr24 enters the conductive state, and the potential of the floating diffusion unit FD is reset to the level of the power source voltage VDD.

The floating diffusion unit FD converts the charges into a voltage signal (charge-voltage conversion), and outputs it.

The gate electrode of the amplification transistor Tr26 is connected to the floating diffusion unit FD, the drain electrode of the amplification transistor Tr26 is connected to the power source VDD, and the amplification transistor Tr26 serves as a reading circuit that reads the charges held in the floating diffusion unit FD, i.e., an input unit of a so-called source follower circuit. That is, the source electrode of the amplification transistor Tr26 is connected to the vertical signal line VSL via the selection transistor Tr27, and thus, the amplification transistor Tr26 and a constant current source connected to one end of the vertical signal line VSL constitute a source follower circuit.

The selection transistor Tr27 is connected to the source electrode of the amplification transistor Tr26 and the vertical signal line VSL. The drive signal SEL is applied to the gate electrode of the selection transistor Tr27. When the drive signal SEL enters the active state, the selection transistor Tr27 becomes the conductive state, and the unit pixel 2c enters a selected state. As a result, the pixel signal output from the amplification transistor Tr26 is output to the vertical signal line VSL via the selection transistor Tr27.

Note that in this description, the fact that each drive signal enters the active state is referred to also as that each drive signal is turned on or each drive signal is controlled to be in the on state, and the fact that each drive signal enters the non-active state is referred to also as that each drive signal is turned off or each drive signal is controlled to be in the off state. Further, hereinafter, the fact that each gate unit or each transistor enters the conductive state will be referred to also as that each gate unit or each transistor is turned on, and the fact that each gate unit or each transistor enters the non-conductive state will be referred to also as that each gate unit or each transistor is turned off.

(Drive Control)

Subsequently, as an example of drive control of the solid-state imaging apparatus according to this modified example, in particular, an example of control for recognizing the state of each of the photoelectric conversion devices PD1 and PD2 included in each of the pixels 2, and consequently detecting abnormality of each of the photoelectric conversion devices PD1 and PD2 will be described.

Figure 17:
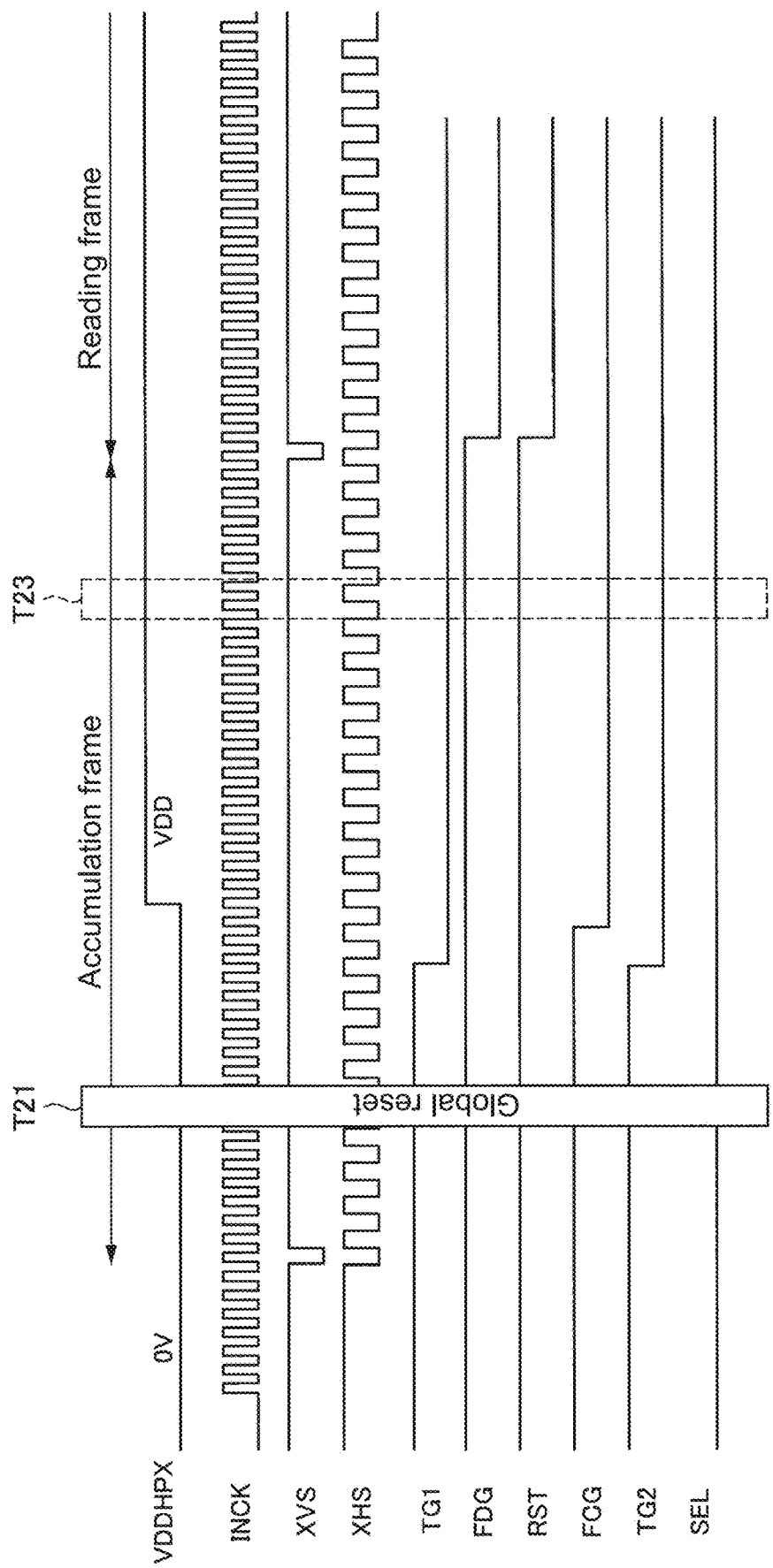
FIG. 17 is a schematic timing chart showing an example of drive control of the solid-state imaging apparatus according to the modified example of the embodiment.

For example, FIG. 17 is a schematic timing chart showing an example of drive control of the solid-state imaging apparatus 1c according to the modified example of this embodiment, and shows an example of control for recognizing the state of each of the photoelectric conversion devices PD1 and PD2 included in the pixel 2c.

In FIG. 11, VDDHPX indicates a power source voltage applied from the power source VDDHPX to the pixel 2c. Further, INCK indicates a synchronization signal, and one pulse of the synchronization signal is the minimum unit of the period of various types of processing executed in the solid-state imaging apparatus 1c. Further, XVS and XHS respectively represent a vertical synchronization signal and a horizontal synchronization signal. That is, one XVS corresponds to one frame period. Further, TG1, FCG, TG2, and FDG respectively indicate drive signals (hereinafter, referred to also as "TG1 drive pulse", "FCG drive pulse", "TG2 drive pulse", and "FDG drive pulse") to be supplied to the first transfer gate unit Tr21, the second transfer gate unit Tr22, the third transfer gate unit Tr23, and the fourth transfer gate unit Tr25. Further, RST and SEL respectively indicate drive signals (i.e., the RST drive pulse and the SEL drive pulse) to be supplied to the reset gate unit Tr24 and the selection transistor Tr27.

In the solid-state imaging apparatus 1c according to this embodiment, the control relating to recognition of the state of each of the photoelectric conversion devices PD1 and PD2 includes first control for accumulating charges in the photoelectric conversion devices PD1 and PD2 of the target pixel 2c, and second control for reading the charges accumulated in the photoelectric conversion device PD. For example, in the example shown in FIG. 17, one frame period is assigned to each of the first control and the second control. That is, the frame period assigned to the first control corresponds to the "accumulation frame", and the frame period assigned to the second control corresponds to the "reading frame".

The accumulation frame will be described first. As shown in FIG. 17, in the accumulation frame, the power source voltage to be applied from the power source VDDHPX to the pixel 2c is controlled to 0 V first, and then, the power source voltage is controlled to a predetermined voltage VDD, thereby applying the voltage VDD to the pixel 2c.

Figure 18:
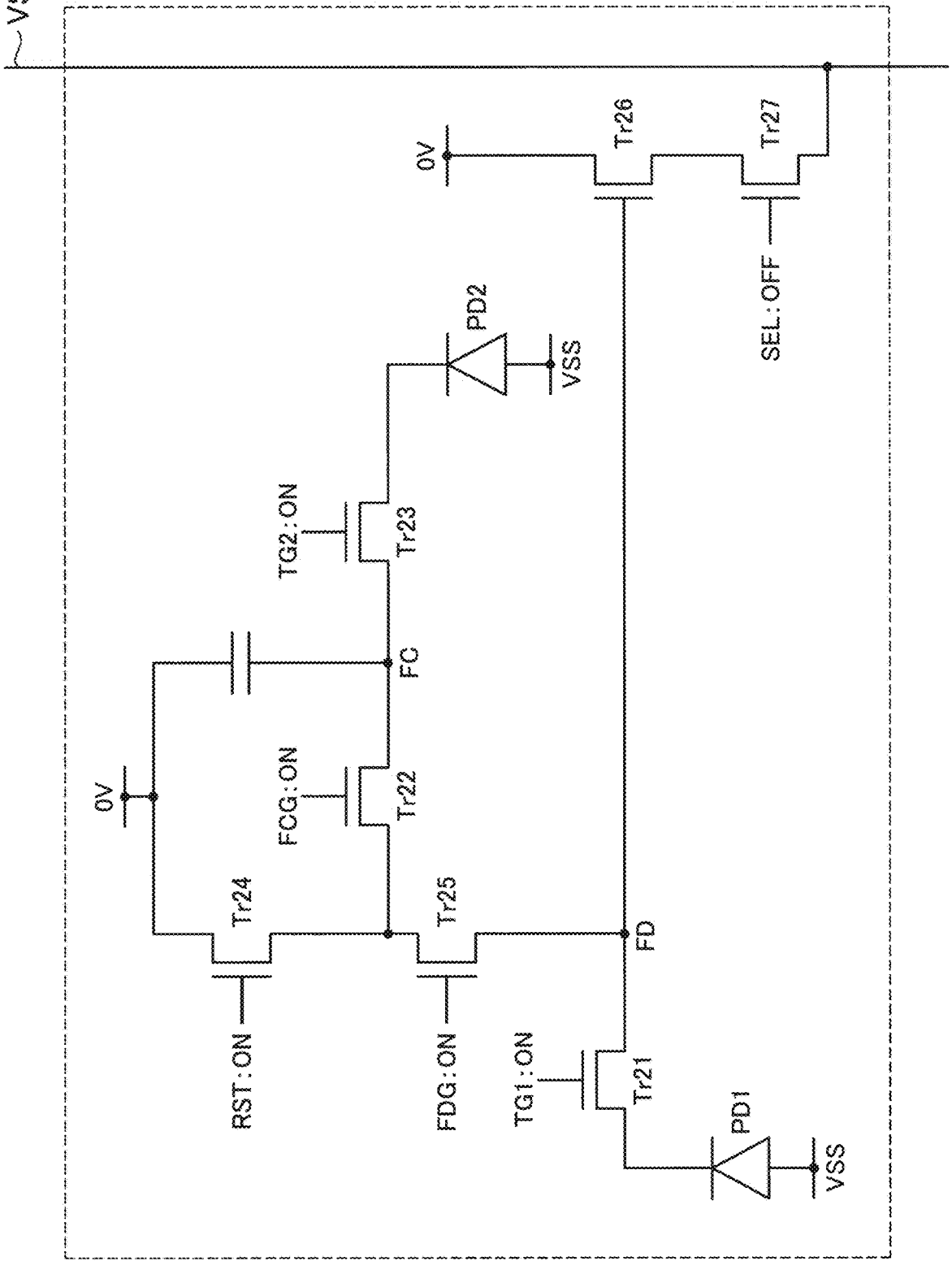
FIG. 18 is an explanatory diagram describing an example of drive control of the solid-state imaging apparatus according to the modified example of the embodiment.

Now, the operation of the pixel 2c in the period indicated by a reference symbol T21 in FIG. 17 will be described with reference to FIG. 18. FIG. 18 is an explanatory diagram describing an example of drive control of the solid-state imaging apparatus 1c according to the modified example of this embodiment, and schematically shows the state of the pixel 2c in the period T21 in FIG. 17.

As shown in FIG. 18, in the period T21, the TG1 drive pulse, the FCG drive pulse, the TG2 drive pulse, the FDG drive pulse, and the RST drive pulse are each controlled to be in the on state, and the SEL drive pulse is controlled to be in the off state. Further, as described above, the voltage applied from the power source VDDHPX to the pixel 2 is controlled to 0 V. As a result, the potentials of the floating diffusion unit FD and the charge accumulation unit FC are each controlled to 0 V, a potential difference occurs between the anode and cathode of each of the photoelectric conversion devices PD1 and PD2, and charges are injected into the photoelectric conversion device PD. Note that the amount of charges held in each of the photoelectric conversion devices PD1 and PD2 as the result of the control shown in FIG. 18 is determined by the saturation characteristics of the photoelectric conversion devices PD1 and PD2 regardless of the light receiving state of each of the photoelectric conversion devices PD1 and PD2. That is, in the case where some abnormality occurs in the photoelectric conversion device PD1, the amount of charges held in the photoelectric conversion device PD1 changes (e.g., decreases) as compared with that in the normal state. This applies also to the photoelectric conversion device PD2. Note that as shown in FIG. 18, the control for injecting charges into the photoelectric conversion devices PD1 and PD2 may be executed at a predetermined timing for all the pixels 2c (i.e., global reset), or executed individually for each of the pixels 2c in time division.

Figure 19:
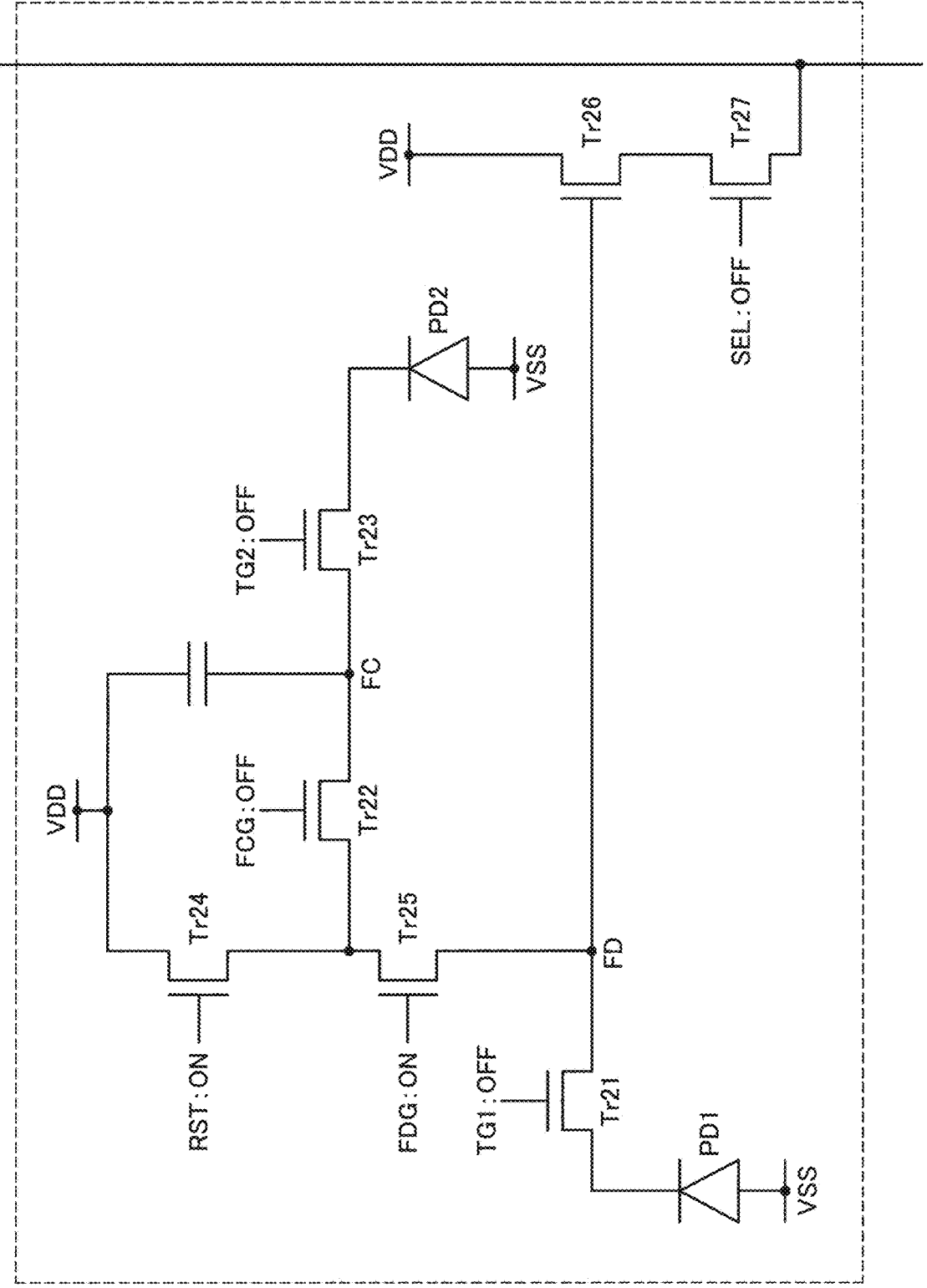
FIG. 19 is an explanatory diagram describing an example of drive control of a solid-state imaging apparatus according to an application example of the embodiment.

Subsequently, the operation of the pixel 2c in the period indicated by a reference symbol T23 in FIG. 17 will be described with reference to FIG. 19. FIG. 19 is an explanatory diagram describing an example of drive control of the solid-state imaging apparatus 1c according to an application example of this embodiment, and schematically shows the state of the pixel 2c in the period T23 in FIG. 17.

As shown in FIG. 17, in the period T23, the on state of each of the FDG drive pulse and the RST drive pulse is maintained, and the TG1 drive pulse, the FCG drive pulse, and the TG2 drive pulse are each controlled to be in the off state. Note that the off state of the SEL drive pulse is maintained. Further, the voltage applied from the power source VDDHPX to the pixel 2c is controlled to VDD. With such control, the floating diffusion unit FD and the photoelectric conversion device PD1, the charge accumulation unit FC and the photoelectric conversion device PD2, and the floating diffusion unit FD and the charge accumulation unit FC each enter the non-conductive state. Further, the potential of the floating diffusion unit FD is controlled to VDD.

Subsequently, the reading frame will be described. In the reading frame, the target pixel 2c is driven at a predetermined timing, and the pixel signal corresponding to the charges accumulated in the photoelectric conversion devices PD1 and PD2 of the pixel 2c is read. For example, FIG. 20 is a schematic timing chart showing an example of drive control of the solid-state imaging apparatus 1c according to this embodiment, and shows an example of the control according to reading of the charges accumulated in the photoelectric conversion devices PD1 and PD2 of the pixel 2c.

Figure 20:
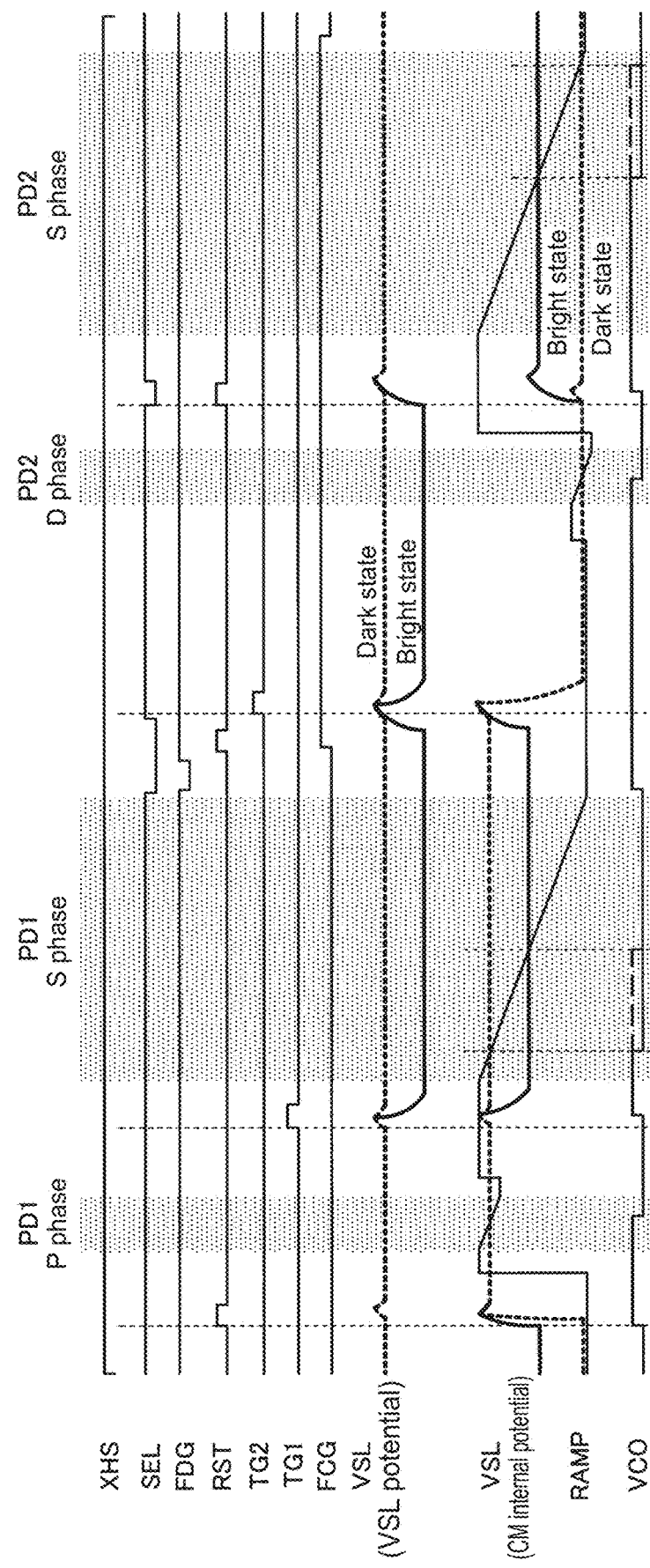
FIG. 20 is a schematic timing chart showing an example of drive control of the solid-state imaging apparatus according to the embodiment.

In FIG. 20, XHS, SEL, RST, TG1, FCG, TG2, and FDG each indicate signals to which reference signals similar to those in FIG. 17 are assigned. Further, VSL indicates the potential of the signal (i.e., pixel signal to be output from the pixel 2c) to be output via the vertical signal line. Note that in the example shown in FIG. 20, the signals indicated as VSL in the dark state and bright state are individually shown. Further, RAMP indicates the potential of the ramp wave to be output from the DAC in the ADC to a comparator. Note that in the example shown in FIG. 20, the pulse indicating the change in potential in the comparator of the signal to be output via the vertical signal line is superimposed on the pulse indicating the change in potential of the ramp wave, and shown. Further, VCO indicates a voltage signal to be output from the counter in the ADC.

Further, in FIG. 20, the P phase indicates the pre-data phase for reading the reset level of the pixel signal to be output from the pixel 2c. Further, the D phase indicates the data phase for reading the data level of the pixel signal.

As shown in FIG. 20, in the solid-state imaging apparatus 1c according to the modified example of this embodiment, a first pixel signal corresponding to the charges accumulated in the photoelectric conversion device PD1 is read first, and then, a second signal corresponding to the charges accumulated in the photoelectric conversion device PD2 is read. Further, at this time, in the reading of the first pixel signal, the P phase is read first, and then, the D phase is read. Meanwhile, in the reading of the second pixel signal, the D phase is read first, and then, the P phase is read, because the charges accumulated in the charge accumulation unit FC are reset along with the reading of the P phase. Note that in the following, regarding the operation of the solid-state imaging apparatus 1c according to the reading of each of the first pixel signal and the second pixel signal, the operation according to the reading of the P phase and the operation according to the reading of the D phase will be separately described.

First, as shown in FIG. 17, at the start of the reading frame, the FDG drive pulse and the RST drive pulse are each controlled to be in the off state. That is, at the start of the reading frame, the TG1 drive pulse, the FCG drive pulse, the TG2 drive pulse, the FDG drive pulse, the RST drive pulse, and the SEL drive pulse are each in the off state. After that, at a predetermined timing in the reading frame (in a predetermined horizontal synchronization period), reading of the pixel signal from the target pixel 2c is started.

As shown in FIG. 20, reading of the P phase regarding the first pixel signal corresponding to the charges accumulated in the photoelectric conversion device PD1 is performed first. Specifically, the RST drive pulse is temporarily controlled to be in the on state while the FDG drive pulse and the SEL drive pulse are controlled to be in the on state, and thus, the potential of the floating diffusion unit FD is reset to the level of the power source voltage VDD. At this time, the off state of each of the TG1 drive pulse, the FCG drive pulse, and the TG2 drive pulse is maintained. That is, the photoelectric conversion device PD1 and the floating diffusion unit FD, and the charge accumulation unit FC (and consequently, the photoelectric conversion device PD2) and the floating diffusion unit FD each enter the non-conductive state. Therefore, the pixel signal read at this time from the pixel 2c via the vertical signal line VSL indicates the reset level of the pixel signal output from the pixel 2c.

Subsequently, regarding the first pixel signal corresponding to the charges accumulated in the photoelectric conversion device PD1, reading of the D phase is performed. Specifically, the TG1 drive pulse is temporarily controlled to be in the on state, and the photoelectric conversion device PD1 and the floating diffusion unit FD enters the conductive state in the period in which the TG1 drive pulse shows the on state. As a result, the charges accumulated in the photoelectric conversion device PD1 are transferred to the floating diffusion unit FD, and accumulated in the floating diffusion unit FD. Therefore, the voltage corresponding to the charges accumulated in the floating diffusion unit FD (in other words, the charges leaked from the photoelectric conversion device PD1) is applied to the gate of the amplification transistor Tr26, and the amplification transistor Tr26 enters the conductive state. As a result, the pixel signal (i.e., the first pixel signal) corresponding to the voltage applied to the gate of the amplification transistor Tr26 is output from the pixel 2c via the vertical signal line VSL. That is, the charges corresponding to the saturation characteristics of the photoelectric conversion device PD1 are read from the photoelectric conversion device PD1, and the first pixel signal corresponding to the reading result of the charges is output from the pixel 2c via the vertical signal line VSL.

Note that when the reading of the D phase regarding the first pixel signal is finished, after the SEL drive signal is controlled to be in the off state, the FDG drive signal is temporarily controlled to be in the off state first, and then, the RST drive signal is temporarily controlled to be in the on state. As a result, the potential of the floating diffusion unit FD is reset to the level of the power source voltage VDD. Further, the FCG drive signal is controlled to be in the on state, and the floating diffusion unit FD and the charge accumulation unit FC enter the conductive state. After that, the SEL drive signal is controlled to be in the on state, and reading of the second pixel signal corresponding to the charges accumulated in the photoelectric conversion device PD2 is started.

Regarding the reading of the second pixel signal corresponding to the charges accumulated in the photoelectric conversion device PD2, as described above, the reading of the D phase is performed first. Specifically, the TG1 drive pulse is temporarily controlled to be in the on state, and the photoelectric conversion device PD2 and the charge accumulation unit FC enter the conductive state in the period in which the TG2 drive pulse shows the on state. That is, in the period, the photoelectric conversion device PD2, the charge accumulation unit FC, and the floating diffusion unit FD enter the conductive state. As a result, the potentials of the charge accumulation unit FC and the floating diffusion unit FD are coupled, and the charges accumulated in the photoelectric conversion device PD2 are transferred to the coupled area and accumulated in the area. Therefore, the voltage corresponding to the charges (in other words, the charges leaked from the photoelectric conversion device PD2) accumulated in the above-mentioned area is applied to the gate of the amplification transistor Tr26, and the amplification transistor Tr26 is controlled to be in the conductive state. As a result, the pixel signal (i.e., the second pixel signal) corresponding to the voltage applied to the gate of the amplification transistor Tr26 is output from the pixel 2c via the vertical signal line VSL. That is, the charges corresponding to the saturation characteristics of the photoelectric conversion device PD2 are read from the photoelectric conversion device PD2, and the second pixel signal corresponding to the reading result of the charges is output from the pixel 2c via the vertical signal line VSL.

Subsequently, regarding the second pixel signal corresponding to the charges accumulated in the photoelectric conversion device PD2, reading of the P phase is performed. Specifically, the SEL drive signal is controlled to be in the off state first, and then, the RST drive signal is temporarily controlled to be in the on state. As a result, the potential of the area in which the potentials of the charge accumulation unit FC and the floating diffusion unit FD are coupled is reset to the level of the power source voltage VDD. After that, the SEL drive signal is controlled to be in the on state, and the voltage corresponding to the potential of the area is applied to the gate of the amplification transistor Tr26, and the pixel signal (i.e., the second pixel signal) corresponding to the voltage is output via the vertical signal line VSL. At this time, the off state of each of the TG1 drive pulse, the FCG drive pulse, and the TG2 drive pulse is maintained. That is, the photoelectric conversion device PD1 and the floating diffusion unit FD, and the charge accumulation unit FC and the floating diffusion unit FD (and consequently, the photoelectric conversion device PD2 and the floating diffusion unit FD) each enter the non-conductive state. Therefore, the pixel signal read at this time from the pixel 2c via the vertical signal line VSL indicated the reset level of the pixel signal output from the pixel 2c.

Note that the first pixel signal and the second pixel signal sequentially output from the pixel 2c via the vertical signal line VSL are each converted into a digital signal by the ADC 113, and output to the sensor data unit 211 described with reference to FIG. 10, for example. At this time, the digital signals sequentially output to the sensor data unit 211 indicate the potentials corresponding to the saturation characteristics of the photoelectric conversion devices PD1 and PD2 included in the pixel 2c. That is, the sensor data unit 211 is capable of individually recognizing, on the basis of the digital signal, the state of the pixel 2c (and consequently, the state of each of the photoelectric conversion devices PD1 and PD2 included in the pixel 2c) for each of the pixels 2c.

As a modified example of the solid-state imaging apparatus according to this embodiment, an example of the case where the pixel forms the shared pixel structure has been described above with reference to FIG. 16 to FIG. 20.

2.4. Evaluation

As described above, in the solid-state imaging apparatus according to this embodiment, application of the power source voltage to at least a part of a plurality of pixels is controlled so that charges are injected into the photoelectric conversion device of the part of pixels, and then, supplying of the drive signal to the part of pixels is controlled so that the pixel signal corresponding to the charges injected from the photoelectric conversion device is read. On the basis of such a configuration, the solid-state imaging apparatus according to this embodiment recognizes the state of the at least part of the pixels in accordance with the reading result of the pixel signal corresponding to the charges from the photoelectric conversion device of the part of pixels.

With the configuration as described above, in accordance with the solid-state imaging apparatus according to this embodiment, it is possible to individually recognize, on the basis of the pixel signal output from each pixel, the state of the pixel (and consequently, the photoelectric conversion device included in the pixel). Therefore, in the solid-state imaging apparatus, for example, it is possible to detect, in the case where failure occurs in a part of the pixel, the abnormality for each pixel. Further, by using such a mechanism, for example, it is possible to output, in the case where abnormality occurs in a part of the pixels, information relating to the pixel to a predetermined output destination. Further, as another example, since the position of the pixel where failure has occurred can be specified, it is also possible to correct the pixel signal output from the pixel at the time of capturing an image, on the basis of a pixel signal output from another pixel (e.g., adjacent pixel).

Further, in the solid-state imaging apparatus according to this embodiment, as described above, application of the power source voltage to each pixel is controlled to inject charges into the photoelectric conversion device of the pixel. That is, the amount of charges held in the photoelectric conversion device as the result of the control is determined by the saturation characteristics of each of the photoelectric conversion devices PD1 and PD2 regardless of the light reception state of the photoelectric conversion device. With such characteristics, in accordance with solid-state imaging apparatus according to this embodiment, it is possible to execute control (e.g., a test for detecting a pixel having a failure) according to recognition of the state of each pixel regardless of the amount of light in the external environment. That is, in accordance with the solid-state imaging apparatus according to this embodiment, for example, it is possible to execute a test for detecting a failure of each pixel 2 even in the environment where the mount of light in the external environment is smaller.

3. Second Embodiment

Subsequently, a solid-state imaging apparatus according to a second embodiment of the present disclosure will be described. In this embodiment, an example of a mechanism in which the solid-state imaging apparatus 1 more efficiently executes various tests such as failure detection during image (particularly, moving image) capturing. Note that in the following description, in order to distinguish the solid-state imaging apparatus 1 according to this embodiment from the solid-state imaging apparatus 1 according to another embodiment, the solid-state imaging apparatus 1 according to this embodiment is referred to as "solid-state imaging apparatus 1d" in some cases.

3.1. Configuration

Figure 21:
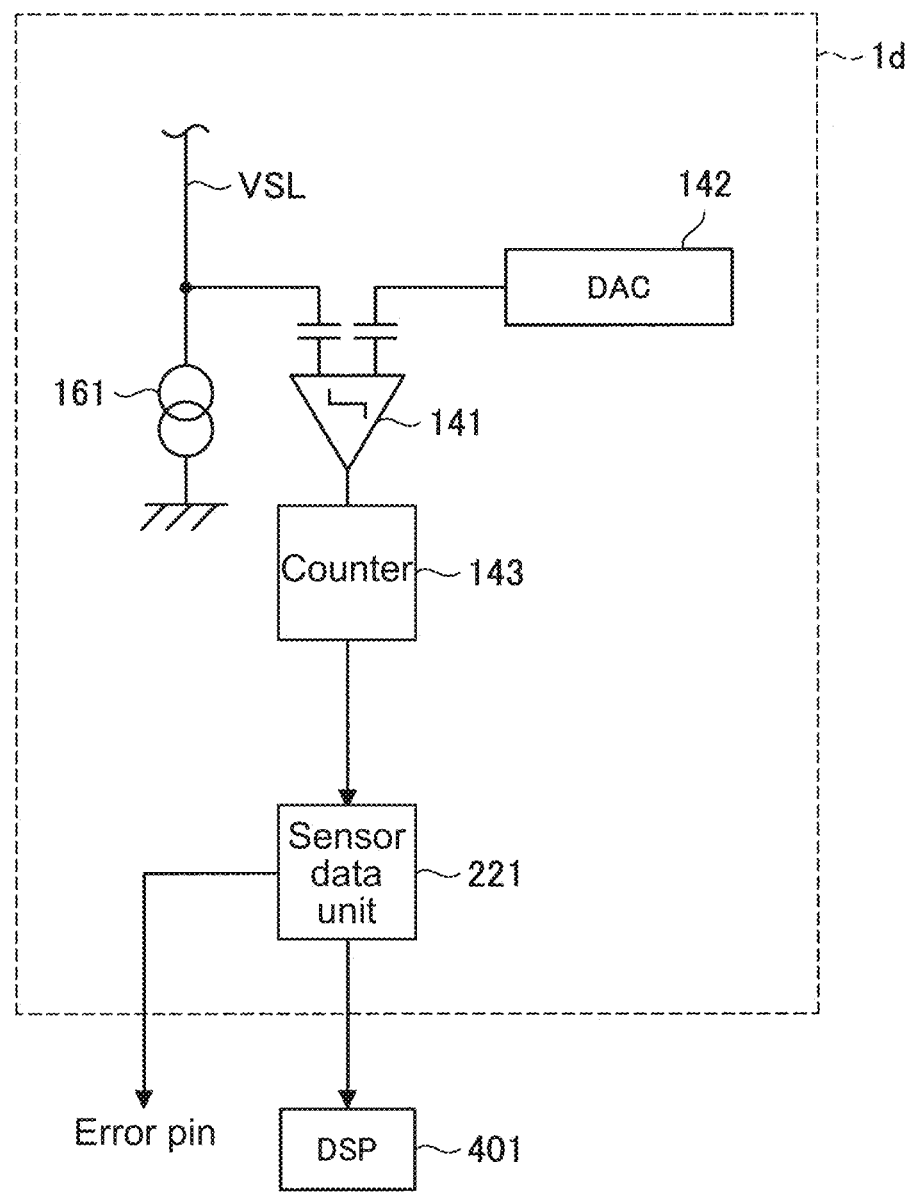
FIG. 21 is a block diagram showing an example of a schematic configuration of a solid-state imaging apparatus according to a second embodiment of the present disclosure.

First, an example of a schematic configuration of the solid-state imaging apparatus 1d according to this embodiment will be described with reference to FIG. 21. FIG. 21 is a block diagram showing an example of a schematic configuration of the solid-state imaging apparatus 1d according to this embodiment. Note that in this description, a configuration of the solid-state imaging apparatus 1a will be described focusing on components different from those of the solid-state imaging apparatus 1 described with reference to FIG. 1 to FIG. 8, and detailed description of components substantially similar to those of the solid-state imaging apparatus 1 will be omitted.

FIG. 21 shows an example of a configuration of a part according to reading of a pixel signal from the pixel 2 among configurations of the solid-state imaging apparatus 1d according to this embodiment. That is, in the example shown in FIG. 21, the parts corresponding to the constant current circuit unit 114 and the ADC 113 are mainly shown, and illustration of other configurations is omitted. Note that in FIG. 21, since the MOS transistor 161, the comparator 141, the DAC 142, and the counter 143 are substantially similar to the MOS transistor 161, the comparator 141, the DAC 142, and the counter 143 shown in FIG. 3, detailed description thereof will be omitted. Further, in FIG. 21, the comparator 141, the DAC 142, and the counter 143 correspond to the part, i.e., the ADC 113 shown in FIG. 3. Further, in FIG. 21, the MOS transistor 161 corresponds to the part, i.e., the constant current circuit unit 114 shown in FIG. 3.

As shown in FIG. 21, the solid-state imaging apparatus 1d according to this embodiment includes a sensor data unit 221. The sensor data unit 221 corresponds to the sensor data unit 211 in the solid-state imaging apparatus 1a according to the first embodiment described with reference to FIG. 10.

In the solid-state imaging apparatus 1d according to this embodiment, for example, the control unit 101 shown in FIG. 3 controls the timing of exposure by each of the pixels 2 and the timing of reading of the pixel signal based on the exposure result from the pixel 2. Further, the control unit 101 controls the operation of a predetermined configuration (e.g., the sensor data unit 221) in the solid-state imaging apparatus 1d so that in at least a part of the pixels 2, a predetermined test such as a failure detection is executed using a period in which the exposure by the pixel 2 and the reading of the pixel signal based on the exposure result are not performed in the unit frame period corresponding to a predetermined frame rate. Note that details of the timing when the control unit 101 causes a predetermined configuration such as the sensor data unit 221 to execute the predetermined test will be separately described below together with an example of drive control of the solid-state imaging apparatus 1d.

The sensor data unit 221 executes, on the basis of the control from the control unit 101, a predetermined test such as failure detection. Specifically, the sensor data unit 221 detects, by recognizing the state of a predetermined configuration in the solid-state imaging apparatus 1d on the basis of the digital signal obtained by converting the signal output from the counter 143, i.e., the pixel signal supplied from the pixel 2, abnormality that has occurred in the configuration.

For example, the sensor data unit 221 is capable of detecting, on the basis of the digital signal output from the counter 143, abnormality that has occurred in at least any one of at least a part of the pixels 2, a configuration (e.g., the pixel timing drive circuit 5 or the address decoder 4) for supplying a drive signal to each of the pixels 2, and the ADC 111. As a specific example, in the case where abnormality occurs in the digital signal of only a part of the pixels 2, it is possible to recognize that abnormality has occurred in the part of the pixels 2. Note that in this case, the sensor data unit 221 only needs to specify the pixel 2 where abnormality has occurred, in accordance with, for example, the ADC 113 being an output source of the digital signal or the output timing of the digital signal. Further, in the case where abnormality occurs in the digital signal in the plurality of pixels 2, it is possible to recognize that abnormality has occurred in the configuration (e.g., the address decoder 4, the pixel timing drive circuit 5, or the ADC 113) relating to the output of the pixel signal from each of the plurality of pixels 2.

Further, the sensor data unit 221 is capable of detecting, in accordance with the output situation of the digital signal from the counter 143, abnormality that has occurred in at least any one of the wiring connected to at least a part of the pixels 2, a configuration for supplying a drive signal to each of the pixels 2, and the ADC 113. As a specific example, in the case where abnormality has occurred in the output situation of the digital signal for a part of columns (e.g., in the case where the digital signal is not output), it is possible to recognize that abnormality has occurred in the vertical signal line corresponding to the part of columns or the ADC 113 corresponding to the part of columns. Further, as another example, in the case where abnormality has occurred in the output situation of the digital signal for a part of rows, it is possible to recognize that abnormality has occurred in the horizontal signal line corresponding to the part of rows.

Note that the above-mentioned example is merely an example, and the subject of detection is not limited to the sensor data unit 221 and the detection method is also not limited as long as a test is executed on at least a part of configurations in the solid-state imaging apparatus 1a and abnormality that has occurred in the configuration can be detected. For example, depending on the configuration to be tested, a unit for detecting abnormality that has occurred in the configuration may be additionally provided separately from the sensor data unit 221. Further, as another example, by applying a predetermined filter (e.g., LPF) to the output of the digital signal based on the pixel signal from each of the pixels 2, abnormality that has occurred in at least a part of the pixels 2 or another configuration driven in relation to the pixels 2 may be detected.

Further, the sensor data unit 221 may execute, in the case where it detects that abnormality has occurred in at least a part of configurations in the solid-state imaging apparatus 1d, predetermined processing in accordance with the detection result.

As a specific example, the sensor data unit 221 may notify the outside of the solid-state imaging apparatus 1d of the detection result of abnormality that has occurred in at least a part of configurations. As a specific example, the sensor data unit 211 may output, to the outside of the solid-state imaging apparatus 1d, a predetermined signal indicating that abnormality has been detected, via a predetermined output terminal (i.e., Error pin). Further, as another example, it may notify the predetermined DSP (Digital Signal Processor) 401 provided outside the solid-state imaging apparatus 1d of that abnormality has been detected. Note that the part that performs control so that the detection result of abnormality that has occurred in at least a part of configurations among the sensor data unit 221 is output to a predetermined output destination (e.g., the DSP 401) corresponds to an example of the "output control unit".

Further, as another example, the sensor data unit 221 may correct, in the case where abnormality has occurred in at least a part of configurations and it recognizes that abnormality has occurred in the output from at least a part of the pixels 2 as a result thereof, the output from the part of the pixels 2 on the basis of the output from another pixel 2.

Figure 22:
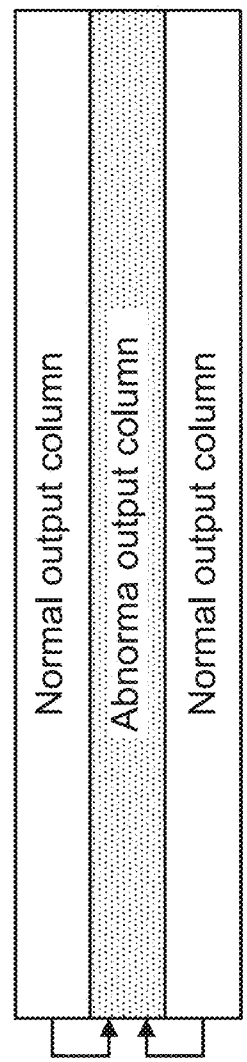
FIG. 22 is an explanatory diagram describing an example of an operation according to correction of a pixel signal in the solid-state imaging apparatus according to the embodiment.
Figure 23:
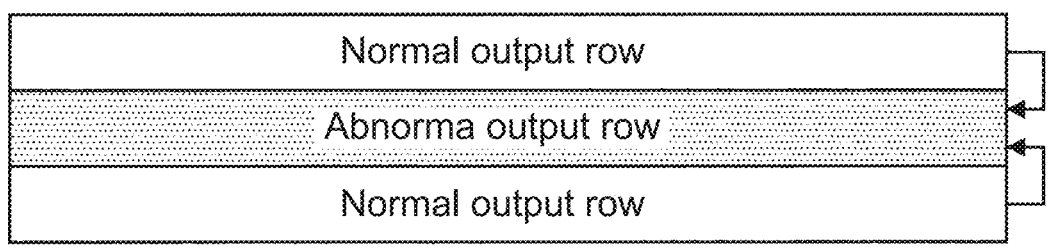
FIG. 23 is an explanatory diagram describing an example of an operation according to correction of a pixel signal in the solid-state imaging apparatus according to the embodiment.

For example, FIG. 22 and FIG. 23 are each an explanatory diagram describing an example of an operation according to correction of a pixel signal in the solid-state imaging apparatus 1d according to this embodiment. For example, FIG. 22 shows an example of the case where abnormality has occurred in the output of the pixel signal corresponding to a part of columns. In the example shown in FIG. 22, an example of the case where the pixel signal corresponding to the column where abnormality has occurred is corrected on the basis of the pixel signal corresponding to another column adjacent to the column is shown. In this case, the sensor data unit 221 only needs to specify the column where abnormality has occurred and another column adjacent to the column by, for example, specifying the ADC 113 in which abnormality has been detected in the output of the digital signal.

Further, as another example, FIG. 23 shows an example of the case where abnormality has occurred in the output of the pixel signal corresponding to a part of rows. In the example shown in FIG. 23, an example of the case where the pixel signal corresponding to the row where abnormality has occurred is corrected on the basis of the pixel signal corresponding to another row adjacent to the row is shown. In this case, the sensor data unit 221 only needs to specify, on the basis of, for example, the timing when the pixel signal where abnormality has occurred is read, the row where abnormality has occurred and another row adjacent to the row.

Further, similarly to the example described above with reference to FIG. 15, it is also possible to correct the pixel signal output from the pixel 2 where abnormality has occurred, on the basis of the pixel signal output from another pixel 2 adjacent to the pixel 2.

Note that the part that corrects the output (i.e., the output where abnormality has occurred) from at least a part of the pixels 2 among the sensor data unit 221 corresponds to an example of the "correction processing unit".

An example of a schematic configuration of the solid-state imaging apparatus 1d according to this embodiment has been described above with reference to FIG. 21.

3.2. Drive Control

Figure 24:
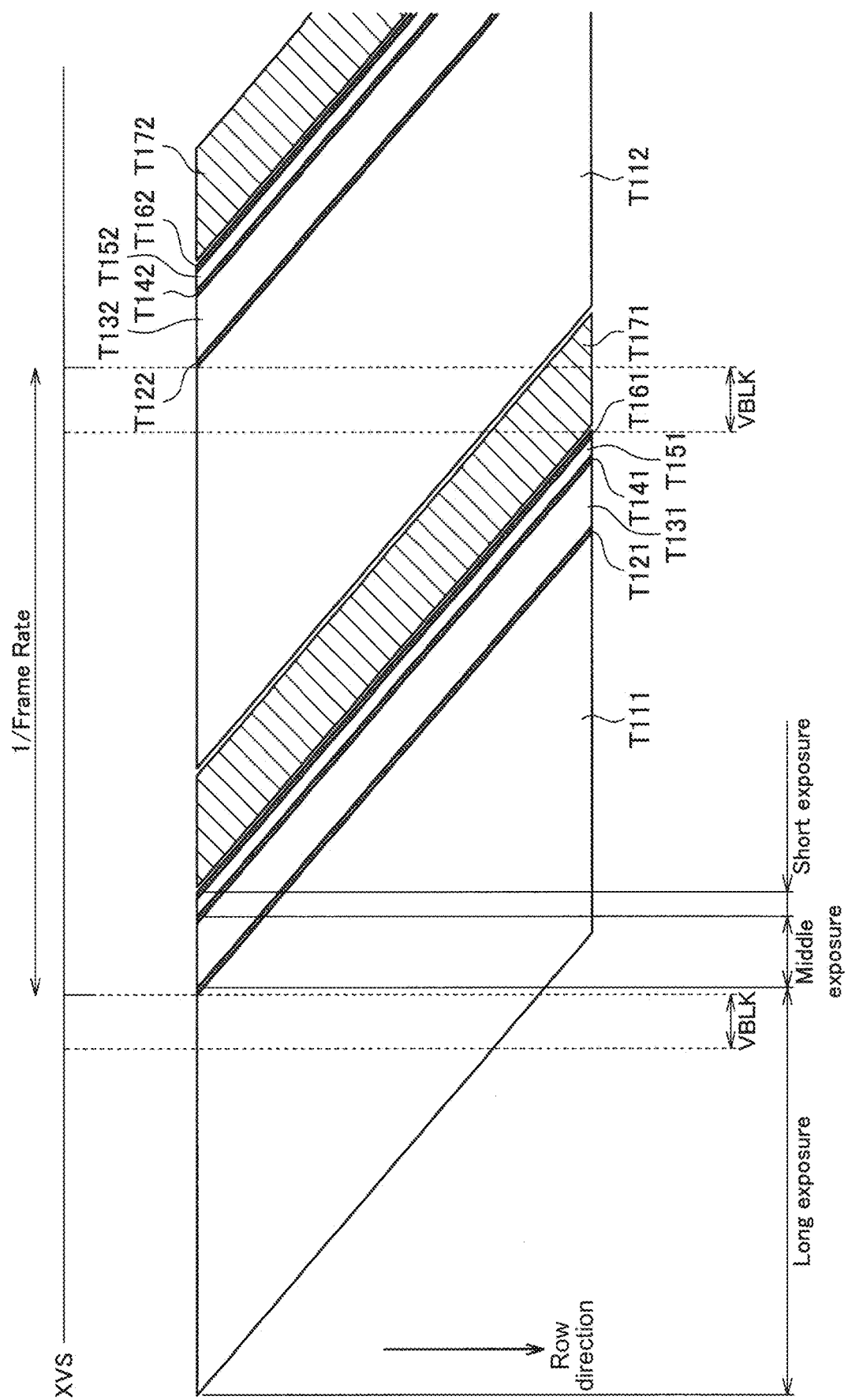
FIG. 24 is a schematic timing chart showing an example of drive control of the solid-state imaging apparatus according to the embodiment.

Subsequently, as an example of drive control of the solid-state imaging apparatus 1d according to this embodiment, in particular, description will be made focusing on control of the timing when a predetermined test of the solid-state imaging apparatus 1d is executed. For example, FIG. 24 is a schematic timing chart showing an example of drive control of the solid-state imaging apparatus 1d according to this embodiment, and shows an example of control of the timing when a predetermined test of the solid-state imaging apparatus 1d is executed. In FIG. 24, the horizontal axis indicates the time direction, and the vertical axis indicates the positions in the row direction of the two-dimensionally arranged pixels 2. Note that in this description, in order to make the features of the solid-state imaging apparatus 1d according to this embodiment more easily understandable, drive control of the solid-state imaging apparatus 1d will be described focusing on the case where each of the pixels 2 executes exposure and reading of the exposure result a plurality of times in a unit frame period (i.e., one vertical synchronization period).

For example, in the example shown in FIG. 24, the solid-state imaging apparatus 1d sequentially executes first exposure (Long exposure), second exposure (Middle exposure), and third exposure (Short exposure) which have different exposure times in a unit frame period in time division. Specifically, in FIG. 24, reference symbols T111 and T112 each indicate an exposure period (Long Shutter) of the first exposure, and reference symbols T121 and T122 each indicate a reading period (Long Read) of the pixel signal based on the result of the first exposure. Further, reference symbols T131 and T132 each indicate an exposure period (Middle Shutter) of the second exposure, and reference symbols T141 and T142 each indicate a reading period (Middle Read) of the pixel signal based on the result of the second exposure. Further, reference symbols T151 and T152 each indicate an exposure period (Short Shutter) of the third exposure, and reference symbols T161 and T162 each indicate a reading period (Short Read) of the pixel signal based on the result of the third exposure.

Further, a reference symbol VBLK indicates the vertical blanking (V blanking) period. Note that in the vertical blanking period VBLK, for example, a predetermined test such as failure detection of a column signal line and failure detection of TSV is executed, and reading of a pixel signal is not performed from any of the pixels 2 in this period. That is, the vertical blanking period VBLK corresponds to the period from when reading of the pixel signals from a series of pixels 2 in a certain frame period is completed to when reading of the pixel signals from the series of the pixels 2 in the next frame period is started.

Further, reference symbols T171 and T172 each correspond to a period in which exposure (e.g., the first exposure to the third exposure) by the pixels 2 and reading of the pixel signal based on the exposure result are not performed in the pixels 2 in each row. The solid-state imaging apparatus 1d according to this embodiment executes a predetermined test (e.g., BIST: Built-In Self-Test) using the periods T171 and T172. Examples of the predetermined test include failure detection for each pixel. Note that hereinafter, the period indicated by each of the reference symbols T171 and T172 will be referred to also as "BIST period". Further, in the case where the BIST periods T171 and T172 are not particularly distinguished, they will be referred to also as "BIST period T170".

Specifically, as shown in FIG. 24, the BIST period T170 is started after reading of the pixel signal based on the result of the last exposure (e.g., the third exposure) in the unit frame period in which exposure of one or more times (e.g., the first exposure to the third exposure) by the pixel in a certain row is executed is finished. Further, the BIST period T170 is finished before the first exposure (e.g., the first exposure) in the next frame period of the unit frame period is started. As a more specific example, the BIST period T171 shown in FIG. 24 corresponds to a period from the time after the reading period T161 of the pixel signal based on the third exposure result is finished to the time when the exposure period T112 of the first exposure in the next unit frame period is started. Note that the BIST period T170 may be set between the first exposure and the second exposure, or between the second exposure and the third exposure. As will be described in detail later, the BIST period T170 is generated by setting the vertical blanking period VBLK.

Figure 25:
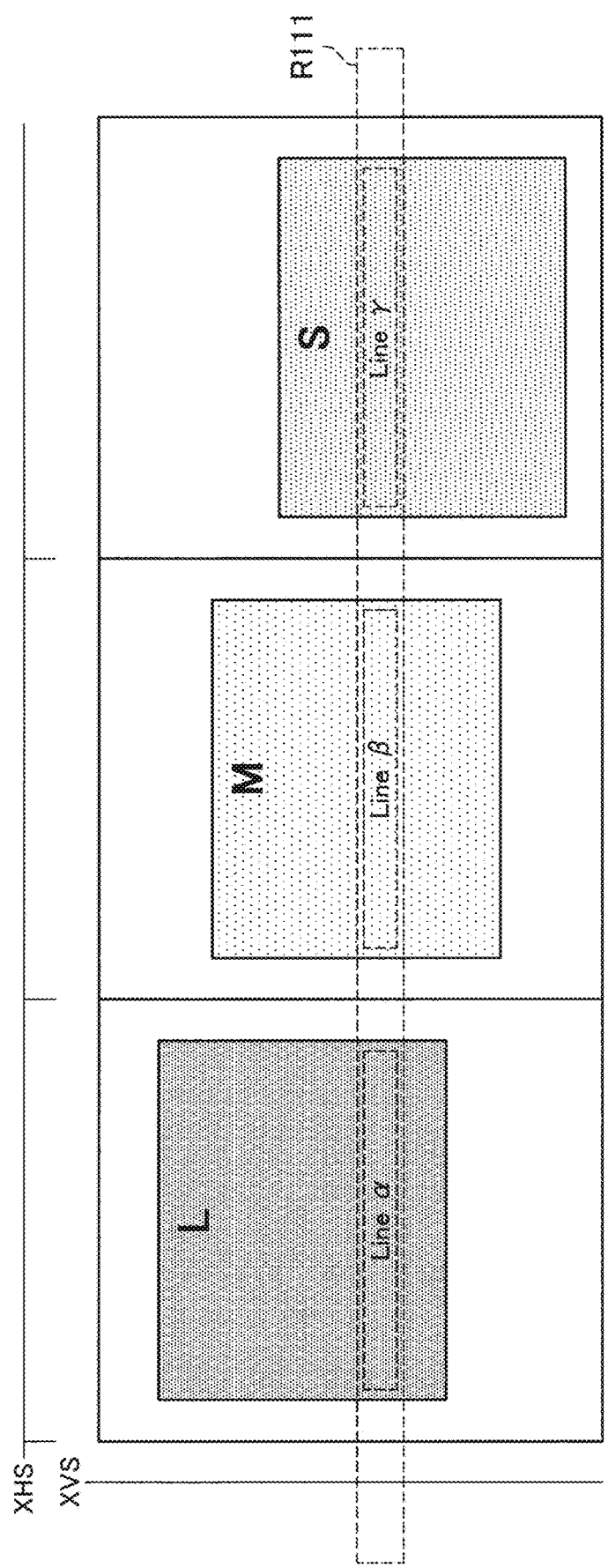
FIG. 25 is an explanatory diagram describing an example of schematic control according to reading of a pixel signal from each pixel in the solid-state imaging apparatus according to the embodiment.
Figure 26:
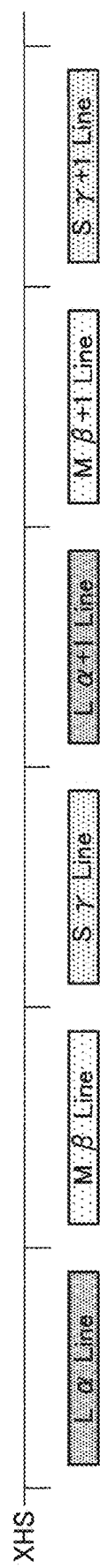
FIG. 26 is an explanatory diagram describing an example of schematic control according to reading of a pixel signal from each pixel in the solid-state imaging apparatus according to the embodiment.

Subsequently, an example of drive control according to reading of a pixel signal from each of the pixels 2 in the case where exposure and reading of the exposure result are executed a plurality of times in the unit frame period (i.e., one vertical synchronization period) will be described with reference to FIG. 25 and FIG. 26. FIG. 25 and FIG. 26 are each an explanatory diagram describing an example of schematic control according to reading of a pixel signal from each of the pixels 2 in the solid-state imaging apparatus 1d according to this embodiment.

In FIG. 25, the vertical axis schematically indicates a vertical synchronization period XVS, and the horizontal axis schematically indicates a horizontal synchronization period XHS. Further, in FIG. 25, square-shaped areas indicated by reference symbols L, M, and S schematically indicate the reading timing of the exposure result from each of the plurality of two-dimensionally arranged pixels 2, and correspond to the first exposure, the second exposure, and the third exposure, respectively. Further, in the square-shaped areas L, M, and S, the horizontal direction corresponds to the column direction of the plurality of two-dimensionally arranged pixels 2, and the vertical axis corresponds to the row direction of the plurality of pixels 2.

That is, in the example shown in FIG. 25, reading of pixel signals from the pixels 2 included in the row is executed row by row every one horizontal synchronization period. Further, in the example shown in FIG. 25, reading of the pixel signal based on the exposure result is sequentially executed in the order of the first exposure, the second exposure, and the third exposure every one horizontal synchronization period.

Note that in the case where the pixel signal based on the result of each of the first exposure, the second exposure, and the third exposure is sequentially read, it does not necessarily need to perform reading of the pixel signal from the pixel 2 included in the same row. For example, a reference symbol R111 in FIG. 25 schematically indicates a part of the vertical synchronization period. That is, in the example shown in FIG. 25, in the period R111, the pixel signals based on the results of the first exposure, the second exposure, and the third exposure are respectively read from the pixel 2 in the α-th row, the pixel 2 in the β-th row, and the pixel 2 in the γ-th row.

Further, FIG. 26 shows a schematic timing chart according to reading of the pixel signal from each of the pixels 2 in the example shown in FIG. 25. Specifically, in the example shown in FIG. 26, reading of the pixel signal based on the result of the first exposure from the pixel 2 in the α-th row, reading of the pixel signal based on the result of the second exposure from the pixel 2 in the β-th row, and reading of the pixel signal based on the result of the third exposure from the pixel 2 in the γ-th row are sequentially executed. Further, next, reading of the pixel signal based on the result of the first exposure from the pixel 2 in the α+1-th row, reading of the pixel signal based on the result of the second exposure from the pixel 2 in the β+1-th row, and reading of the pixel signal based on the result of the third exposure from the pixel 2 in the γ+1-th row are sequentially executed.

Note that the above-mentioned drive control is merely an example, and the drive control of the solid-state imaging apparatus 1d according to this embodiment is not necessarily limited to the example described with reference to FIG. 24 to FIG. 26 as long as at least the BIST period T170 is provided and a predetermined test can be executed in the BIST period T170. As a specific example, the solid-state imaging apparatus 1d according to this embodiment may be configured to execute exposure and reading of the exposure result only once by each of the pixels 2 in the unit frame period. In this case, the BIST period T170 is started after reading of the pixel signal based on the exposure result in a certain unit frame period is finished, and finished by the time when the exposure in the next unit frame period is started.

As an example of drive control of the solid-state imaging apparatus 1d according to this embodiment, in particular, description has been made with reference to FIG. 24 to FIG. 26 focusing on the control of the timing when a predetermined test of the solid-state imaging apparatus 1d is executed.

Figure 27:
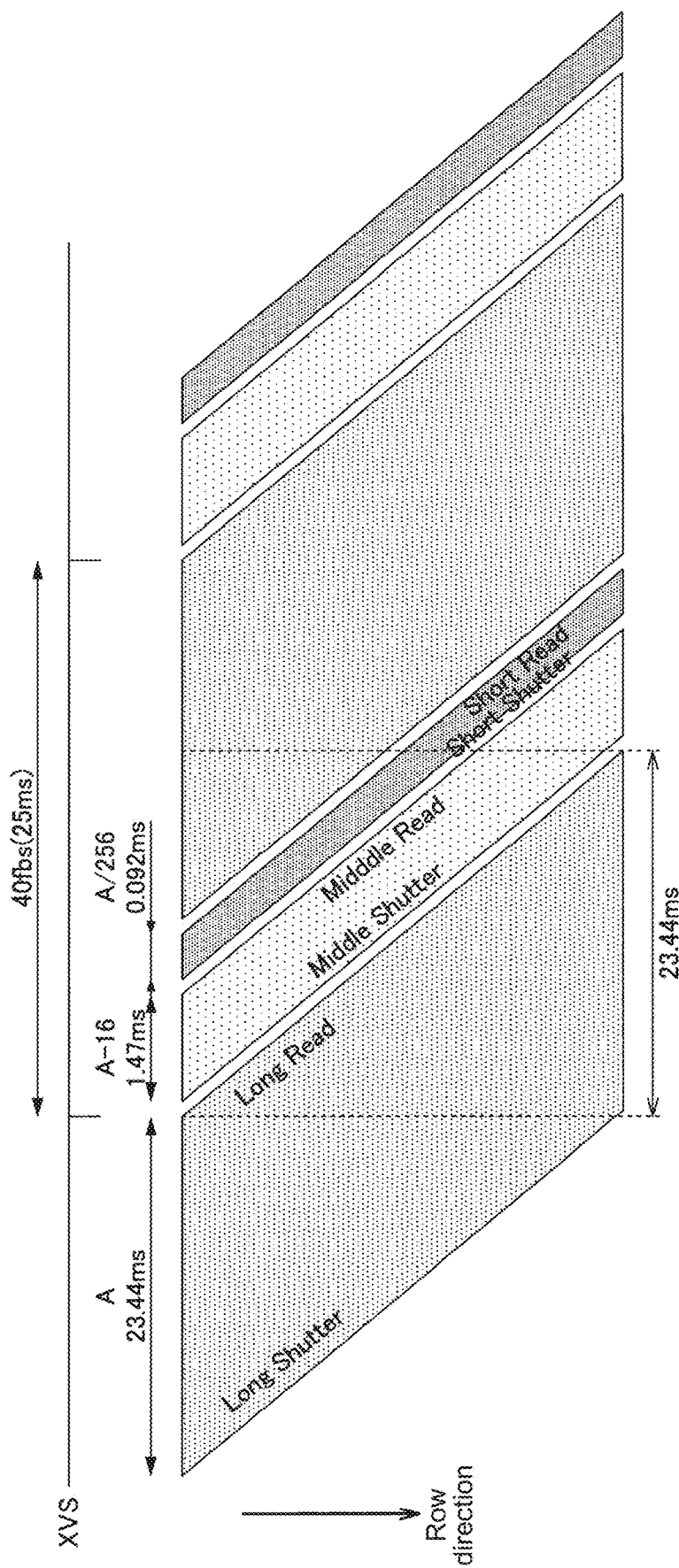
FIG. 27 is a timing chart describing a relationship between restriction of exposure time and a vertical blanking period in the solid-state imaging apparatus according to the embodiment.

3.3. Relationship Between Restriction of Exposure Time and Vertical Blanking Period Subsequently, the relationship between restriction of the exposure time and the vertical blanking period VBLK in the solid-state imaging apparatus 1d according to this embodiment will be described with reference to FIG. 27 by taking a specific example. FIG. 27 is a timing chart describing a relationship between restriction of exposure time and a vertical blanking period in the solid-state imaging apparatus 1d according to this embodiment. Note that in the example shown in FIG. 27, similarly to the example shown in FIG. 24, an example of the case where the first exposure (Long exposure), the second exposure (Middle exposure), and the third exposure (Short exposure) which have different exposure times are sequentially executed in the unit frame period is shown. Further, the horizontal axis and the vertical axis in FIG. 27 are similar to the horizontal axis and the vertical axis in FIG. 24.

As shown in FIG. 27, in the case where the frame rate is set to 40 fps, the unit frame period (i.e., one vertical synchronization period) is 25 ms. Further, in the case where the ratios (hereinafter, referred to also as "exposure ratio") of the exposure periods (i.e., the periods in which charges are accumulated in the pixels 2) between the first exposure to the third exposure are each set to 16 times, assuming that the first exposure period (Long Shutter) is A, the second exposure period (Middle Shutter) is A/16 and the third exposure period (Short Shutter) is 1/256.

Here, the first exposure period A in the case where the vertical blanking period VBLK=0 is calculated on the basis of, for example, the (Formula 1) shown below, and the (Formula 2) is obtained by solving the "(Formula 1).

[Math. 1]

$$A(1+1/16+1/256)=25 \text{ ms} \quad \text{(Formula 1)}$$

$$A=23.44 \text{ ms} \quad \text{(Formula 2)}$$

That is, in the case of the example shown in FIG. 27, the vertical blanking period VBLK is generated in the case where the exposure ratio is set to be larger than that in the above-mentioned condition or the first exposure period A is set to be shorter than that in the condition shown in the (Formula 2), and it is possible to secure the BIST period T170.

3.4. Evaluation

As described above, the solid-state imaging apparatus according to this embodiment executes a predetermined test in the BIST period in which exposure by at least a part of the pixels or reading of the pixel signal based on the exposure result is not performed in the unit frame period corresponding to a predetermined frame rate. The BIST period is started after reading of the pixel signal based on the result of the last exposure in the unit frame period in which exposure of one or more times is executed by at least a part of the pixels (e.g., the pixels in a certain row) is finished. Further, the BIST period is finished before the first exposure in the next frame period of the unit frame period is started.

With such a configuration, in accordance with the solid-state imaging apparatus according to this embodiment, for example, it is possible to execute a test for detecting a failure in the pixels 2 included in each row in the BIST period defined corresponding to the row. In particular, in the existing solid-state imaging apparatus, in the case of executing failure detection for all rows, since it takes at least one frame period to execute a test, it has been necessary to provide a dedicated frame for the test, in which capturing of an image is not performed. Meanwhile, in accordance with the solid-state imaging apparatus according to this embodiment, it is possible to execute a test for detecting a failure for each row in parallel with capturing of an image, and there is no need to provide a dedicated frame for the test, in which capturing of an image is not performed, as compared with the existing solid-state imaging apparatus.

Further, in accordance with the solid-state imaging apparatus according to this embodiment, it is also possible to execute at least a part of tests, which have been executed in the vertical blanking period, in the BIST period. With such a configuration, it is possible to further shorten the vertical blanking period, and consequently further improve the frame rate. Meanwhile, failure detection for TSV, failure detection of the column signal line, and the like may be executed in the vertical blanking period. With such a configuration, it is possible to execute various types of failure detection while maintaining the frame rate and securing sufficient exposure time.

As described above, in accordance with the solid-state imaging apparatus according to this embodiment, by executing a predetermined test using the BIST period, it is possible to more effectively execute various tests such as failure detection during capturing of an image.

<Configuration Example of Hardware>

Figure 28:
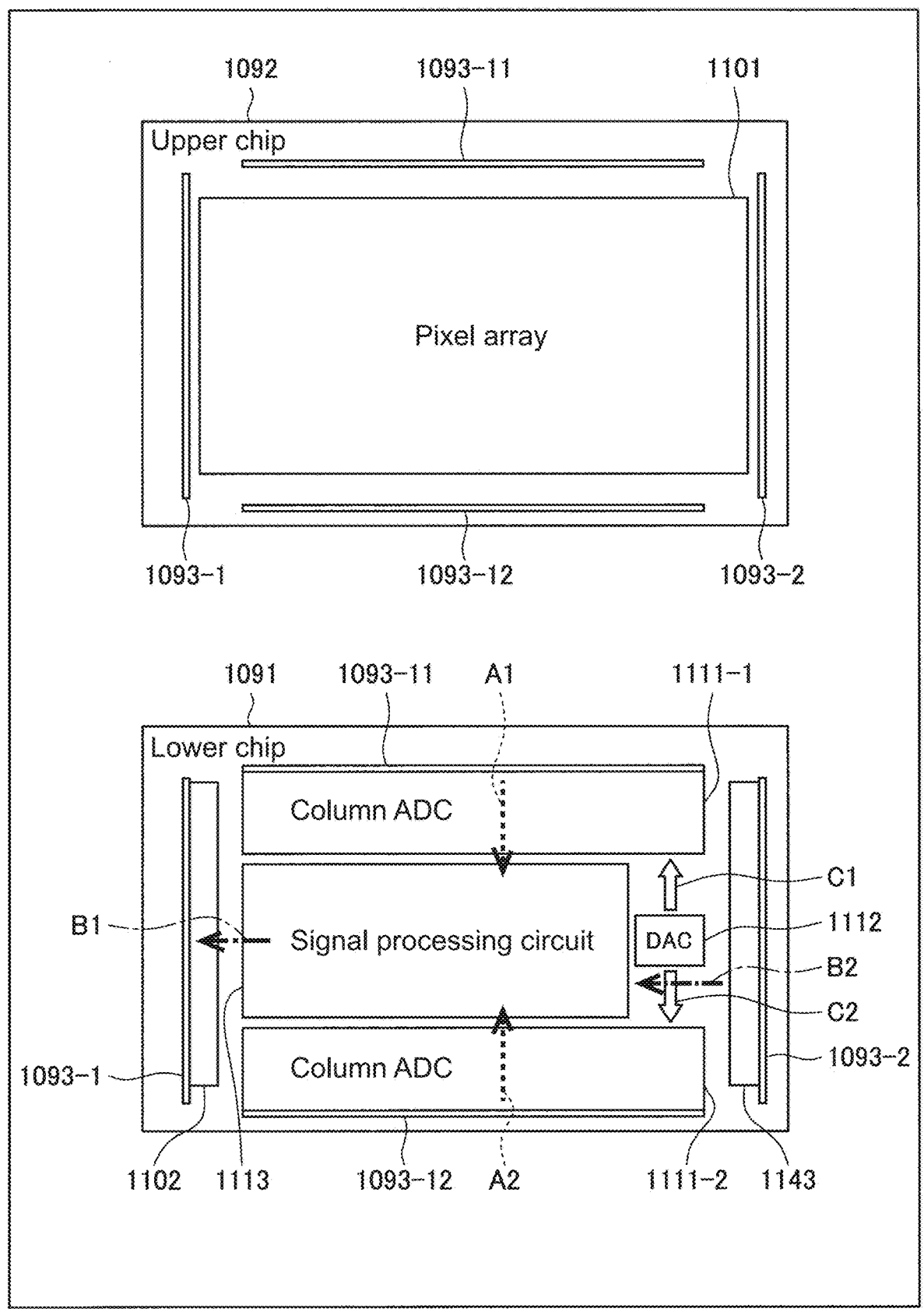
FIG. 28 is an explanatory diagram describing a hardware configuration of a front camera ECU and an imaging device.

Next, a configuration of hardware of a front camera ECU and an imaging device will be described. The hardware of the front camera ECU and the imaging device has a configuration in which a lower chip 1091 and an upper chip 1092 are stacked. Note that the right part of FIG. 28 shows a floor plan that is a hardware configuration of the lower chip 1091, and the left part of FIG. 28 shows a floor plan that is a hardware configuration of the upper chip 1092.

The lower chip 1091 and the upper chip 1092 are each provided with TCVs (Through Chip Vias) 1093-1 and 1093-2 at the left and right end parts in the figure, and the TCVs 1093-1 and 1093-2 penetrate the lower chip 1091 and the upper chip 1092, thereby electrically connecting them. In the lower chip 1091, a row drive unit 1102 (FIG. 29) is disposed on the right side in the figure of the TCV 1093-1, and electrically connected to the TCV 1093-1. A control line gate 1143 (FIG. 29) of the front camera ECU 73 is disposed on the left side in the figure of the TCV 1093-2, and electrically connected to the TCV 1093-2. Note that details of the row drive unit 1102 and the control line gate 1143 will be described below with reference to FIG. 29. Further, in the present specification, TCV and TSV are treated as synonymous.

Further, the lower chip 1091 and the upper chip 1092 are each provided with TCVs 1093-11 and 1093-12 at the upper and lower end parts in the figure, and the TCVs 1093-11 and 1093-12 penetrate the lower chip 1091 and the upper chip 1092, thereby electrically connecting them. In the lower chip 1091, a column ADC (Analog to Digital Converter) 1111-1 is disposed on the lower part in the figure of the TCV 1093-11, and electrically connected to the column ADC 1111-1. A column ADC (Analog to Digital Converter) 1111-2 is disposed on the upper part in the figure of the TCV 1093-12, and electrically connected to the column ADC 1111-2.

A DAC (Digital to Analog Converter) 1112 is provided on the left side of the control line gate 1143 between the right end parts in the figure of the column ADCs 1111-1 and 1111-2, and outputs a ramp voltage to the column ADCs 1111-1 and 1111-2 as shown by arrows C1 and C2 in the figure. Note that the configurations of the column ADCs 1111-1 and 1111-2, and the DAC 1112 correspond to an image signal output unit 1103 in FIG. 29. Further, since it is desirable that the DAC 1112 outputs ramp voltages having the same characteristics to the column ADCs 1111-1 and 1111-2, it is favorable that the distances from the column ADCs 1111-1 and 1111-2 are the same. Further, although one DAC 1112 is shown in the example in FIG. 28, one DAC 1112 may be provided for each of the column ADCs 1111-1 and 1111-2, i.e., total two DACs 1112 having the same characteristics may be provided. Note that details of the image signal output unit 1103 will be described below with reference to FIG. 29.

Figure 29:
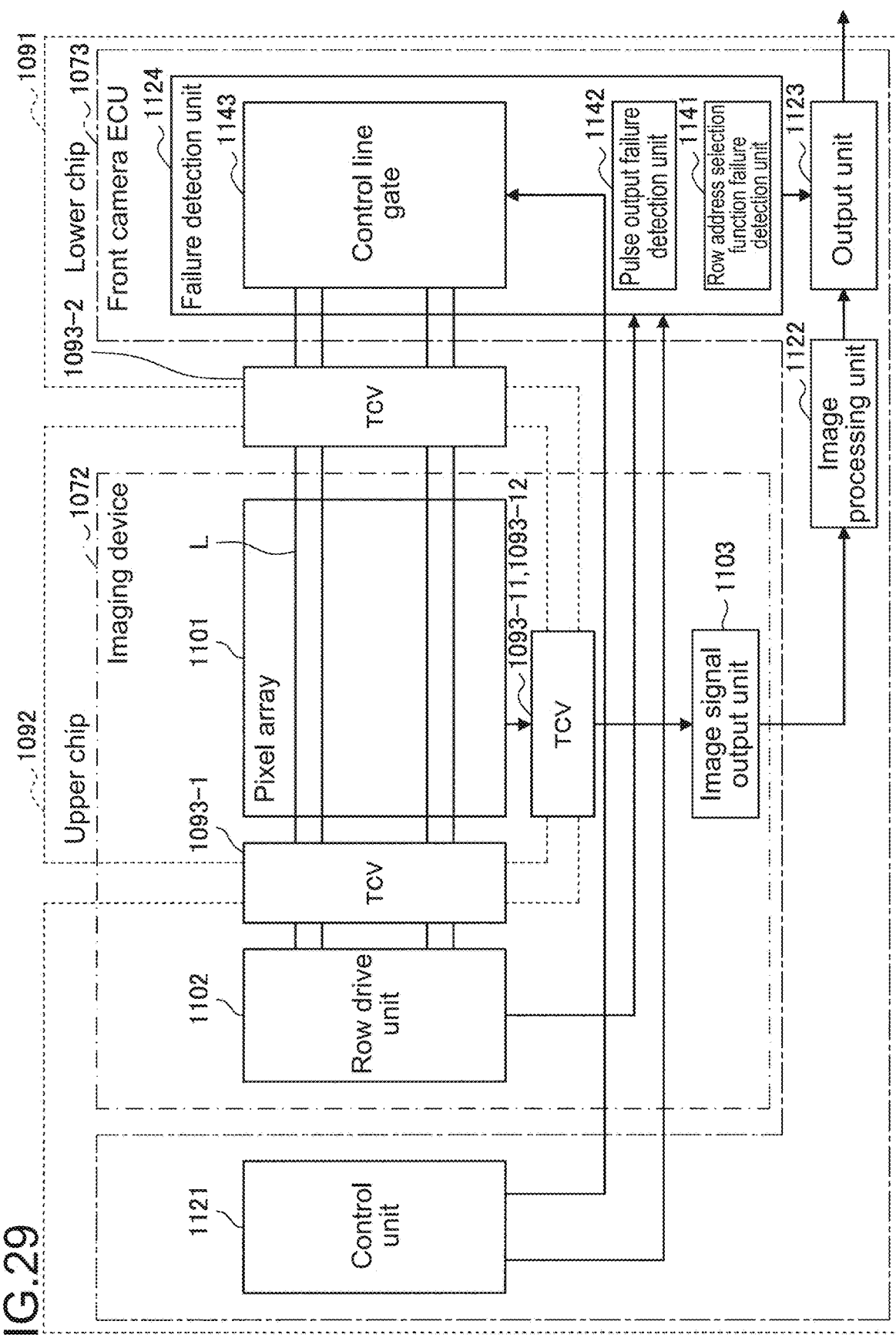
FIG. 29 is an explanatory diagram describing a hardware configuration of a front camera ECU and an imaging device.

Further, a signal processing circuit 1113 is provided between the upper and lower column ADCs 1111-1 and 1111-2, and the row drive unit 1102 and the DAC 1112, and realizes the function corresponding to a control unit 1121, an image processing unit 1122, and an output unit 1123, and a failure detection unit 1124 in FIG. 29.

In the upper chip 1092, substantially the entire area of the rectangular range surrounded by the TCVs 1093-1, 1093-2, 1093-11, and 1093-12 provided at the left, right, upper, and lower end parts is occupied by a pixel array 1101.

On the basis of the control signal supplied from the row drive unit 1102 via the TCV 1093-1 through a pixel control line L (FIG. 29), the pixel array 1101 outputs pixel signals of the pixels in the upper half of the figure among pixels signals to the lower chip 1091 via the TCV 1093-11, and outputs pixel signals of the pixels in the lower half of the figure to the lower chip 1091 via the TCV 1093-12.

As shown by an arrow B1 in the figure, the control signal is output from the signal processing circuit 1113 realizing the row drive unit 1102 via the TCV 1093-1 and the pixel control line L of the pixel array of the upper chip 1092 to the control line gate 1143 (FIG. 29). The control line gate 1143 (FIG. 29) detects presence or absence of a failure due to disconnection of the pixel control line L and the TCVs 1093-1 and 1093-2 by comparing the signal output from the control line gate 1143 in response to the control signal via the pixel control line L from the row drive unit 1102 (FIG. 29) corresponding to the row address, which is command information from the control unit 1121 (FIG. 29), and the detection pulse of the control signal corresponding to the row address, which is supplied from the control unit 1121. Then, as shown by an arrow B2 in the figure, the control line gate 1143 outputs information regarding the presence or absence of a failure to the failure detection unit 1124 realized by the signal processing circuit 1113.

As shown by an arrow A1 in the figure, the column ADC 1111-1 converts the pixel signals of the pixels of the upper half in the figure of the pixel array 1101, which are supplied via the TCV 1093-11, into digital signals in units of columns, and outputs them to the signal processing circuit 1113. Further, as shown by an arrow A2 in the figure, the column ADC 1111-2 converts the pixel signals of the pixels of the upper half in the figure of the pixel array 1101, which are supplied via the TCV 1093-12, into digital signals in units of columns, and outputs them to the signal processing circuit 1113.

By forming two layers in such a way, since the upper chip 1092 include only the pixel array 1101, it is possible to introduce a semiconductor process specialized for pixels. For example, since there is not circuit transistor in the upper chip 1092, there is no need to pay attention to the characteristic variation due to annealing process of 1000° C., or the like. Therefore, it is possible to introduce a high temperature process against white spots. As a result, it is possible to improve the characteristics.

Further, by disposing the failure detection unit 1124 on the lower chip 1091, since the signals that has passed through the lower chip 1091 to the upper chip 1092 or through the TCVs 1093-1 and 1093-2 in the upper chip 1092 and the lower chip 1091 can be detected, it is possible to appropriately detect a failure. Note that the upper chip 1092 corresponds to an example of the "first substrate", and the lower chip 1091 corresponds to an example of the "second substrate".

4. Application Example

Subsequently, an application example of a solid-state imaging apparatus according to the present disclosure will be described.

4.1. Application Example 1 to Moving Object

The technology according to the present disclosure (the present technology) is applicable to various products. For example, the technology according to the present disclosure may be realized as an apparatus mounted on any type of moving objects such as an automobile, an electric car, a hybrid electric vehicle, a motorcycle, a bicycle, personal mobility, an airplane, a drone, a ship, and a robot.

Figure 30:
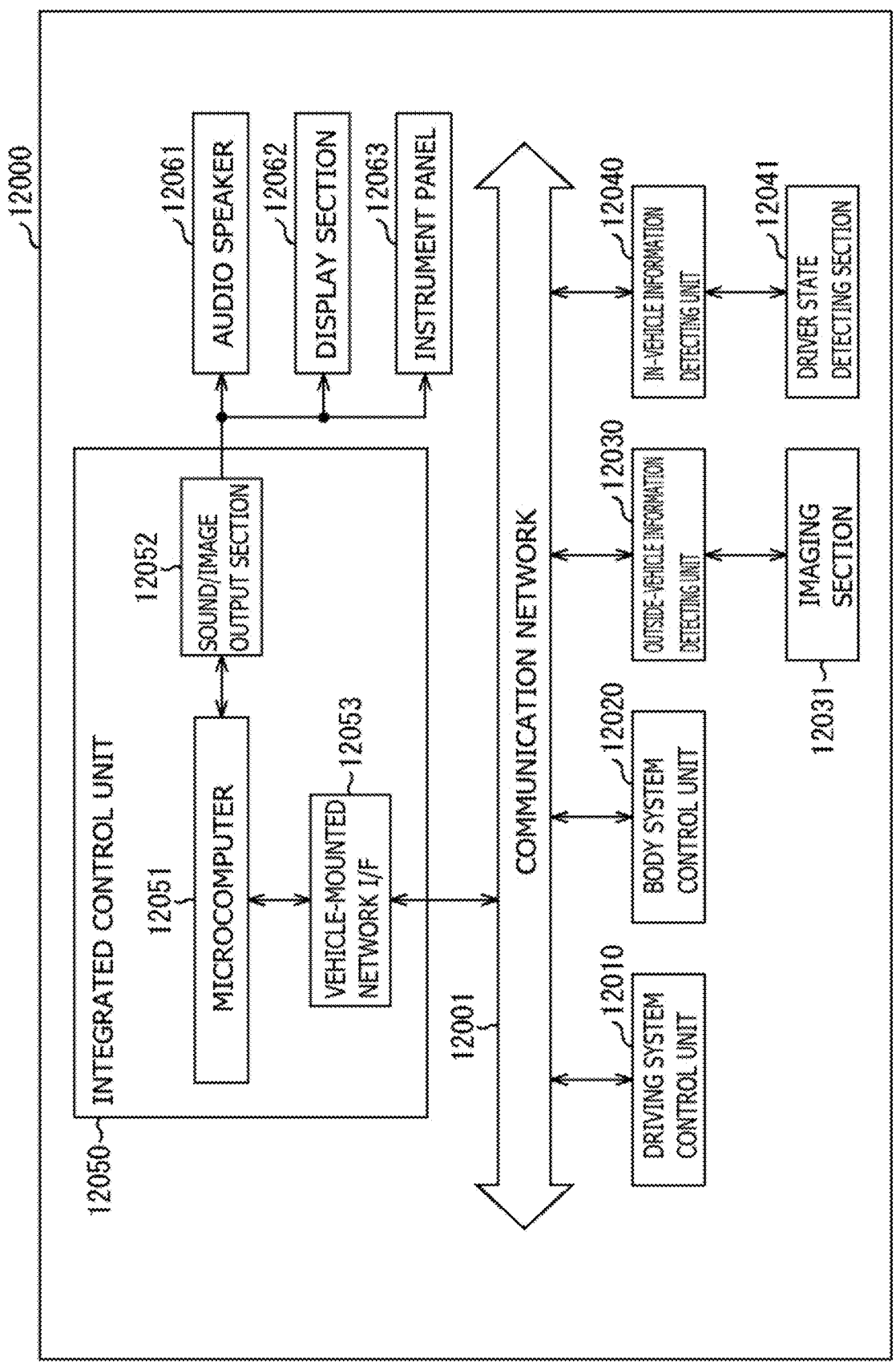
FIG. 30 is a block diagram depicting an example of schematic configuration of a vehicle control system.

FIG. 30 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 30, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 30, an audio speaker 12061, a display section 12062, and an instrument panel 12063 are illustrated as the output device. The display section 12062 may, for example, include at least one of an on-board display and a head-up display.

Figure 31:
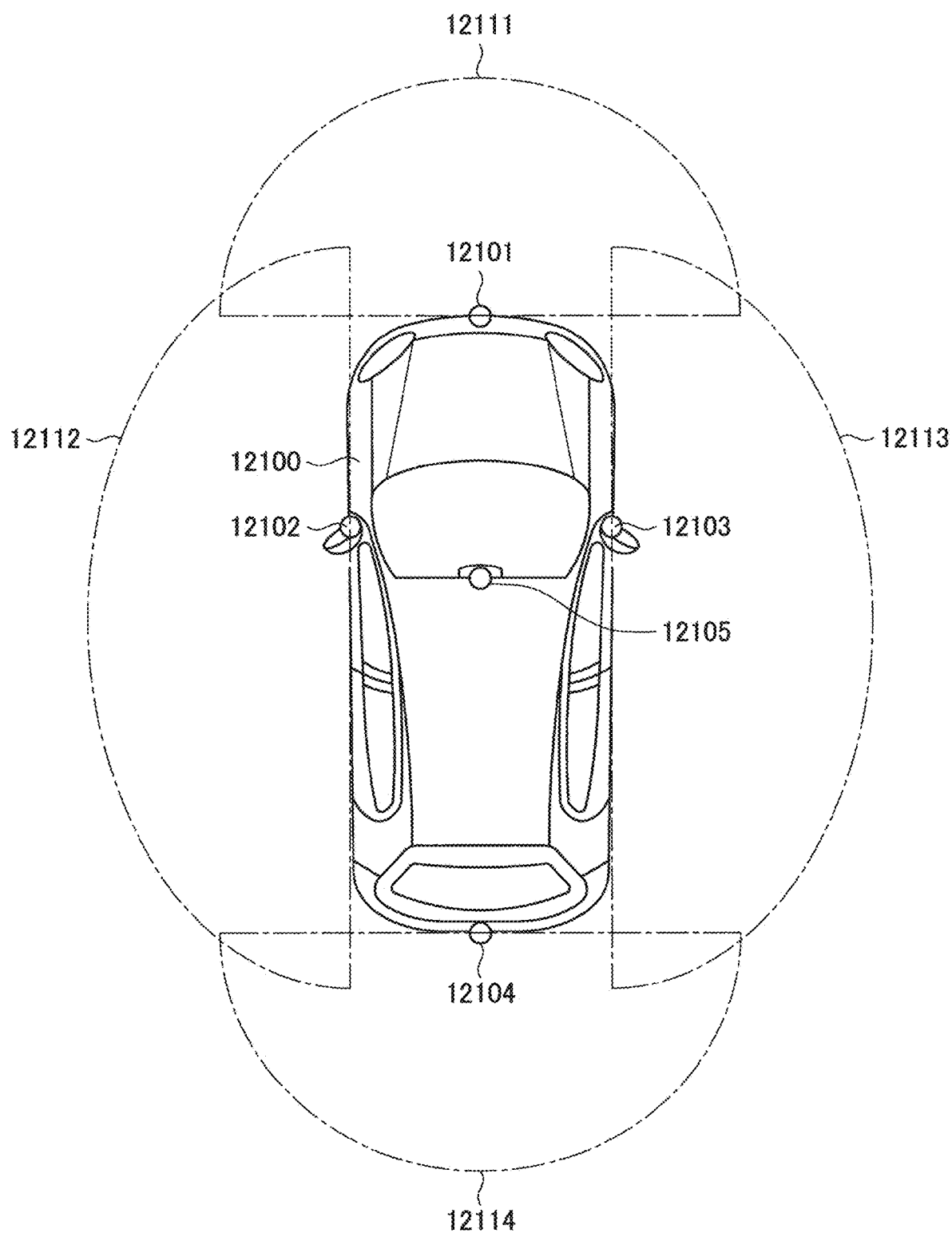
FIG. 31 is a diagram of assistance in explaining an example of installation positions of an outside-vehicle information detecting section and an imaging section.

FIG. 31 is a diagram depicting an example of the installation position of the imaging section 12031.

In FIG. 31, the vehicle 12100 includes, as the imaging section 12031, imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The images of the front acquired by the imaging sections 12101 and 12105 are used mainly to detect a preceding vehicle, a pedestrian, an obstacle, a signal, a traffic sign, a lane, or the like.

Incidentally, FIG. 31 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of a vehicle control system to which the technology according to the present disclosure can be applied has been described. The technology according to the present disclosure can be applied to the imaging section 12031 among the above-mentioned configurations. Specifically, the solid-state imaging apparatus 1 shown in FIG. 1 can be applied to the imaging section 12031. By applying the technology according to the present disclosure to the imaging section 12031, for example, it is possible to detect, in the case where abnormality occurs in at least a part of the pixels in the solid-state imaging apparatus constituting the imaging section 12031, the abnormality. Further, by using such a mechanism, for example, it is possible to inform, in the case where abnormality occurs in a part of pixels, the user of information indicating that the abnormality has occurred, via a predetermined output section. Further, in the vehicle control system 7000, it is possible to restrict the function of controlling the vehicle on the basis of the recognition result. Specific examples of the function of controlling the vehicle include a vehicle-collision-avoidance/shock-absorbing function, a tracking function based on the distance between vehicles, a vehicle-speed-maintenance-travelling function, a vehicle-collision-warning function, and a vehicle-lane-departure-warning function. In the case where it is determined that a problem has occurred in the imaging section 7410 as a result of recognition processing, the function of controlling the vehicle can be restricted or prohibited. As a result, it is possible to accidents due to erroneous detection based on the problem in the imaging section 7410 from occurring. Further, as another example, it is also possible to correct the pixel signal output from the pixel where abnormality has occurred, on the basis of a pixel signal from another pixel that operates normally.

4.2. Application Example 2 to Moving Object

Subsequently, a more specific example of the control realized using the imaging apparatus applied to a moving object will be described.

Figure 32:
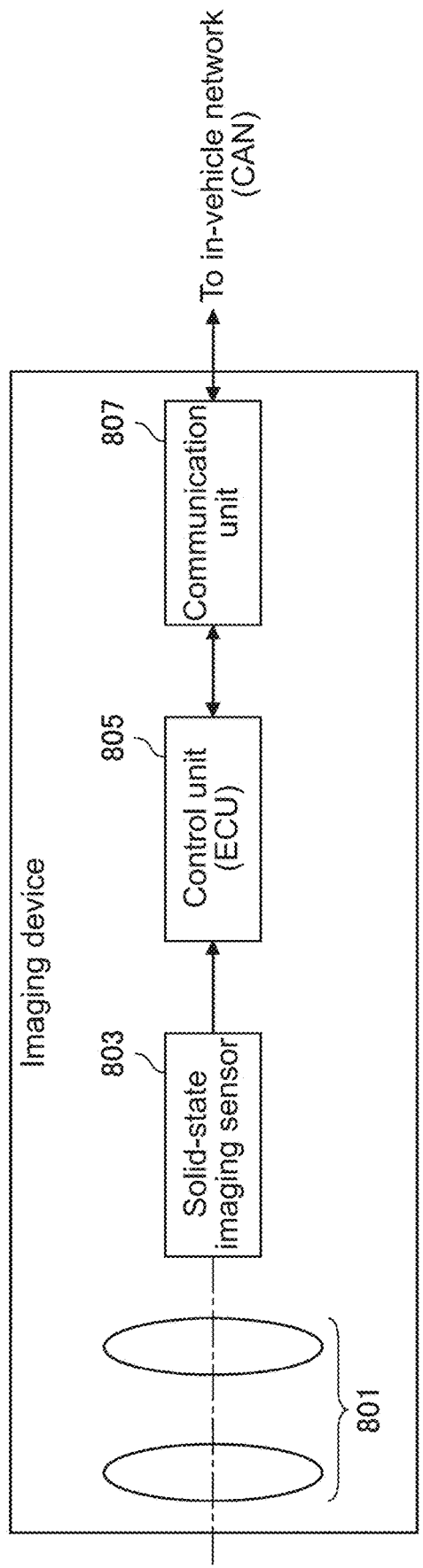
FIG. 32 is a block diagram showing an example of a schematic configuration of an imaging apparatus applied to a moving object.

For example, FIG. 32 is a block diagram showing an example of a schematic configuration of an imaging apparatus applied to a moving object. Note that an imaging apparatus 800 shown in FIG. 32 corresponds to, for example, the imaging section 12031 shown in FIG. 30. As shown in FIG. 32, the imaging apparatus 800 includes an optical system 801, a solid-state imaging device 803, a control unit 805, and a communication unit 807.

The solid-state imaging device 803 can correspond to, for example, the imaging section 12031 shown in FIG. 30. That is, light that enters the imaging apparatus 800 via the optical system 801 such as a lens is photoelectrically converted into an electric signal by the solid-state imaging device 803, and an image corresponding to the electric signal or information regarding distance measurement corresponding to the electric signal is output to the control unit 805.

The control unit 805 is configured as, for example, an ECU (Electronic Control Unit), and executes various types of processing on the basis of the image or information regarding distance measurement output from the solid-state imaging device 803. As a specific example, the control unit 805 performs various types of analysis processing on the image output from the solid-state imaging device 803 to perform, on the basis of the analysis result, recognition of an object such as an external person, a vehicle, an obstacle, a sign, and a character on a road surface, or measurement of the distance to the object.

Further, the control unit 805 is connected to an in-vehicle network (CAN: Controller area Network) via the communication unit 807. The communication unit 807 corresponds to an interface with so-called CAN communication. On the basis of such a configuration, for example, the control unit 805 transmits/receives various types of information to/from another control unit (e.g., the integrated control unit 12050 shown in FIG. 30) connected to the in-vehicle network.

On the basis of the configuration as described above, the control unit 805 is capable of providing various functions by, for example, using the recognition result of the object or the measurement result of the distance to the object as described above.

Specific examples of the above-mentioned function include the following functions.

FCW (Pedestrian Detection for Forward Collision Warning)
AEB (Automatic Emergency Braking)
Vehicle Detection for FCW/AEB
LDW (Lane Departure Warning)
TJP (Traffic Jam Pilot)
LKA (Lane Keeping Aid)
VO ACC (Vision Only Adaptive Cruise Control)
VO TSR (Vision Only Traffic Sign Recognition)
IHC (Intelligent Head Ramp Control)

As a more specific example, the control unit 805 is capable of calculating, in a situation where a vehicle is likely to collide with an external object such as a person and another vehicle, the time until the vehicle collides with the object. Therefore, for example, in the case where the integrated control unit 12050 is notified of the calculation result of such a time, the integrated control unit 12050 is capable of using the notified information for realizing the above-mentioned FCW.

Further, as another example, the control unit 805 is capable of detecting a brake lamp of a preceding vehicle on the basis of the analysis result of the front image of the vehicle. That is, in the case where the integrated control unit 12050 is notified of the detection result, the integrated control unit 12050 is capable of using the notified information for realizing the above-mentioned AEB.

Further, as another example, the control unit 805 is capable of recognizing, on the basis of the analysis result of the front image of the vehicle, the lane in which the vehicle is travelling, the end of the lane, the curb, and the like. Therefore, in the case where the integrated control unit 12050 is notified of the recognition result, the integrated control unit 12050 is capable of using the notified information for realizing the above-mentioned LDW.

Further, the control unit 805 may recognize the presence or absence of the preceding vehicle on the basis of the analysis result of the front image of the vehicle, and notify the integrated control unit 12050 of the recognition result. As a result, the integrated control unit 12050 is capable of, for example, controlling the vehicle speed in accordance with the presence or absence of the preceding vehicle at the time of execution of the above-mentioned TJP. Further, the control unit 805 may recognize a sign on the basis of the analysis result of the front image of the vehicle, and notify the integrated control unit 12050 of the recognition result. As a result, the integrated control unit 12050 is capable of, for example, recognizing the speed limit in accordance with the recognition result of the sign and controlling the vehicle speed in accordance with the speed limit at the time of execution of the above-mentioned TJP. Similarly, the control unit 805 is also capable of recognizing an entrance and exit of an expressway, whether or not the travelling vehicle has reached a curve, and the like, and the recognition result can be used for the vehicle control by the integrated control unit 12050.

Further, the control unit 805 is also capable of recognizing, on the basis of the analysis result of the front image of the vehicle, the light source located in front of the vehicle. That is, in the case where the integrated control unit 12050 is notified of the recognition result of the light source, the integrated control unit 12050 is capable of using the notified information for realizing the above-mentioned IHC. As a specific example, the integrated control unit 12050 is capable of controlling the amount of light of a headlamp in accordance with the light amount of the recognized light source. Further, as another example, the integrated control unit 12050 is also capable of controlling the amount of light of any one of the right and left headlamps in accordance with the position of the recognized light source.

Further, as described above, by applying a solid-state imaging device according to this embodiment, for example, in the case where abnormality has occurred in the solid-state imaging device 803, the control unit 805 is capable of detecting the abnormality on the basis of information output from the solid-state imaging device 803. Therefore, for example, the control unit 805 notifies the integrated control unit 12050 of the detection result of the abnormality of the solid-state imaging device 803 via the in-vehicle network, and thus, the integrated control unit 12050 is capable of executing various types of control for securing security.

As a specific example, the integrated control unit 12050 may inform, via various output apparatuses, the user of that abnormality has occurred in the solid-state imaging device 803. Note that examples of the output apparatus include the audio speaker 12061, the display section 12062, and the instrument panel 12063 shown in FIG. 30.

Further, as another example, the integrated control unit 12050 may control, in the case where it recognizes that abnormality has occurred in the solid-state imaging device 803, the operation of the vehicle on the basis of the recognition result. As a more specific example, the integrated control unit 12050 may restrict a so-called automatic control function such as the above-mentioned TJP and LKA. Further, the integrated control unit 12050 may execute control for securing safety such as limitation of the vehicle speed.

As described above, by applying the technology according to the present disclosure to an in-vehicle system of a moving object such as an automobile, it is possible to detect, even in the case where abnormality occurs in the solid-state imaging device 803 and it has become difficult to cause various types of processing to perform normally, the abnormality. Therefore, for example, it is possible to realize, in accordance with the detection result of the abnormality, execution of various measures for securing safety, such as informing the user of notification information relating the abnormality and controlling the operation of the configuration relating to various types of recognition processing.

5. Conclusion

Although favorable embodiments of the present disclosure have been described in detail with reference to the accompanying drawings, the technical scope of the present disclosure is not limited to such examples. It is obvious that those skilled in the art of the present disclosure could conceive various modifications or alterations within the scope of the technical idea described in the claims, and it is naturally understood that these are also within the technical scope of the present disclosure.

Further, the effects described in the present specification are merely illustrative or exemplary, and not limitative. That is, the technology according to the present disclosure can exhibit other effects apparent to those skilled in the art from the description of the present specification in addition to the above-mentioned effects or instead of the above-mentioned effects.

Note that also the following configurations are within the technical scope of the present disclosure.

(1)

An imaging apparatus, including:

a plurality of pixels each including a photoelectric conversion device that performs photoelectric conversion on incident light;

a drive circuit that supplies a drive signal to each of the plurality of pixels;

a power source that applies a power source voltage to the pixel;

a control unit that controls application of the power source voltage to at least a part of the plurality of pixels so that charges are injected into the photoelectric conversion device of the at least part of the plurality of pixels, and then, controls supply of the drive signal to the at least part of the plurality of pixels so that a pixel signal corresponding to the charges injected from the photoelectric conversion device is read; and a recognition unit that recognizes a state of the photoelectric conversion device in accordance with a result of reading the pixel signal corresponding to the charges from the photoelectric conversion device of the pixel of the at least part of the plurality of pixels (2)

The imaging apparatus according to (1) above, in which the pixel includes at least three transistors of a transfer transistor that transfers the charges of the photoelectric conversion device to a floating diffusion, an amplification transistor that outputs a signal corresponding to charges of the floating diffusion, and a reset transistor that controls a potential of the floating diffusion, and the charges are discharged into the photoelectric conversion device by controlling the potential of the floating diffusion to 0 V.

(3)

The imaging apparatus according to (2) above, in which the control unit performs control so that the charges are injected into the photoelectric conversion device by controlling each of the reset transistor and the transfer transistor to be in a conductive state while controlling the voltage to be applied to the pixel to 0 V, controls the potential of the floating diffusion by applying the power source voltage to the pixel while controlling the transfer transistor to be in a non-conductive state after injecting the charges into the photoelectric conversion device, and then performs control so that the charges injected from the photoelectric conversion device are read by controlling the transfer transistor to be in a conductive state.

(4)

The imaging apparatus according to (2) or (3) above, in which the pixel includes a selection transistor that selectively switches an output of a signal from the amplification transistor, and the control unit controls, where the charges are injected to the photoelectric conversion device, the selection transistor to be in a non-conductive state, and controls, where the image signal corresponding to the charges injected from the photoelectric conversion device are read, the selection transistor to be in a conductive state.

(5)

The imaging apparatus according to (1) above, in which the pixel includes, as the photoelectric conversion device, a first photoelectric conversion device and a second photoelectric conversion device having sensitivity different from that of the first photoelectric conversion device, the control unit controls the application of the power source voltage to the at least part of the plurality of pixels so that charges are injected into each of the first photoelectric conversion device and the second photoelectric conversion device of the at least part of the plurality of pixels, and then, controls the supply of the drive signal to the at least part of the plurality of pixels so that the charges injected into each of the first photoelectric conversion device and the second photoelectric conversion device are read in time division, and the recognition unit recognizes, in accordance with a result of reading the pixel signal corresponding to the charges injected from each of the first photoelectric conversion device and the second photoelectric conversion device, a state of each of the first photoelectric conversion device and the second photoelectric conversion device.

(6)

The imaging apparatus according to (5) above, in which the pixel includes a charge accumulation unit that accumulates charges generated by the second photoelectric conversion device, and the control unit performs, after the charges are injected into the first photoelectric conversion device and the second photoelectric conversion device of the at least part of the plurality of pixels, control so that a first pre-data phase for reading a reset level of a first pixel signal corresponding to the charges injected from the first photoelectric conversion device into the first photoelectric conversion device is read and a first data phase for reading a data level of the first pixel signal is read after the reading of the first pre-data phase, and then, performs control so that a second data phase for reading a data level of a second pixel signal corresponding to the charges injected from the second photoelectric conversion device into the second photoelectric conversion device is read and a second pre-data phase for reading a reset level of the second pixel signal is read after the reading of the second data phase.

(7)

The imaging apparatus according to any one of (1) to (6) above, in which a second power source that applies a voltage to the drive circuit, the second power source being different from a first power source being the power source.

(8)

The imaging apparatus according to any one of (1) to (7) above, in which an output control unit that performs control so that information corresponding to the recognition result of the state of the photoelectric conversion device is output to a predetermined output destination.

(9)

The imaging apparatus according to any one of (1) to (8) above, in which a correction processing unit that corrects, in accordance with the recognition result, a pixel signal output from the corresponding pixel. the state of the photoelectric conversion device.

(10)

A control apparatus, including:

a control unit that controls application of a voltage to at least a part of a plurality of pixels each including a photoelectric conversion device that performs photoelectric conversion on incident light so that charges are injected into the photoelectric conversion device of the at least part of the plurality of pixels, and then, controls supply of the drive signal to the at least part of the plurality of pixels so that a pixel signal corresponding to the charges injected from the photoelectric conversion device is read; and a recognition unit that recognize a state of the photoelectric conversion device on the basis of a result of reading the pixel signal corresponding to the charges from the photoelectric conversion device of the at least part of the plurality of pixels.

(11)

The control apparatus according to (10) above, further including an output control unit that performs control so that information corresponding to the recognition result of the state of the photoelectric conversion device is presented to a predetermined output unit.

(12)

The control apparatus according to (10) or (11) above, further including a correction processing unit that corrects, in accordance with the recognition result of the state of the photoelectric conversion device, an image based on the result of reading the pixel signal from the plurality of pixels.

(13)

A control method, including:

by a computer controlling application of a voltage to at least a part of a plurality of pixels each including a photoelectric conversion device that performs photoelectric conversion on incident light so that charges are injected into the photoelectric conversion device of the at least part of the plurality of pixels, and then, controls supply of the drive signal to the at least part of the plurality of pixels so that a pixel signal corresponding to the charges injected from the photoelectric conversion device is read; and recognizing a state of the photoelectric conversion device on the basis of a result of reading the pixel signal corresponding to the charges from the photoelectric conversion device of the at least part of the plurality of pixels.

REFERENCE SIGNS LIST 1, 1a, 1c, 1d solid-state imaging apparatus
2, 2c pixel
2a dummy pixel
3 pixel array unit
4 address recorder
5 pixel timing drive circuit
6 column signal processing circuit
7 sensor controller
8 analog potential generation circuit
101 control unit
111 pixel array unit
112 selection unit
114 constant current circuit unit
121, 122 pixel
131, 132, 133 switch
141 comparator
143 counter
152 node
153 counter
161, 162 MOS transistor
211 sensor data unit
221 sensor data unit
401 DSP

The invention claimed is:

1. An imaging system, comprising:

an imaging apparatus that is mounted on a vehicle and generates an image by imaging an area around the vehicle; and a processing apparatus that is mounted on the vehicle and executes processing relating to a function of controlling the vehicle, wherein the imaging apparatus includes a pixel including a photoelectric conversion device that performs photoelectric conversion on incident light, a drive circuit that supplies a drive signal to the pixel, a power source that applies a power source voltage to the pixel, and circuitry configured to function as:

a control unit that controls application of the power source voltage to the pixel so that charges are injected into the photoelectric conversion device of the pixel, and then, controls supply of the drive signal to the pixel so that a pixel signal corresponding to the charges injected from the photoelectric conversion device is read, a recognition unit that recognizes a state of the photoelectric conversion device in accordance with a result of reading the pixel signal corresponding to the charges from the photoelectric conversion device of the pixel, and an output unit that outputs information corresponding to a result of recognizing the state of the photoelectric conversion device, the processing apparatus restricts, on a basis of the recognition result, the function of controlling the vehicle, the pixel includes, as the photoelectric conversion device, a first photoelectric conversion device and a second photoelectric conversion device, and the control unit
performs control so that a first pre-data phase for reading a reset level of a first pixel signal corresponding to charges injected from the first photoelectric conversion device into the first photoelectric conversion device is read and a first data phase for reading a data level of the first pixel signal is read after the reading of the first pre-data phase, and then,
performs control so that a second data phase for reading a data level of a second pixel signal corresponding to charges injected from the second photoelectric conversion device into the second photoelectric conversion device is read and a second pre-data phase for reading a reset level of the second pixel signal is read after the reading of the second data phase.

2. The imaging system according to claim 1, wherein the pixel includes
at least three transistors of a transfer transistor that transfers the charges of the photoelectric conversion device to a floating diffusion, an amplification transistor that outputs a signal corresponding to charges of the floating diffusion, and a reset transistor that controls a potential of the floating diffusion, and
the charges are discharged into the photoelectric conversion device by controlling the potential of the floating diffusion to a predetermined potential or less.

3. The imaging system according to claim 2, wherein the control unit
performs control so that the charges are injected into the photoelectric conversion device by controlling each of the reset transistor and the transfer transistor to be in a conductive state while controlling the voltage to be applied to the pixel to the predetermined potential or less,
controls the potential of the floating diffusion by applying the power source voltage to the pixel while controlling the transfer transistor to be in a non-conductive state after injecting the charges into the photoelectric conversion device, and then
performs control so that the charges injected from the photoelectric conversion device are read by controlling the transfer transistor to be in a conductive state.

4. The imaging system according to claim 2, wherein
the pixel includes a selection transistor that selectively switches an output of a signal from the amplification transistor, and
the control unit controls, where the charges are injected to the photoelectric conversion device, the selection transistor to be in a non-conductive state, and controls, where the image signal corresponding to the charges injected from the photoelectric conversion device are read, the selection transistor to be in a conductive state.

5. The imaging system according to claim 1, wherein
the second photoelectric conversion device has sensitivity different from that of the first photoelectric conversion device,
the control unit controls the application of the power source voltage to the pixel so that charges are injected into each of the first photoelectric conversion device and the second photoelectric conversion device of the pixel, and then, controls the supply of the drive signal to the pixel so that the charges injected into each of the first photoelectric conversion device and the second photoelectric conversion device are read in time division, and
the recognition unit recognizes, in accordance with a result of reading the pixel signal corresponding to the charges injected from each of the first photoelectric conversion device and the second photoelectric conversion device, a state of each of the first photoelectric conversion device and the second photoelectric conversion device.

6. The imaging system according to claim 5, wherein
the pixel includes a charge accumulation unit that accumulates charges generated by the second photoelectric conversion device.

7. The imaging system according to claim 1, further comprising
a second power source that applies a voltage to the drive circuit, the second power source being different from a first power source being the power source.

8. The imaging system according to claim 1, further comprising circuitry configured to function as:
a correction processing unit that corrects, in accordance with the recognition result, a pixel signal output from the corresponding pixel.

9. The imaging system according to claim 1, wherein
the pixel is disposed on a first substrate, and
the drive circuit, the power source, and the control unit are disposed on a second substrate stacked with the first substrate.

10. An imaging apparatus, comprising:
a pixel including a photoelectric conversion device that performs photoelectric conversion on incident light;
a drive circuit that supplies a drive signal to the pixel;
a power source that applies a power source voltage to the pixel; and
circuitry configured to function as:
a control unit that controls application of the power source voltage to the pixel so that charges are injected into the photoelectric conversion device of the pixel, and then, controls supply of the drive signal to the pixel so that a pixel signal corresponding to the charges injected from the photoelectric conversion device is read; and
a recognition unit that recognizes a state of the photoelectric conversion device in accordance with a result of reading the pixel signal corresponding to the charges from the photoelectric conversion device of the pixel,
wherein the pixel includes, as the photoelectric conversion device, a first photoelectric conversion device and a second photoelectric conversion device, and
the control unit
performs control so that a first pre-data phase for reading a reset level of a first pixel signal corresponding to charges injected from the first photoelectric conversion device into the first photoelectric conversion device is read and a first data phase for reading a data level of the first pixel signal is read after the reading of the first pre-data phase, and then,
performs control so that a second data phase for reading a data level of a second pixel signal corresponding to charges injected from the second photoelectric conversion device into the second photoelectric conversion device is read and a second pre-data phase for reading a reset level of the second pixel signal is read after the reading of the second data phase.

11. The imaging apparatus according to claim 10, wherein the pixel includes
at least three transistors of a transfer transistor that transfers the charges of the photoelectric conversion device to a floating diffusion, an amplification transistor that outputs a signal corresponding to charges of the floating diffusion, and a reset transistor that controls a potential of the floating diffusion, and the charges are discharged into the photoelectric conversion device by controlling the potential of the floating diffusion to a predetermined potential or less.

12. The imaging apparatus according to claim 11, wherein the control unit performs control so that the charges are injected into the photoelectric conversion device by controlling each of the reset transistor and the transfer transistor to be in a conductive state while controlling the voltage to be applied to the pixel to the predetermined potential or less, controls the potential of the floating diffusion by applying the power source voltage to the pixel while controlling the transfer transistor to be in a non-conductive state after injecting the charges into the photoelectric conversion device, and then performs control so that the charges injected from the photoelectric conversion device are read by controlling the transfer transistor to be in a conductive state.

13. The imaging apparatus according to claim 11, wherein the pixel includes a selection transistor that selectively switches an output of a signal from the amplification transistor, and the control unit controls, where the charges are injected to the photoelectric conversion device, the selection transistor to be in a non-conductive state, and controls, where the image signal corresponding to the charges injected from the photoelectric conversion device are read, the selection transistor to be in a conductive state.

14. The imaging apparatus according to claim 10, wherein the second photoelectric conversion device has sensitivity different from that of the first photoelectric conversion device, the control unit controls the application of the power source voltage to the pixel so that charges are injected into each of the first photoelectric conversion device and the second photoelectric conversion device of the pixel, and then, controls the supply of the drive signal to the pixel so that the charges injected into each of the first photoelectric conversion device and the second photoelectric conversion device are read in time division, and the recognition unit recognizes, in accordance with a result of reading the pixel signal corresponding to the charges injected from each of the first photoelectric conversion device and the second photoelectric conversion device, a state of each of the first photoelectric conversion device and the second photoelectric conversion device.

15. The imaging apparatus according to claim 14, wherein the pixel includes a charge accumulation unit that accumulates charges generated by the second photoelectric conversion device.

16. The imaging apparatus according to claim 10, further comprising a second power source that applies a voltage to the drive circuit, the second power source being different from a first power source being the power source.

17. The imaging apparatus according to claim 10, further comprising circuitry configured to function as:

an output control unit that performs control so that information corresponding to the recognition result of the state of the photoelectric conversion device is output to a predetermined output destination.

18. The imaging apparatus according to claim 10, further comprising circuitry configured to function as:

a correction processing unit that corrects, in accordance with the recognition result, a pixel signal output from the corresponding pixel.

19. The imaging apparatus according to claim 10, wherein the pixel is disposed on a first substrate, and the drive circuit, the power source, and the control unit are disposed on a second substrate stacked with the first substrate.

20. A control apparatus, comprising:

circuitry configured to function as:

a control unit that controls application of a voltage to a pixel including a photoelectric conversion device that performs photoelectric conversion on incident light so that charges are injected into the photoelectric conversion device of the pixel, and then, controls supply of the drive signal to the pixel so that a pixel signal corresponding to the charges injected from the photoelectric conversion device is read; and a recognition unit that recognize a state of the photoelectric conversion device on a basis of a result of reading the pixel signal corresponding to the charges from the photoelectric conversion device of the pixel, wherein:

the pixel includes, as the photoelectric conversion device, a first photoelectric conversion device and a second photoelectric conversion device, and the control unit performs control so that a first pre-data phase for reading a reset level of a first pixel signal corresponding to charges injected from the first photoelectric conversion device into the first photoelectric conversion device is read and a first data phase for reading a data level of the first pixel signal is read after the reading of the first pre-data phase, and then, performs control so that a second data phase for reading a data level of a second pixel signal corresponding to charges injected from the second photoelectric conversion device into the second photoelectric conversion device is read and a second pre-data phase for reading a reset level of the second pixel signal is read after the reading of the second data phase.

21. The control apparatus according to claim 20, further comprising circuitry configured to function as:

an output control unit that performs control so that information corresponding to the recognition result of the state of the photoelectric conversion device is presented to a predetermined output unit.

22. The control apparatus according to claim 21, further comprising circuitry configured to function as:

a correction processing unit that corrects, in accordance with the recognition result of the state of the photoelectric conversion device, an image based on the result of reading the pixel signal from the pixel.

* * * * *